United States Patent
Akutsu et al.

(10) Patent No.: US 8,197,373 B2
(45) Date of Patent: Jun. 12, 2012

(54) POWER UNIT

(75) Inventors: Shigemitsu Akutsu, Wako (JP);
Noriyuki Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 469 days.

(21) Appl. No.: 12/560,560

(22) Filed: Sep. 16, 2009

(65) Prior Publication Data

US 2010/0071974 A1    Mar. 25, 2010

(30) Foreign Application Priority Data

Sep. 19, 2008  (JP) .................. 2008-241802

(51) Int. Cl.
*F16H 3/72* (2006.01)
(52) U.S. Cl. ............. 475/5; 475/8; 475/324; 475/326
(58) Field of Classification Search ............ 475/5, 8, 475/323, 324, 326
See application file for complete search history.

(56) References Cited

U.S. PATENT DOCUMENTS

| | | | |
|---|---|---|---|
| 2006/0264297 A1* | 11/2006 | Seki et al. ......... | 475/324 |
| 2009/0011887 A1* | 1/2009 | Komada et al. ......... | 475/5 |
| 2009/0095548 A1* | 4/2009 | Tamba et al. ......... | 180/65.21 |

FOREIGN PATENT DOCUMENTS

| | | |
|---|---|---|
| JP | 08-324262 A | 12/1996 |
| JP | 2001-136606 A | 5/2001 |
| JP | 2003-269212 | 9/2003 |
| JP | 2008-132971 A | 6/2008 |

OTHER PUBLICATIONS

Japanese Office Action application No. JP2008-241802 dated Apr. 13, 2010.

* cited by examiner

*Primary Examiner* — Edwin A Young
(74) *Attorney, Agent, or Firm* — Squire Sanders (US) LLP

(57) ABSTRACT

A power unit includes: an energy dispensing/synthesizing system in which a first body of rotation is connected to an output shaft of a prime mover and a second body of rotation is connected to a driven unit via a first power transmission path; a first power transmission system selectively operable between an operating state for enabling power transmission in the first power transmission path and an operating state for disconnecting the power transmission; a second power transmission path connecting between the output shaft of the prime mover and the driven unit; and a second power transmission system selectively operable between an operating state for enabling power transmission in the second power transmission path and an operating state for disconnecting the power transmission, wherein an auxiliary device is connected to a second body of rotation of the energy dispensing/synthesizing system.

15 Claims, 19 Drawing Sheets

POWER UNIT

BACKGROUND OF THE INVENTION

1. Field of the Invention

The present invention relates to a power unit for driving a driven unit such as wheels of a vehicle.

2. Description of the Related Art

For example, as a vehicle, which runs by transmitting engine power to driving wheels as a driven unit, there has conventionally been known a vehicle which automatically stops engine operation during a stop at an intersection (so-called an idle-stop vehicle) as described in Japanese Patent Application Laid-Open No. 2003-269212 (hereinafter, referred to as Patent Document 1).

On the other hand, a vehicle generally includes various auxiliary devices such as a water pump, an air conditioner compressor, and a power steering pump. In this case, these auxiliary devices are able to be driven by using the engine power during engine operation. During the stop of engine operation, however, the auxiliary devices are not able to be driven by the engine.

Therefore, in the case of the idle stop vehicle as described in Patent Document 1, there is known a vehicle which has an auxiliary device driving motor to drive auxiliary devices by using the motor during the stop of engine operation as described in Patent Document 1.

Incidentally, the technique of driving the auxiliary devices by using the auxiliary device driving motor during an idle stop of the engine as described in Patent Document 1 is also applicable to a hybrid vehicle having an engine and a drive motor as power generation sources for driving the driving wheels of the vehicle.

In cases where the technique described in Patent Document 1 is applied to the hybrid vehicle, however, the auxiliary device driving motor is mounted on the vehicle in addition to the engine and the drive motor. Therefore, the technique has a problem of inhibiting a reduction in weight or downsizing and a decrease in manufacturing cost of the vehicle.

SUMMARY OF THE INVENTION

The present invention has been provided in view of the above problem. Therefore, it is an object of the present invention to provide a power unit, which has a prime mover and a rotary actuator as power generation sources for driving a driven unit such as driving wheels of a vehicle, capable of driving an auxiliary device by using power of one of the prime mover and the rotary actuator without any auxiliary device driving actuator.

In order to achieve the above object, according to the present invention, there is provided a power unit for driving a driven unit and an auxiliary device, comprising: a prime mover having an output shaft for use in outputting power; an energy dispensing/synthesizing system having two bodies of rotation which input and output rotational energy and an electric element which inputs and outputs electric energy, in which energy is able to be dispensed or synthesized in non-contact manner between the two bodies of rotation and the electric element while energy conversion is performed between the rotational energy of the two bodies of rotation and the electric energy of the electric element and in which a first body of rotation which is one of the two bodies of rotation is connected to the output shaft of the prime mover and a second body of rotation which is the other of the two bodies of rotation is connected to the driven unit via a first power transmission path; a first power transmission system included in the first power transmission path and selectively operable between a first operating state for enabling power transmission in the first power transmission path and a second operating state for disconnecting power transmission in the first power transmission path; a second power transmission path which connects the output shaft of the prime mover and the driven unit bypassing the first power transmission system; and a second power transmission system included in the second power transmission path and selectively operable between a third operating state for enabling power transmission in the second power transmission path and a fourth operating state for disconnecting power transmission in the second power transmission path, wherein the auxiliary device is connected to the second body of rotation of the energy dispensing/synthesizing system (First invention).

According to the power unit of the first invention, in the state where the first power transmission system is placed in the second operating state and the second power transmission system is placed in the fourth operating state, the power transmission via the first power transmission path is disconnected between the prime mover or the energy dispensing/synthesizing system and the driven unit. Further, the power transmission via the second power transmission path is disconnected between the prime mover and the driven unit. Moreover, the auxiliary device is connected to the second body of rotation of the energy dispensing/synthesizing system, namely a body of rotation other than the body of rotation (the first body of rotation) connected to the output shaft of the prime mover, out of the two bodies of rotation of the energy dispensing/synthesizing system. Therefore, in the state where the first power transmission system is placed in the second operating state and the second power transmission system is placed in the fourth operating state, for example, the auxiliary device is able to be driven by transmitting the electric energy input to the electric element of the energy dispensing/synthesizing system to the auxiliary device via the second body of rotation without driving the driven unit with the operation of the prime mover stopped.

Moreover, in the state where the first power transmission system is placed in the second operating state and the second power transmission system is placed in the fourth operating state, for example, it is possible to perform an idle operation of the prime mover without driving the driven unit. Further, it is also possible to drive the auxiliary device by transmitting the power of the prime mover to the auxiliary device or transmitting the electric energy input to the electric element of the energy dispensing/synthesizing system while performing the idle operation of the prime mover.

Further, for example, in a state where the first power transmission system is placed in the first operating state and the second power transmission system is placed in the fourth operating state with the prime mover operated, the second body of rotation is caused to generate power by the energy conversion between the first body of rotation and the second body of rotation of the energy dispensing/synthesizing system and the electric element while the power of the prime mover is applied to the first body of rotation of the energy dispensing/synthesizing system. This enables the power of the prime mover to be transmitted to the driven unit via the energy dispensing/synthesizing system and the first power transmission path to drive the driven unit. In this instance, the auxiliary device is also able to be driven by transmitting the power of the prime mover to the auxiliary device or transmitting the electric energy input to the electric element of the energy dispensing/synthesizing system to the auxiliary device via the second body of rotation.

Still further, for example, in a state where the first power transmission system is placed in the first operating state and the second power transmission system is placed in the third operating state with the prime mover operated, the driven unit is able to be driven by transmitting the power of the prime mover to the driven unit via the second power transmission path. Moreover, in this instance, it is also possible to drive the auxiliary device by transmitting a part of the power of the prime mover to the auxiliary device via the energy dispensing/synthesizing system or to drive the auxiliary device by transmitting the electric energy input to the electric element of the energy dispensing/synthesizing system to the auxiliary device via the second body of rotation. Further, in this instance, it is possible to transmit the power of the prime mover to the driven unit via the second power transmission path and, in parallel with this, to transmit the electric power input to the electric element of the energy dispensing/synthesizing system to the driven unit via the second body of rotation and the first power transmission path.

As described above, according to the power unit of the present invention, the auxiliary device is able to be driven by using one of the power of the prime mover and the electric energy input to the electric element of the energy dispensing/synthesizing system without an actuator for the auxiliary device in various states such as a state where the operation of the prime mover and the driving of the driven unit are stopped and a state where the driven unit is driven.

In the first invention, the energy dispensing/synthesizing system is configured, for example, as described below. Specifically, the energy dispensing/synthesizing system includes: an immovable stator having an armature for generating a rotating magnetic field; a first rotor having a magnet and provided rotatably so as to be opposed to the stator; and a second rotor made of a soft magnetic material and provided rotatably in a non-contact state with respect to the stator and the first rotor between the stator and the first rotor, dispenses or synthesizes energy via a magnetic circuit formed along with the generation of the rotating magnetic field among the stator, the first rotor, and the second rotor, and maintains an interrelation in a rotational speed between the rotating magnetic field, the first rotor, and the second rotor at a predetermined collinear relationship during the energy dispensing or synthesizing. In this instance, the electric element is formed of an armature winding of the armature and the two bodies of rotation are formed of the first rotor and the second rotor. (Second invention)

According to the second invention, the energy dispensing/synthesizing system dispenses or synthesizes energy via the magnetic circuit. Specifically, the energy dispensing/synthesizing system dispenses or synthesizes energy in a non-contact manner between the two bodies of rotation and the electric element while performing the energy conversion between the rotational energy of the two bodies of rotation and the electric energy of the electric element via the magnetic circuit. In this instance, the interrelation in the rotational speed between the rotating magnetic field, the first rotor, and the second rotor is maintained at the predetermined collinear relationship and therefore the energy dispensing/synthesizing system has a function of a differential gear such as a planetary gear unit having three rotating elements in a pseudo manner. Accordingly, for example, in a case where the driven unit is driven by transmitting the power of the prime mover to the driven unit via the energy dispensing/synthesizing system and the first power transmission path with the first power transmission system placed in the first operating state and the second power transmission system place in the fourth operating state while operating the prime mover, it is possible to change a reduction ratio between the first body of rotation and the second body of rotation of the energy dispensing/synthesizing system and furthermore a reduction ratio (change gear ratio) between the output shaft of the prime mover and the driven unit.

In the second invention, there are the following three types of mode for the energy dispensing/synthesizing system. In the first mode, the stator has an armature row formed of a plurality of the armatures provided in the stator so as to be arranged in the circumferential direction which is a direction around a rotation axis of the first rotor and the armature row generates an armature magnetic pole row, which is formed of a plurality of armature magnetic poles generating the rotating magnetic field by rotating in the circumferential direction, the armature magnetic pole row including the armature magnetic poles adjacent to each other in the circumferential direction different in polarity from each other, by an electricity supply to the armature windings of the armatures constituting the armature row. Further, the first rotor has a magnetic pole row formed of a plurality of magnetic poles which are formed so as to be arranged in the circumferential direction and opposed to the armature row by a plurality of the magnets provided in the first rotor, the magnetic pole row including the magnetic poles adjacent to each other in the circumferential direction different in polarity from each other. Still further, the second rotor has a soft magnetic material row formed of a plurality of the soft magnetic materials provided in the second rotor so as to be arranged in the circumferential direction between the armature row and the magnetic pole row. Moreover, a ratio among the number of the armature magnetic poles of the stator, the number of the magnetic poles of the first rotor, and the number of the soft magnetic materials of the second rotor is set to $1:m:(1+m)/2$ $(m \neq 1)$. (Third invention)

According to the third invention, the stator, the first rotor, and the second rotor of the energy dispensing/synthesizing system are configured as described above, by which the energy dispensing/synthesizing system has the same function as the planetary gear unit as a differential gear as described with respect to a rotating machine 3 of the first embodiment described later. In this instance, the armature magnetic pole of the stator corresponds to one of the sun gear and the ring gear of the planetary gear unit, the first rotor corresponds to the other of the sun gear and the ring gear of the planetary gear unit, and the second rotor corresponds to the carrier of the planetary gear unit. Moreover, according to the third invention, it is possible to apply a compact and simple configuration to the energy dispensing/synthesizing system having the same function as the planetary gear unit as described above. Further, in the third invention, the degree of freedom in the value "m" is high ("m" may be a positive rational number other than "1") and therefore the reduction ratio between the first rotor and the second rotor is able to be set to various kinds of reduction ratio.

In the second mode of the energy dispensing/synthesizing system in the second invention, the stator has an armature row formed of a plurality of the armatures provided in the stator so as to be arranged in the circumferential direction which is a direction around the rotation axis of the first rotor, and the armature row generates an armature magnetic pole row, which is formed of a plurality of armature magnetic poles generating the rotating magnetic field by rotating in the circumferential direction, the armature magnetic pole row including the armature magnetic poles adjacent to each other in the circumferential direction different in polarity from each other, by an electricity supply to the armature windings of the armatures constituting the armature row. Further, the first rotor has a magnetic pole row formed of a plurality of magnetic poles which are formed so as to be arranged in the circumferential direction and opposed to the armature row by a plurality of the magnets provided in the first rotor, the magnetic pole row including the magnetic poles adjacent to each other in the circumferential direction different in polarity from each other. Still further, the second rotor has a soft magnetic material row formed of a plurality of the soft magnetic materials provided in the second rotor so as to be arranged in the circumferential direction between the armature row and the magnetic pole row. Moreover, the power unit further includes n (n: 2 or greater integer) rotating machine structures where the armature row, the magnetic pole row, and the soft magnetic material row constitute one rotating machine structure. In the n rotating machine structures, a phase difference in terms of an electric angle in the circumferential direction between the armature magnetic pole row generated by the armature row and the magnetic pole row is set so as to deviate from each other between the adjacent rotating machine structures by an electric angle of $2\pi/n$ and a phase difference in terms of an electric angle in the circumferential direction between the armature magnetic pole row generated by the armature row and the soft magnetic material row is set so as to deviate from each other between the adjacent rotating machine structures by an electric angle of $\pi/n$. (Fourth invention)

According to the fourth invention, the stator, the first rotor, and the second rotor of the energy dispensing/synthesizing system are configured as described above, by which the energy dispensing/synthesizing system has the same function as the planetary gear unit as a differential gear as described with respect to a rotating machine 60 or 70 of the second or third embodiment described later. In this instance, the armature magnetic pole of the stator corresponds to one of the sun gear and the ring gear of the planetary gear unit, the first rotor corresponds to the other of the sun gear and the ring gear of the planetary gear unit, and the second rotor corresponds to the carrier of the planetary gear unit. Moreover, according to the fourth invention, it is possible to apply a compact and simple configuration to the energy dispensing/synthesizing system having the same function as the planetary gear unit as described above.

In the third mode of the energy dispensing/synthesizing system in the second invention, the stator has a plurality of the armatures provided in the stator so as to extend each in a first predetermined direction along a virtual first cylinder outer peripheral surface which is coaxial with the rotation axis of the first rotor from one end side of the first cylinder outer peripheral surface to the other end side thereof and so as to be arranged in the circumferential direction which is a direction around the rotation axis of the first rotor, and the plurality of armatures generate a plurality of armature magnetic poles generating the rotating magnetic field by rotating in the circumferential direction, the armature magnetic poles each extending in the first predetermined direction and the armature magnetic poles adjacent to each other in the circumferential direction being different in polarity from each other, by an electricity supply to the armature windings of the plurality of armatures. Further, the first rotor has a plurality of magnetic poles formed so as to extend each in a second predetermined direction along a virtual second cylinder outer peripheral surface which is coaxial with the rotation axis of the first rotor from one end side of the second cylinder outer peripheral surface to the other end side thereof and so as to be arranged in the circumferential direction with a gap to the plurality of armatures by a plurality of the magnets provided in the first rotor, the plurality of magnetic poles adjacent to each other in the circumferential direction being different in polarity from each other. Still further, the second rotor has a plurality of soft magnetic materials provided in the second rotor so as to extend each in a third predetermined direction along a virtual third cylinder outer peripheral surface which is coaxial with the rotation axis of the first rotor from one end side of the third cylinder outer peripheral surface to the other end side thereof and so as to be arranged in the circumferential direction between the plurality of armatures and the plurality of magnetic poles. Moreover, electric angles $\theta s$, $\theta a$, and $\theta b$ are set so as to satisfy a relationship represented by $\theta s = 2 \cdot \theta b - \theta a$, where $\theta s$ is an electric angle between both end portions in the first predetermined direction of each of the armature magnetic poles generated by the plurality of armatures, $\theta a$ is an electric angle between both end portions in the second predetermined direction of each of the plurality of magnetic poles, and $\theta b$ is an electric angle between both end portions in the third predetermined direction of each of the plurality of soft magnetic materials. (Fifth invention)

According to the fifth invention, the stator, the first rotor, and the second rotor of the energy dispensing/synthesizing system are configured as described above, by which the energy dispensing/synthesizing system has the same function as the planetary gear unit as a differential gear as described with respect to a rotating machine 80 of the fourth embodiment described later. In this instance, the armature magnetic pole of the stator corresponds to one of the sun gear and the ring gear of the planetary gear unit, the first rotor corresponds to the other of the sun gear and the ring gear of the planetary gear unit, and the second rotor corresponds to the carrier of the planetary gear unit. Moreover, according to the fifth invention, it is possible to apply a compact and simple configuration to the energy dispensing/synthesizing system having the same function as the planetary gear unit as described above. Further, it is possible to effectively reduce torque ripple and cogging torque generated in the first rotor and the second rotor.

In the fifth invention, the three electric angles $\theta s$, $\theta a$, and $\theta b$ are set so that one of the electric angles $\theta s$ and $\theta a$ is greater than the electric angle $\theta b$ by an electric angle $\pi$ and so that one of the electric angles $\theta s$ and $\theta a$ is smaller than the electric angle $\theta b$ by the electric angle $\pi$ (Sixth invention). This enables the energy dispensing/synthesizing system to be appropriately operated.

In the third to sixth inventions described above, preferably the auxiliary device is connected to the second rotor as the second body of rotation (Seventh invention).

According to the seventh invention, it is possible to maintain the rotation direction of the second rotor corresponding to the carrier of the planetary gear unit to be one of the forward and reverse rotation directions in various driving states of the driven unit by appropriately setting the reduction ratio of the first power transmission path and the "m" value. Therefore, in various driving states of the driven unit, it is possible to maintain the direction of the power transmitted from the second rotor to the auxiliary device to be a direction appropriate for driving the auxiliary device and therefore to provide situations enabling the auxiliary device to be driven as many as possible.

In the first to seventh inventions, preferably the power unit further includes a brake mechanism selectively operable between a fifth operating state in which the rotation of the first body of rotation of the two bodies of rotation of the energy dispensing/synthesizing system is inhibited or braked and a sixth operating state in which the inhibition or braking of the rotation is released (Eighth invention).

According to the eighth invention, for example, in the case where the brake mechanism is placed in the fifth operating state with the operation of the prime mover stopped in a state where the first power transmission system is placed in the first operating state and the second power transmission system is placed in the fourth operating state, a large part of the electric energy input to the electric element of the energy dispensing/synthesizing system is able to be converted to rotational energy of the second body of rotation. Consequently, sufficient power is able to be transmitted from the second body of rotation of the energy dispensing/synthesizing system to the driven unit via the first power transmission path. Therefore, the driven unit is able to be driven only with the electric energy input to the electric element of the energy dispensing/synthesizing system. Further, it is possible to drive the auxiliary device by transmitting a part of the electric energy input to the electric element of the energy dispensing/synthesizing system also to the auxiliary device via the second body of rotation.

Moreover, if the prime mover is, for example, a heat engine, the fifth operating state of the brake mechanism is able to prevent the output shaft of the heat engine from rotating in the reverse direction to the rotation direction in the normal operation. Further, for example, if the second power transmission system is placed in the third operating state with the driven unit driven by the electric energy input to the electric element of the energy dispensing/synthesizing system as described above in the case where the prime mover is a heat engine, the heat engine is able to be started by transmitting a part of the electric energy input to the electric element of the energy dispensing/synthesizing system to the output shaft of the prime mover (heat engine) via the second power transmission path.

Further, in the first to eighth inventions, preferably the power unit includes a forward/reverse rotation switching mechanism selectively operable between a seventh operating state in which the rotation direction of the driven unit, which rotates by the power transmitted to the driven unit via the first power transmission path from the second body of rotation of the two bodies of rotation of the energy dispensing/synthesizing system, is one of the two, that is, forward and reverse rotation directions and an eighth rotating state in which the rotation direction of the driven unit is the other rotation direction of the two rotation directions (Ninth invention).

According to the ninth invention, in the state where the first power transmission system is placed in the first operating state and the second power transmission system is placed in the fourth operating state, even if the rotation direction of the second body of rotation of the energy dispensing/synthesizing system is limited to one direction, it is possible to change the direction of the power transmitted from the second body of rotation to the driven unit via the first power transmission path by switching the operating state of the forward/reverse rotation switching mechanism between the seventh operating state and the eighth operating state. Therefore, the driven unit is able to be driven in either of the forward and reverse rotation directions with the rotation direction of the second body of rotation of the energy dispensing/synthesizing system maintained in one direction. Therefore, even if the driven unit is driven in either of the forward and reverse rotation directions, the auxiliary device is able to be driven by transmitting a part of the power from the second body of rotation of the energy dispensing/synthesizing system to the auxiliary device. Moreover, the rotation direction of the second body of rotation of the energy dispensing/synthesizing system is able to be limited to one direction, thereby preventing the operation mode of the power unit of the present invention from being complicated.

In the ninth invention, the forward/reverse rotation switching mechanism includes: for example, a planetary gear unit, which has a sun gear, a ring gear, and a carrier rotatably supporting a pinion gear meshed with the sun gear and the ring gear, in which one of the sun gear and the ring gear is connected to the second body of rotation of the energy dispensing/synthesizing system and the other of the sun gear and the ring gear is connected to the driven unit; a first locking mechanism selectively operable between a ninth operating state in which the carrier is non-rotatably locked and a 10th operating state in which the lock is released; and a first clutch mechanism selectively operable between an 11th operating state in which the carrier is integrally and rotatably connected to one of the sun gear and the ring gear and a 12th operating state in which the connection is released; the forward/reverse rotation switching mechanism has a state in which the first locking mechanism and the first clutch mechanism are placed in the 10th operating state and the 11th operating state, respectively, as one of the seventh operating state and the eighth operating state; and the forward/reverse rotation switching mechanism has a state in which the first locking mechanism and the first clutch mechanism are placed in the ninth operating state and the 12th operating state, respectively, as the other of the seventh operating state and the eighth operating state (10th invention).

According to the 10th invention, the forward/reverse rotation switching mechanism is configured as described above and therefore the carrier of the planetary gear unit is allowed to rotate and is rotatable integrally with the sun gear and the ring gear in the state where the first locking mechanism and the first clutch mechanism are placed in the 10th operating state and the 11th operating state, respectively. Therefore, it is possible to perform power transmission between the second body of rotation of the energy dispensing/synthesizing system and the driven unit via the first power transmission path. In this instance, if the second body of rotation of the energy dispensing/synthesizing system is rotatably driven in one predetermined direction, the sun gear and the ring gear rotate in the same direction (hereinafter, the rotation direction is referred to as the first rotation direction in this section).

Further, in the state where the first locking mechanism and the first clutch mechanism are placed in the ninth operating state and the 12th operating state, respectively, the sun gear and the ring gear are rotatable in the reverse direction to each other with the carrier of the planetary gear unit non-rotatably locked. Therefore, it is possible to perform power transmission between the second body of rotation of the energy dispensing/synthesizing system and the driven unit via the first power transmission path. In this case, the rotation direction of one of the sun gear and the ring gear in the case where the second body of rotation of the energy dispensing/synthesizing system is rotationally driven in the predetermined direction is the same as the first rotation direction, while the rotation direction of the other of the sun gear and the ring gear is reverse to the first rotation direction.

Therefore, the state where the first locking mechanism and the first clutch mechanism are placed in the 10th operating state and the 11th operating state, respectively, functions as one of the seventh operating state and the eighth operating state of the forward/reverse rotation switching mechanism. Moreover, the state where the first locking mechanism and the first clutch mechanism are placed in the 9th operating state and the 12th operating state, respectively, functions as the other of the seventh operating state and the eighth operating state.

In the above 10th invention, the combination of the operating states of the first locking mechanism and the first clutch mechanism enables the forward/reverse rotation switching mechanism to have a function of the first power transmission system. Specifically, in the 10th invention, the forward/reverse rotation switching mechanism serves as the first power transmission system. The forward/reverse rotation switching mechanism is able to have a state in which the first locking mechanism and the first clutch mechanism are placed in the 10th operating state and the 11th operating state, respectively, or a state in which the first locking mechanism and the first clutch mechanism are placed in the ninth operating state and the 12th operating state, respectively, as the first operating state, and the forward/reverse rotation switching mechanism is able to have a state in which the first locking mechanism and the first clutch mechanism are placed in the 10th operating state and the 12th operating state, respectively, as the second operating state (11th invention).

According to the 11th invention, in the state in which the first locking mechanism and the first clutch mechanism are placed in the 10th operating state and the 11th operating state, respectively, or the state in which the first locking mechanism and the first clutch mechanism are placed in the 9th operating state and the 12th operating state, respectively, it is possible to perform power transmission between the second body of rotation of the energy dispensing/synthesizing system and the driven unit via the first power transmission path as described with respect to the seventh invention. Therefore, these states function as the first operating state of the first power transmission system.

Further, in the state in which the first locking mechanism and the first clutch mechanism are placed in the 10th operating state and the 12 operating state, respectively, the carrier of the planetary gear unit is freely rotatable (a state in which almost no power acts on the carrier) and therefore the power transmission between the sun gear and the ring gear of the planetary gear unit is substantially disconnected. Consequently, the power transmission in the first power transmission path is disconnected in the planetary gear unit. Therefore, this state functions as the second operating state of the first power transmission system.

In this manner, the forward/reverse rotation switching mechanism is provided with the function of the first power transmission system, thereby enabling a reduction in the number of parts of the components of the first power transmission path to simplify the configuration of the first power transmission path.

Further, in the first to 11th inventions, preferably the power unit includes a second locking mechanism selectively operable between a 13th operating state in which the second body of rotation of the energy dispensing/synthesizing system is non-rotatably locked and a 14th operating state in which the lock is released (12th invention).

According to the 12th invention, for example, in the rotation stopped state of the driven unit, the second locking mechanism is placed in the 14th operating state, by which sufficient energy is able to be transmitted between the electric element of the energy dispensing/synthesizing system and the first body of rotation (energy conversion between the electric energy input or output to or from the electric element and the rotational energy of the first body of rotation). Therefore, for example, if the prime mover is a heat engine, the heat engine is able to be started by efficiently transmitting the electric energy input to the electric element of the energy dispensing/synthesizing system to the output shaft of the prime mover (heat engine) via the first body of rotation with the rotation of the driven unit stopped. Moreover, the power (rotational energy) transmitted from the prime mover to the first body of rotation of the energy dispensing/synthesizing system is able to be efficiently converted to electric energy and then output from the electric element, with the rotation of the driven unit stopped.

In the 10th or 11th invention including the forward/reverse rotation switching mechanism which has the planetary gear unit, the first locking mechanism, and the first clutch mechanism, the forward/reverse rotation switching mechanism may be provided with the function of the second locking mechanism in the ninth invention. Specifically, in this case, the forward/reverse rotation switching mechanism has a state in which the first locking mechanism and the first clutch mechanism are placed in the ninth operating state and the 11th operating state, respectively, as the operating state in which the second body of rotation of the energy dispensing/synthesizing system is non-rotatably locked (13th invention).

According to the 13th invention, in the state in which the first locking mechanism and the first clutch mechanism are placed in the ninth operating state and the 11th operating state, respectively, all of the sun gear, the ring gear, and the carrier of the planetary gear unit are non-rotatably locked. Therefore, it is also possible to non-rotatably lock the second body of rotation of the energy dispensing/synthesizing system connected to the sun gear or the ring gear. Moreover, in the case where the first locking mechanism is placed in the 10th operating state or the first clutch mechanism is placed in the 12th operating state, the lock is released. Therefore, the forward/reverse rotation switching mechanism is able to have the function of the second locking mechanism.

The provision of the function of the second locking mechanism to the forward/reverse rotation switching mechanism enables a reduction in the number of parts of the components of the first power transmission path to simplify the configuration of the first power transmission path.

DETAILED DESCRIPTION OF THE PREFERRED EMBODIMENTS

First Embodiment

A first embodiment of the present invention will be described with reference to FIGS. 1 to 12.

First, referring to FIGS. 1 and 2, the configuration of a power unit 1 according to this embodiment will be described.

Figure 1:
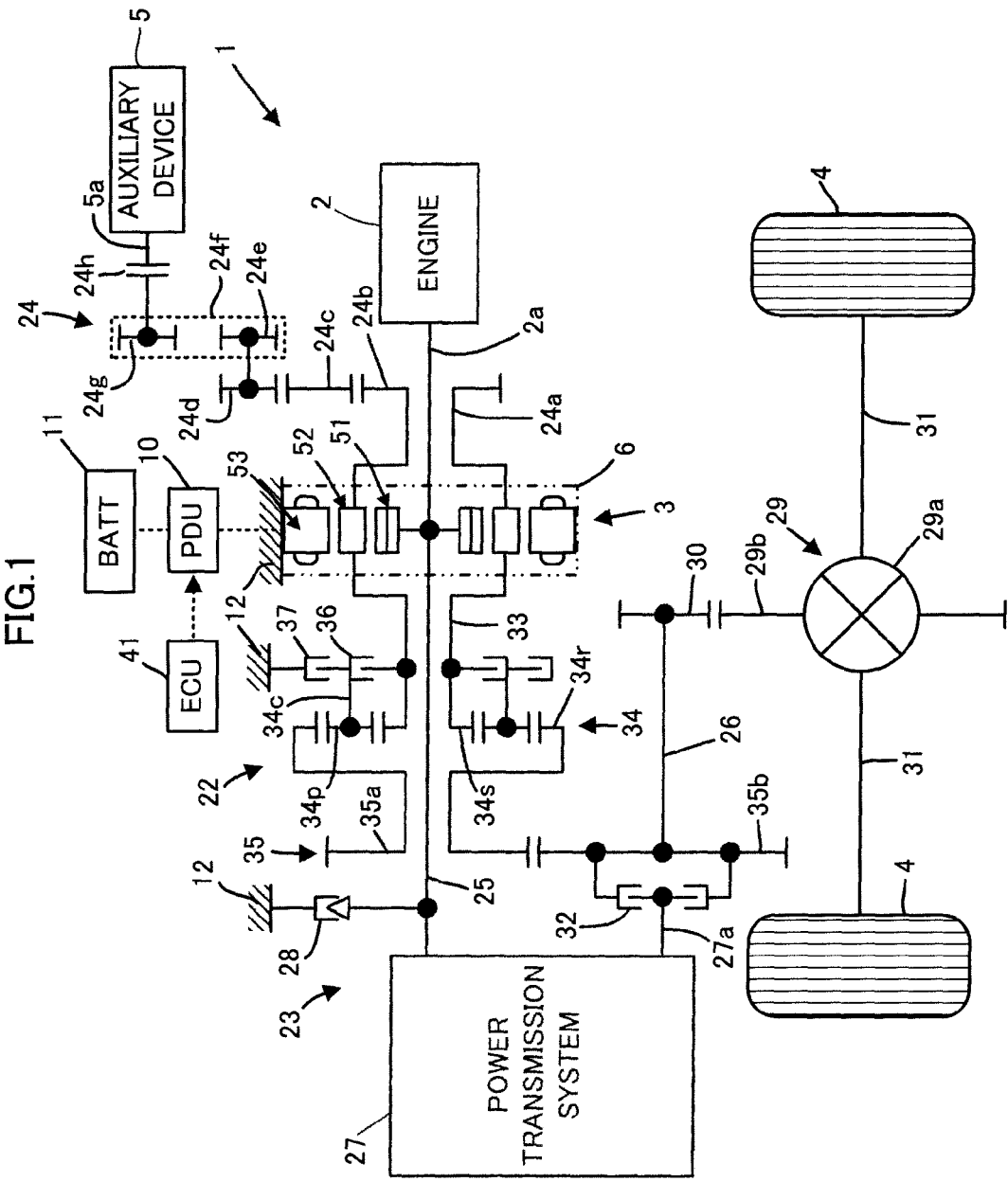
FIG. 1 is a diagram schematically illustrating the general configuration of a vehicle having a power unit 1 according to a first embodiment of the present invention.

Referring to FIG. 1, the power unit 1 according to this embodiment is a power unit mounted on a hybrid vehicle, having an engine 2 and a rotating machine 3 as power generation sources. Further, the power unit 1 is adapted to be capable of driving a pair of driving wheels 4, 4 by transmitting power of the engine 2 or the rotating machine 3 to the driving wheels 4, 4. In addition, the power unit 1 is adapted to be capable of driving an auxiliary device 5 mounted on the vehicle by transmitting the power of the engine 2 or the rotating machine 3 to the auxiliary device 5 as well as the driving wheels 4, 4. The auxiliary device 5 is, for example, an air conditioner compressor, a water pump, an oil pump, or the like.

In this embodiment, the engine 2 and the rotating machine 3 correspond to a prime mover and an energy dispensing/synthesizing system in the present invention, respectively. Moreover, the driving wheels 4 correspond to a driven unit in the present invention.

The engine 2 is an internal combustion engine which generates power (torque) by burning fuel such as gasoline, diesel oil, alcohol, or the like, having an output shaft (crank shaft) 2a for outputting the generated power to the outside. Similarly to a normal vehicle engine, the engine 2 adjusts power which the engine 2 outputs via the output shaft 2a by controlling an opening degree of a throttle valve provided in an intake channel which is not shown (controlling an intake air amount of the engine 2).

While the details of the rotating machine 3 will be described later, the rotating machine 3 coaxially includes a first rotor 51 and a second rotor 52 as two bodies of rotation rotatably supported in a housing 6 of the rotating machine 3. The housing 6 of the rotating machine 3 is provided in a fixed manner to an immovable part 12 immovable relative to a vehicle body such as an outer case of the power unit 1.

The rotating machine 3 is capable of causing the first rotor 51 and the second rotor 52 to generate power (torque) as described later by the operation control of an electronic control unit 41 (hereinafter referred to as the ECU 41) which performs operation control of the power unit 1. Further, in this embodiment, one of the first rotor 51 and the second rotor 52 of the rotating machine 3, for example, the first rotor 51 is connected to the output shaft 2a of the engine 2 so as to rotate in conjunction with the output shaft 2a.

More specifically, in this embodiment, the first rotor 51 is inserted onto and attached coaxially with a first rotating shaft 25 which is coaxially connected to the output shaft 2a so as to rotate integrally with the output shaft 2a of the engine 2. Thereby, the first rotor 51 is connected to the output shaft 2a of the engine 2 via the first rotating shaft 25 so as to rotate integrally with the output shaft 2a of the engine 2.

Alternatively, the output shaft 2a of the engine 2 may be connected to the first rotor 51 of the rotating machine 3 via a reduction gear so that the output shaft 2a and the first rotor 51 rotate in conjunction with each other at rotational speeds different from each other. The first rotor 51 and the second rotor 52 correspond to a first body of rotation and a second body of rotation in the present invention, respectively.

The ECU 41, which is an electronic circuit unit including a CPU, a RAM, a ROM, an interface circuit, and the like, controls the operation of the power unit 1 by performing control processing specified by a previously implemented program. In this case, the functions implemented by the control processing of the ECU 41 includes a function of controlling the operation of the rotating machine 3, a function of controlling the operation of the engine 2 via an engine control actuator such as a throttle valve actuator which is not shown, a function of controlling the operations of first to third clutches 32, 36, and 37 and an auxiliary device clutch 24g described later via an actuator or drive circuit which is not shown, and a function of controlling the gear shifting operations of a CVT 27c (continuously variable transmission) described later via an actuator which is not shown.

The power unit 1 includes, as mechanical elements for driving the driving wheels 4, 4 and the auxiliary device 5 by the engine 2 or the rotating machine 3, a first power transmission path 22 and a second power transmission path 23 for use in performing power transmission between the engine 2 or the rotating machine 3 and the driving wheels 4, 4, and an auxiliary device power transmission path 24 for use in performing power transmission between the engine 2 or the rotating machine 3 and the auxiliary device 5.

The second power transmission path 23 connects the output shaft 2a of the engine 2 and the second rotor 52 of the rotating machine 3 to the driving wheels 4, 4 so that power is able to be transmitted between the output shaft 2a of the engine 2 or the first rotor 51 of the rotating machine 3 and the driving wheels 4, 4 bypassing (not via) a planetary gear unit 34 of the first power transmission path 22 whose details will be described later. The second power transmission path 23 includes a first rotating shaft 25, a second rotating shaft 26 provided so as to rotate in conjunction with the driving wheels 4, 4, and a power transmission system 27 which transmits power between the first rotating shaft 25 and the second rotating shaft 26.

The first rotating shaft 25 extends passing through the shaft portion of the rotating machine 3 (the shaft portion of the first rotor 51). Further, the first rotating shaft 25 is connected to the immovable part 12 via a one-way clutch 28. When the first rotating shaft 25 is going to rotate in the same rotation direction (hereinafter, referred to as the forward rotation direction) as the rotation direction of the output shaft 2a during operation of the engine 2, the one-way clutch 28 is automatically brought into the operating state for allowing the first rotating shaft 25 to rotate in the forward rotation direction by releasing the first rotating shaft 25 from the immovable part 12. Further, when the first rotating shaft 25 is going to rotate in the reverse direction (hereinafter, referred to as the reverse rotation direction) to the forward rotation direction, the one-way clutch 28 is automatically brought into the operating state for inhibiting the first rotating shaft 25 to rotate in the reverse direction by binding (latching) the first rotating shaft 25 to the immovable part 12.

In this embodiment, the first rotating shaft 25 is provided integrally with the output shaft 2a of the engine 2 and the first rotor 51 of the rotating machine 3 and therefore, if the one-way clutch 28 is brought into the operating state for inhibiting the rotation of the first rotating shaft 25, the output shaft 2a of the engine 2 and the first rotor 51 of the rotating machine 3 are also inhibited to rotate. If the one-way clutch 28 is brought into the operating state for allowing the rotation of the first rotating shaft 25, the rotation of the output shaft 2a of the engine 2 and the first rotor 51 of the rotating machine 3 are released from the inhibition.

Therefore, in this embodiment, the one-way clutch 28 corresponds to a brake mechanism in the present invention. In this case, the operating state of the one-way clutch 28 for inhibiting the rotation of the first rotating shaft 25 corresponds to a fifth operating state in the present invention, and the operating state of the one-way clutch 28 for allowing the rotation of the first rotating shaft 25 corresponds to a sixth operating state in the present invention.

The second rotating shaft 26 is disposed in parallel with the first rotating shaft 25 and is connected to the driving wheels 4, 4 via a differential gear unit 29 between the driving wheels 4, 4. More specifically, the differential gear unit 29 includes a gear case 29a containing a side gear, which is not shown, connected to the driving wheels 4, 4 respectively via axles 31, 31 and a gear 29b fixed to the outer periphery of the gear case 29a. In addition, the gear 29b of the differential gear unit 29 is meshed with a gear 30 fixed to one end of the second rotating shaft 26. Thereby, the second rotating shaft 26 is connected to the driving wheels 4, 4 via the differential gear unit 29 so as to rotate in conjunction with the driving wheels 4, 4.

The power transmission system 27 has a third rotating shaft 27a coaxially connected to the second rotating shaft 26 via a first clutch 32 and connects the third rotating shaft 27a to the first rotating shaft 25 so that the third rotating shaft 27a and the first rotating shaft 25 rotate in conjunction with each other. FIG. 2 shows the configuration of the power transmission system 27.

Figure 2:
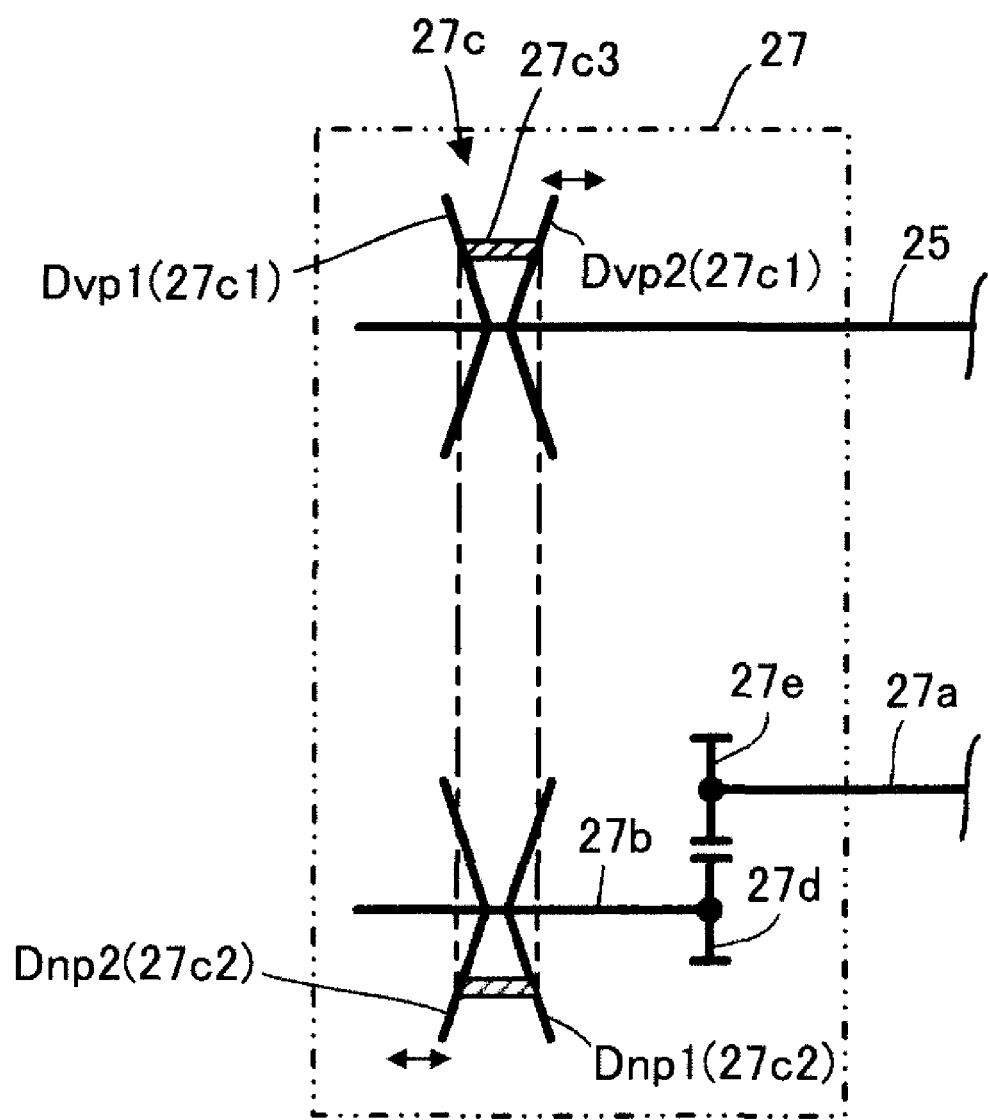
FIG. 2 is a diagram schematically illustrating the configuration of a power transmission system 27 included in the power unit 1 according to the first embodiment.

As shown in FIG. 2, in this embodiment, the power transmission system 27 includes a rotatable driven shaft 27b disposed in parallel with the first rotating shaft 25, a CVT (continuously variable transmission) 27c as a change gear connecting the driven shaft 27b to the first rotating shaft 25, and a pair of gears 27d and 27e meshed with each other and respectively fixed to the driven shaft 27b and the third rotating shaft 27a.

The CVT 27c has a well-known structure and includes a drive pulley 27c1 attached to the first rotating shaft 25 so as to rotate integrally with the first rotating shaft 25, a driven pulley 27c2 attached to the driven shaft 27b so as to rotate integrally with the driven shaft 27b, and an endless belt 27c3 wound around the drive pulley 27c1 and the driven pulley 27c2. The drive pulley 27c1 is formed of a drive-side fixed pulley half body Dvp1 fixed to the first rotating shaft 25 and a drive-side movable pulley half body Dvp2 supported by the first rotating shaft 25 so as to slide in the central axis direction of the first rotating shaft 25 by means of an actuator which is not shown. Similarly, the driven pulley 27c2 is formed of a driven-side fixed pulley half body Dnp1 fixed to the driven shaft 27b and a driven-side movable pulley half body Dnp2 supported by the driven shaft 27b so as to slide in the central axis direction of the driven shaft 27b by means of an actuator which is not shown. Further, the movements of the drive-side movable pulley half body Dvp2 and the driven-side movable pulley half body Dnp2 in the central axis direction by the actuators, which are not shown, continuously vary the effective diameter of the endless belt 27c3 in each of the drive pulley 27c1 and the driven pulley 27c2. This makes a reduction ratio between the drive pulley 27c1 and the driven pulley 27c2 continuously (steplessly) variable. It is then possible to continuously vary the reduction ratio (change gear ratio) between the first rotating shaft 25 and the third rotating shaft 27a.

The power transmission system 27 according to this embodiment is configured as described above and therefore performs power transmission between the first rotating shaft 25 and the third rotating shaft 27a so that the first rotating shaft 25 rotates in the reverse direction to the rotation direction of the third rotating shaft 27a.

Returning to the description of FIG. 1, the first clutch 32 is a clutch mechanism which operates to connect or disconnect between the second rotating shaft 26 and the third rotating shaft 27a (a clutch mechanism selectively operable between the connected state and the disconnected state) under the control of the ECU 41. In this case, if the first clutch 32 is placed in the connected state, the second rotating shaft 26 is connected to the third rotating shaft 27a via the first clutch 32 so as to rotate integrally with each other. In this state, power transmission is enabled between the second rotating shaft 26 and the third rotating shaft 27a. If the first clutch 32 is placed in the disconnected state, the connection between the second rotating shaft 26 and the third rotating shaft 27a via the first clutch 32 is released. In this state, the power transmission between the second rotating shaft 26 and the third rotating shaft 27a is disconnected.

The second power transmission path 23 configured as described above connects the output shaft 2a of the engine 2 and the first rotor 51 of the rotating machine 3 to the driving wheels 4, 4 via the first rotating shaft 25, the power transmission system 27 (including the third rotating shaft 27a), the first clutch 32, the second rotating shaft 26, the gear 30, the differential gear unit 29 (including the gear 29b), and the axles 31, 31. In the second power transmission path 23, the first clutch 32 placed in the connected state enables power transmission between the output shaft 2a of the engine 2 or the first rotor 51 of the rotating machine 3 and the driving wheels 4, 4 (power transmission bypassing the planetary gear unit 34 described later), by which the output shaft 2a of the engine 2 and the first rotor 51 of the rotating machine 3 are connected to the driving wheels 4, 4 so as to rotate in conjunction with each other. In the connected state of the first clutch 32, the rotation direction of the driving wheels 4, 4 during forward rotation of the output shaft 2a of the engine 2 is the same as the advance direction of the vehicle.

If the first clutch 32 is placed in the disconnected state, the power transmission between the output shaft 2a of the engine 2 and the first rotor 51 of the rotating machine 3 and the driving wheels 4, 4 through the second power transmission path 23 is disconnected at the first clutch 32.

Additionally, the first clutch 32 provided in the second power transmission path 23 corresponds to a second power transmission system in the present invention. In this case, the connected state of the first clutch 32 corresponds to a third operating state in the present invention and the disconnected state of the first clutch 32 corresponds to a fourth operating state in the present invention.

The first power transmission path 22 connects the second rotor 52 of the rotating machine 3 to the driving wheels 4, 4 so as to enable power transmission between the second rotor 52 and the driving wheels 4, 4. In this condition, in this embodiment, the first power transmission path 22 has a portion on the driving wheels 4, 4 side from the first clutch 32 in the second power transmission path 23, that is, a portion formed of the second rotating shaft 26, the gear 30, the differential gear unit 29, and the axles 31, 31 as a power transmission path shared with the second power transmission path 23 (hereinafter, in some cases, referred to as the shared power transmission path). A portion other than the shared power transmission path in the first power transmission path 22 is a power transmission path different from the second power transmission path 23.

The portion other than the shared power transmission path in the first power transmission path 22 includes the planetary gear unit 34 with one rotating element connected to the second rotor 52 of the rotating machine 3 and a power transmission system 35 connecting another rotating element of the planetary gear unit 34 to the second rotating shaft 26.

The planetary gear unit 34 is a single-pinion type planetary gear unit in this embodiment and is coaxially provided with a sun gear 34s, a ring gear 34r, and a carrier 34c, which rotatably supports a plurality of pinion gears 34p meshed with the gears 34s and 34r between the sun gear 34s and the ring gear 34r, as three rotating elements. These three rotating elements 34s, 34r, and 34c are able to transmit power between each other and rotate while maintaining the relationship between their respective numbers of rotations (rotational speeds) at a certain collinear relationship as is well known.

The planetary gear unit 34 is disposed coaxially with the second rotor 52 of the rotating machine 3 on the opposite side to the engine 2 of both sides in the central axis direction of the rotating machine 3 (between the rotating machine 3 and the power transmission system 27). Then, one of the sun gear 34s and the ring gear 34r of the planetary gear unit 34, for example, the sun gear 34s is connected to the second rotor 52 of the rotating machine 3 so as to rotate integrally with the second rotor 52. More specifically, a cylindrical fourth rotating shaft 33, which is coaxially inserted onto the first rotating shaft 25 so as to rotate relative to the first rotating shaft 25, is provided between the sun gear 34s and the rotating machine 3, with one end of the fourth rotating shaft 33 fixed to the sun gear 34s and the other end fixed to the second rotor 52 of the rotating machine 3. Thereby, the sun gear 34s is connected to the second rotor 52 via the fourth rotating shaft 33 so as to rotate integrally with the second rotor 52 of the rotating machine 3.

Alternatively, the second rotor 52 of the rotating machine 3 may be connected to the sun gear 34s of the planetary gear unit 34 via a reduction gear so that the second rotor 52 and the sun gear 34s rotate in conjunction with each other at rotational speeds different from each other.

Moreover, the carrier 34c of the planetary gear unit 34 is connected to one of the sun gear 34s and the ring gear 34r, for example, the sun gear 34s via a second clutch 36 and is connected to the immovable part 12 via a third clutch 37.

The second clutch 36 is a clutch mechanism which operates to connect or disconnect between the carrier 34c and the sun gear 34s (a clutch mechanism selectively operable between the connected state and the disconnected state) under the control of the ECU 41. In this case, if the second clutch 36 is placed in the connected state, the carrier 34c is connected to the sun gear 34s via the second clutch 36 so as to rotate integrally with each other (at the same rotational speed). If the second clutch 36 is placed in the disconnected state, the connection between the carrier 34c and the sun gear 34s is released. In this state, the carrier 34c and the sun gear 34s are able to rotate at rotational speeds different from each other.

Moreover, the third clutch 37 is a clutch mechanism which operates to connect or disconnect between the carrier 34c and the immovable part 12 (a clutch mechanism selectively operable between the connected state and the disconnected state) under the control of the ECU 41. In this case, if the third clutch 37 is placed in the connected state, the carrier 34c is bound to the immovable part 12 via the third clutch 37 and locked non-rotatably. If the third clutch 37 is placed in the disconnected state, the carrier 34c is released from the immovable part 12 so as to be rotatable. Therefore, the third clutch 37 functions as a locking mechanism which locks the carrier 34c non-rotatably in the connected state.

In this embodiment, the operation mode of the planetary gear unit 34 is defined according to the combination of the operating states of the second clutch 36 and the third clutch 37.

Specifically, if the second clutch 36 is placed in the connected state and the third clutch 37 is placed in the disconnected state, three rotating elements 34s, 34r, and 34c of the planetary gear unit 34 are rotatable integrally with each other (at the same rotational speed). Hereinafter, this operation mode of the planetary gear unit 34 will be referred to as the integral rotation mode.

Further, if the second clutch 36 is placed in the disconnected state and the third clutch 37 is placed in the connected state, the carrier 34c is non-rotatable and the sun gear 34s and the ring gear 34r are rotatable in conjunction with each other and in the reverse direction to each other. Hereinafter, the operation mode of the planetary gear unit 34 is referred to as the reverse rotation mode.

Still further, if both of the second clutch 36 and the third clutch 37 are placed in the disconnected state, the carrier 34c is put in an unloaded state in which the carrier 34c is freely rotatable (a state in which torque applicable to the carrier 34c is maintained at "0" or almost "0") and therefore the power transmission by the planetary gear unit 34 is substantially disconnected. Hereinafter, this operation mode of the planetary gear unit 34 is referred to as the power transmission disabled mode.

Moreover, if both of the second clutch 36 and the third clutch 37 are placed in the connected state, all of the three rotating elements 34s, 34r, and 34c of the planetary gear unit 34 are non-rotatable (rotation stopped state). Hereinafter, this operation mode of the planetary gear unit 34 is referred to as the non-rotatable mode.

The power transmission system 35 connects the ring gear 34r of the planetary gear unit 34 and the second rotating shaft 26 so as to rotate in conjunction with each other. In this embodiment, the power transmission system 35 has a certain reduction ratio and is formed of a pair of gears 35a and 35b meshed with each other. In this case, the gear 35a is coaxially inserted onto the first rotating shaft 25 so as to be rotatable relative to the first rotating shaft 25 and is connected to the ring gear 34r so as to be rotatable integrally with the ring gear 34r of the planetary gear unit 34. Moreover, the gear 35b is coaxially fixed to the second rotating shaft 26 so as to rotate integrally with the second rotating shaft 26.

The first power transmission path 22 configured as described above connects the second rotor 52 of the rotating machine 3 to the driving wheels 4, 4 via the fourth rotating shaft 33, the planetary gear unit 34, the power transmission system 35, and the shared power transmission path.

In the first power transmission path 22, if the second clutch 36 is placed in the connected state and the third clutch 37 is placed in the disconnected state (if the operation mode of the planetary gear unit 34 is set to the integral rotation mode) or if the second clutch 36 is placed in the disconnected state and the third clutch 37 is placed in the connected state (if the operation mode of the planetary gear unit 34 is set to the reverse rotation mode), the second rotor 52 of the rotating machine 3 and the driving wheels 4, 4 are connected so as to rotate in conjunction with each other. In these states, power transmission is permitted between the second rotor 52 and the driving wheels 4, 4.

If the operation mode of the planetary gear unit 34 is the integral rotation mode, all of the rotation directions of the three rotating elements 34s, 34r, and 34c of the planetary gear unit 34 are always the same as the rotation direction of the second rotor 52 of the rotating machine 3. Therefore, in this case, if the second rotor 52 of the rotating machine 3 is rotationally driven in the forward rotation direction (in the same direction as the rotation direction of the output shaft 2a during operation of the engine 2), power is transmitted from the second rotor 52 to the driving wheels 4, 4 via the first power transmission path 22 so that the rotation direction of the driving wheels 4, 4 matches the rotation direction in which the vehicle is advanced out of the two rotation directions (forward and backward rotation directions): the rotation direction in which the vehicle is advanced and the rotation direction in which the vehicle is reversed. On the other hand, if the operation mode of the planetary gear unit 34 is the reverse rotation mode, the rotation direction of the sun gear 34s of the planetary gear unit 34 (=the rotation direction of the second rotor 52 of the rotating machine 3) is always reverse to the rotation direction of the ring gear 34r. Therefore, if the second rotor 52 of the rotating machine 3 is rotationally driven in the forward rotation direction in the reverse rotation mode, power is transmitted from the second rotor 52 to the driving wheels 4, 4 via the first power transmission path 22 so that the rotation direction of the driving wheels 4, 4 is the rotation direction in which the vehicle is reversed. Therefore, in either of the cases where the operation mode of the planetary gear unit 34 is the integral rotation mode and where the operation mode is the reverse rotation mode, the rotation direction of the second rotor 52 on vehicle driving is always the forward rotation direction. Further, in this embodiment, the planetary gear unit 34 provided in the second power transmission path 23 has a function as a power transmission element for advancing the vehicle by the setting of the operation mode of the planetary gear unit 34 to the integral rotation mode. Moreover, the planetary gear unit 34 has a function as a power transmission element for reversing the vehicle by the setting of the operation mode of the planetary gear unit 34 to the reverse rotation mode.

If both of the second clutch 36 and the third clutch 37 are placed in the disconnected state (if the operation mode of the planetary gear unit 34 is set to the power transmission disabled mode), the power transmission via the planetary gear unit 34 is substantially disabled. Therefore, the power transmission between the second rotor 52 of the rotating machine 3 and the driving wheels 4, 4 in the second power transmission path 23 is disconnected at the planetary gear unit 34.

Further, if both of the second clutch 36 and the third clutch 37 are placed in the connected state (if the operation mode of the planetary gear unit 34 is set to the non-rotatable mode), all of the three rotating elements 34s, 34r, and 34c of the planetary gear unit 34 are constantly non-rotatable. On this account, the second rotor 52 of the rotating machine 3, the fourth rotating shaft 33, the second rotating shaft 26, and the driving wheels 4, 4 are constantly non-rotatable (maintained in the rotation stopped state). Therefore, the setting of the operation mode of the planetary gear unit 34 to the non-rotatable mode is enabled only in the vehicle stop state.

Additionally, in this embodiment, the combination of the planetary gear unit 34, the second clutch 36, and the third clutch 37 embodies a forward/reverse rotation switching mechanism in the present invention. In this instance, the second clutch 36 corresponds to a first clutch mechanism in the present invention and the third clutch 37 corresponds to a first locking mechanism in the present invention. Further, the connected state and the disconnected state of the second clutch 36 correspond to a 11th operating state and a 12th operating state of the first clutch mechanism in the present invention, respectively. The connected state and the disconnected state of the third clutch 37 correspond to a ninth operating state and a 10th operating state of the first locking mechanism in the present invention, respectively. Still further, one of the operating state of the planetary gear unit 34 in the case where the second clutch 36 and the third clutch 37 are placed in the connected state and the disconnected state, respectively (the operating state in the integral rotation mode) and the operating state of the planetary gear unit 34 in the case where the second clutch 36 and the third clutch 37 are placed in the disconnected state and the connected state, respectively (the operating state in the reverse rotation mode) corresponds to a seventh operating state of a forward/reverse rotation switching mechanism in the present invention and the other corresponds to an eighth operating state of the forward/reverse rotation switching mechanism in the present invention.

Further, in the forward/reverse rotation switching mechanism (the combination of the planetary gear unit 34, the second clutch 36, and the third clutch 37) in this embodiment, the power transmission via the second power transmission path 23 is disconnected by setting the operation mode of the planetary gear unit 34 to the power transmission disabled mode as described above. On this account, the forward/reverse rotation switching mechanism in this embodiment serves as a first power transmission system in the present invention. In this case, the operating state of the planetary gear unit 34 in the case where the second clutch 36 and the third clutch 37 are placed in the connected state and the disconnected state, respectively, (the operating state in the integral rotation mode) or the operating state of the planetary gear unit 34 in the case where the second clutch 36 and the third clutch 37 are placed in the disconnected state and the connected state, respectively, (the operating state in the reverse rotation mode) corresponds to a first operating state of the first power transmission system in the present invention. Moreover, the operating state of the planetary gear unit 34 in the case where both of the second clutch 36 and the third clutch 37 are placed in the disconnected state (the operating state in the power transmission disabled mode) corresponds to a second operating state of the first power transmission system in the present invention.

Further, in the forward/reverse rotation switching mechanism in this embodiment, the second rotor 52 of the rotating machine 3 corresponding to the second body of rotation of the energy dispensing/synthesizing system in the present invention is locked non-rotatably by setting the operation mode of the planetary gear unit 34 to the non-rotatable mode as described above. On this account, the forward/reverse rotation switching mechanism in this embodiment serves as a second locking mechanism in the present invention. In this case, the operating state of the planetary gear unit 34 in the case where both of the second clutch 36 and the third clutch 37 are placed in the connected state (the operating state in the non-rotatable mode) corresponds to a 13th operating state of the second locking mechanism in the present invention. Further, the operating state of the planetary gear unit 34 in the case where one or both of the second clutch 36 and the third clutch 37 are placed in the disconnected state (the operating state in the integral rotation mode, the reverse rotation mode, or the power transmission disabled mode) corresponds to a 14th operating state of the second locking mechanism in the present invention.

In this embodiment, the auxiliary device power transmission path 24 is a power transmission path for connecting the second rotor 52 which is different from the rotor (the first rotor 51) connected to the output shaft 2*a* of the engine 2 out of the first rotor 51 and the second rotor 52 of the rotating machine 3 to the auxiliary device 5 so as to enable power transmission between the rotor and the auxiliary device 5. In this embodiment, the auxiliary device power transmission path 24 includes a cylindrical auxiliary device driving rotating shaft 24*a* which extends so as to rotate integrally with the second rotor 52 of the rotating machine 3 on the engine 2 side from the second rotor 52, a first gear 24*b* coaxially fixed to the auxiliary device driving rotating shaft 24*a* between the rotating machine 3 and the engine 2, an idle gear 24*c* meshed with the first gear 24*b*, a second gear 24*d* meshed with the idle gear 24*c*, a third gear 24*e* coaxially connected to the second gear 24*d* and provided rotatably and integrally with the second gear 24*d*, and a fourth gear 24*g* connected to the third gear 24*e* via a belt 24*f* so as to rotate in conjunction with the third gear 24*e*. Then, the fourth gear 24*g* is coaxially connected to an input shaft 5*a* of the auxiliary device 5 via an auxiliary device clutch 24*h*. The auxiliary device driving rotating shaft 24*a* is coaxially inserted onto the first rotating shaft 25 and provided so as to be rotatable relative to the first rotating shaft 25.

The auxiliary device clutch 24*h* operates to connect or disconnect between the fourth gear 24*g* and the input shaft 5*a* of the auxiliary device 5 under the control of the ECU 41. In this case, the auxiliary device clutch 24*h* placed in the connected state connects the fourth gear 24*g* to the input shaft 5*a* of the auxiliary device 5 via the auxiliary device clutch 24*h* so that the fourth gear 24*h* and the input shaft 5*a* rotate integrally with each other. Further, the auxiliary device clutch 24*h* placed in the disconnected state releases the connection between the fourth gear 24*g* and the input shaft 5*a* of the auxiliary device 5 via the auxiliary device clutch 24*h*. In this state, the power transmission between the fourth gear 24*g* and the input shaft 5*a* of the auxiliary device 5 is disconnected.

The auxiliary device power transmission path 24 configured as described above connects the second rotor 52 of the rotating machine 3 to the auxiliary device 5 via the auxiliary device driving rotating shaft 24*a*, the first gear 24*b*, the idle gear 24*c*, the second gear 24*d*, the third gear 24*e*, the belt 24*f*, the fourth gear 24*g*, and the auxiliary device clutch 24*h*. In this auxiliary device power transmission path 24, the auxiliary device clutch 24*h* placed in the connected state enables the power transmission between the second rotor 52 of the rotating machine 3 and the input shaft 5*a* of the auxiliary device 5 and thereby rotates the second rotor 52 and the input shaft 5*a* in conjunction with each other. Consequently, power is enabled to be transmitted between the second rotor 52 of the rotating machine 3 and the auxiliary device 5 via the auxiliary device power transmission path 24.

Moreover, the auxiliary device clutch 24*h* placed in the disconnected state disconnects the power transmission between the second rotor 52 of the rotating machine 3 and the auxiliary device 5 via the auxiliary device power transmission path 24 at the auxiliary device clutch 24*h*.

Figure 3:
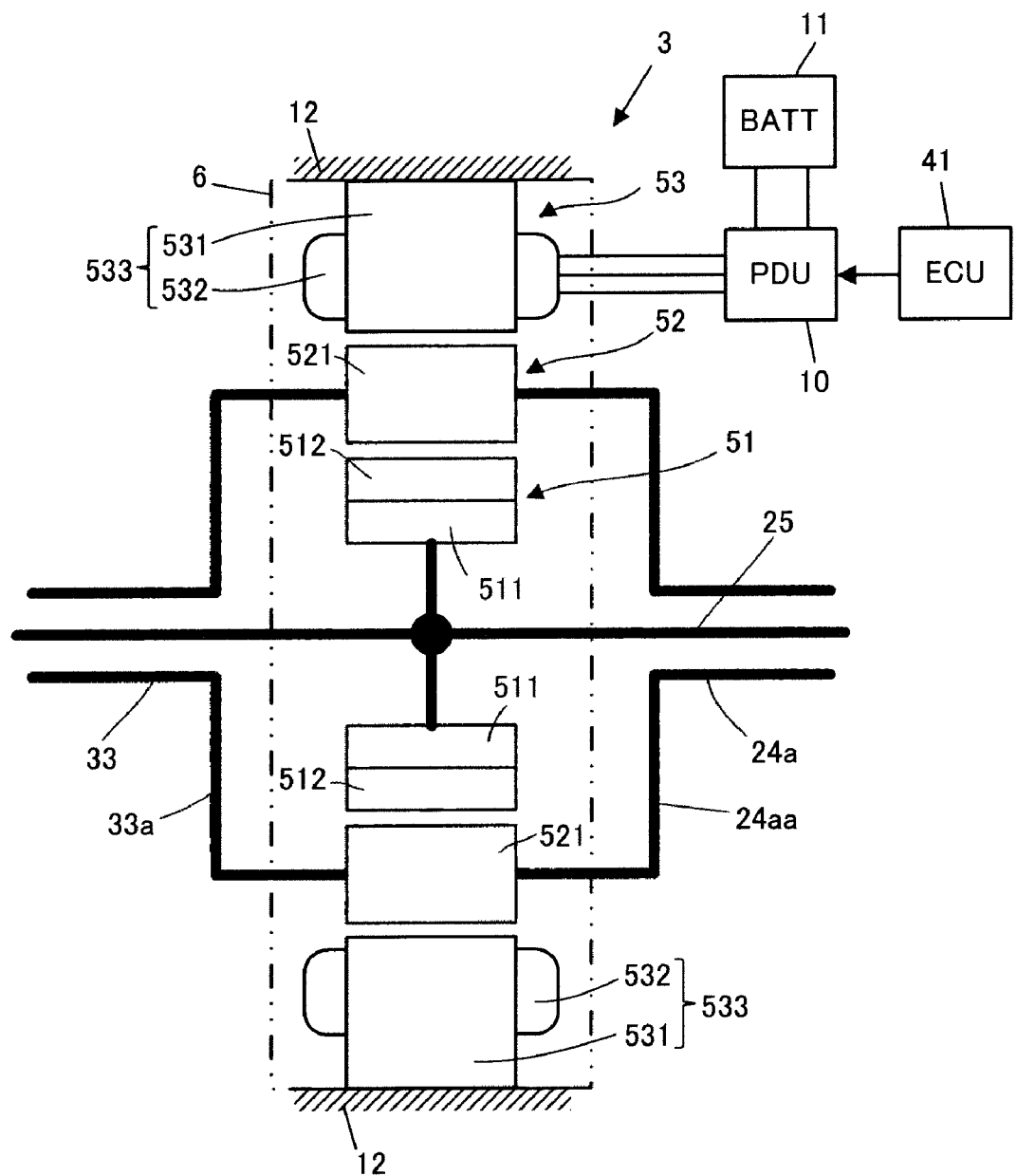
FIG. 3 is a diagram illustrating a schematic structure of a rotating machine 3 included in the power unit 1 according to the first embodiment by means of a typically-enlarged vertical section of the rotating machine 3.
Figure 4:
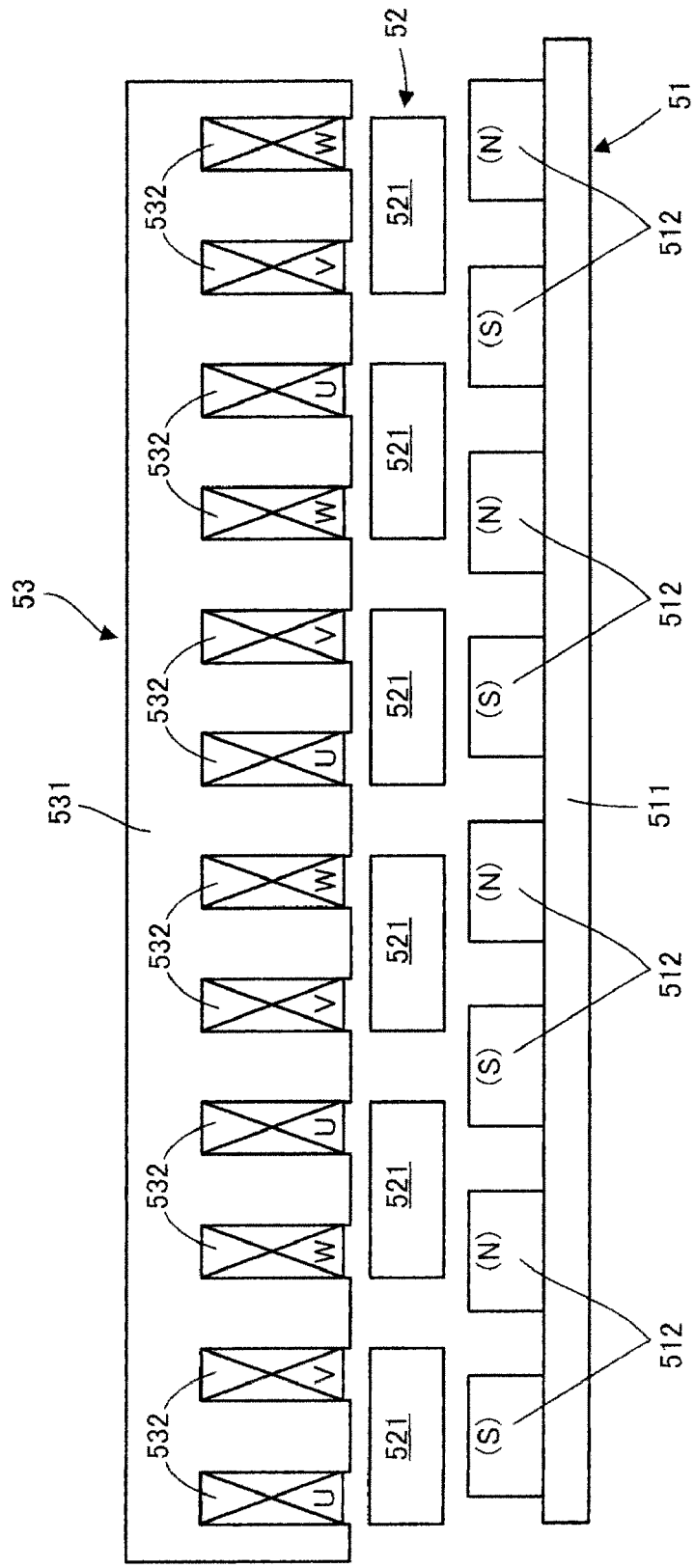
FIG. 4 is a diagram illustrating a stator, a first rotor, and a second rotor included in the rotating machine 3 in FIG. 3 expanded in their circumferential directions.

The following describes the rotating machine 3 in more detail with reference to FIGS. 3 and 4. FIG. 3 is a diagram illustrating a schematic structure of the rotating machine 3 by means of a typically-enlarged vertical section of the rotating machine 3. FIG. 4 is a diagram illustrating a stator, a first rotor, and a second rotor included in the rotating machine 3 expanded in their circumferential directions. The rotating machine 3 of this embodiment functions as the energy dispensing/synthesizing system in the third invention.

Referring to FIG. 3, the rotating machine 3 includes the first rotor 51 and the second rotor 52 as two bodies of rotation rotationally supported in the housing 6 of the rotating machine 3 and includes an immovable stator 53 fixed to the housing 6 (consequently fixed to the immovable part 12 via the housing 6) in the housing 6. In this instance, the stator 53 is disposed in the periphery of the first rotor 51 so as to be opposed to the first rotor 51. The second rotor 52 is disposed between the first rotor 51 and the stator 53 so as to rotate in a non-contact state with respect thereto. Accordingly, the first rotor 51, the second rotor 52, and the stator 53 are concentrically disposed. In the following description, unless otherwise specified, it is assumed that the term "circumferential direction" means the direction around the central axis of the first rotating shaft 25 and that the term "central axis direction" means the central axis direction of the first rotating shaft 25. The same applies to other embodiments described later.

The stator 53 has a plurality of armatures 533 which generate a rotating magnetic field to be applied to the first rotor 51 and the second rotor 52 inside the stator 53. Further, the stator 53 includes an iron core (armature iron core) 531 formed in a cylindrical shape by stacking a plurality of steel plates and coils (armature windings) 532 of three phases, i.e., U, V, and W phases attached to the inner peripheral surface of the iron core 531. The iron core 531 is coaxially inserted onto the first rotating shaft 25 and fixed to the housing 6.

The coils 532 of the U, V, and W phases and the iron cores 531 respectively constitute individual armatures 533. The coils 532 of the three U, V, and W phases are attached to the iron cores 531 so as to be arranged in the circumferential direction (See FIG. 4). This enables the constitution of an armature row formed of the plurality of (a multiple of 3) armatures 533 arranged in the circumferential direction.

Further, the coils 532 of the three phases in the armature row are arranged so as to generate a plurality of (an even number of) magnetic poles arranged in the circumferential direction at regular intervals on the inner peripheral surface of the iron core 531 and rotating in the circumferential direction when a three-phase alternating current is applied to the coils 532. In the magnetic pole row, N-pole and S-pole are alternately arranged in the circumferential direction (arbitrary two magnetic poles adjacent to each other are different in polarity). In this manner, the magnetic poles generated on the inner peripheral surface of the iron core 531 by the electricity supply to the coils 532 correspond to the armature magnetic poles in the present invention (the third invention) and the magnetic pole row corresponds to the armature magnetic pole row in the present invention (the third invention). The stator 53 generates a rotating magnetic field in the inside of the iron core 531 by the rotation of the armature magnetic pole row.

The three-phase coils 532 are electrically connected to a battery (secondary battery) 11 as a DC power supply via a power drive unit 10 (hereinafter, referred to as the PDU 10) which is a drive circuit including an inverter circuit. This enables electric power to be transmitted or received between the coils 532 and the battery 11 (input/output of electric energy to or from the coils 532) via the PDU 10. Further, the ECU 41 is able to control the electricity supply to the coils 532 via the PDU 10 and consequently to control the generation mode of the rotating magnetic field (the rotational speed and the magnetic flux intensity of the rotating magnetic field).

Additionally, the coil 532 corresponds to the electric element in the present invention.

As shown in FIG. 4, the first rotor 51 includes a cylindrical base 511 made of a soft magnetic material and a plurality of (an even number of) permanent magnets 512 (magnet magnetic poles) secured to the outer peripheral surface of the base 511. The base 511 is formed by stacking, for example, iron plates or steel plates. Then, the base 511 is coaxially inserted onto the first rotating shaft 25 inside the iron core 531 of the stator 53 and fixed to the first rotating shaft 25 so as to rotate integrally with the first rotating shaft 25.

Moreover, the plurality of permanent magnets 512 of the first rotor 51 are arranged at regular intervals in the circumferential direction. In this instance, there is a gap between the permanent magnets 512, 512 adjacent to each other. The arrangement of the permanent magnets 512 forms a magnetic pole row formed of a plurality of magnetic poles arranged in the circumferential direction on the outer peripheral surface of the first rotor 51 so as to be opposed to the inner peripheral surface of the iron core 531 of the stator 53 (consequently so as to be opposed to the armature magnetic pole row). In this instance, as shown by (N) and (S) in FIG. 4, the magnetic poles on the outer surface (the surface opposed to the inner peripheral surface of the iron core 531 of the stator 53) of the two permanent magnets 512 adjacent to each other in the circumferential direction are different in polarity from each other. In other words, with the arrangement of the plurality of permanent magnets 512 of the first rotor 51, the N-pole and the S-pole are arranged alternately in the magnetic pole row formed on the outer peripheral surface of the first rotor 51.

The length of the base 511 and that of the permanent magnet 512 of the first rotor 51 (the length in the central axis direction of the first rotating shaft 25) is nearly equal to the length of the iron core 531 of the stator 53 in the central axis direction.

The second rotor 52 includes a soft magnetic material row made of a plurality of cores 521 each made of a soft magnetic material arranged between the stator 53 and the first rotor 51 in a non-contact state with respect thereto. The plurality of cores 521 constituting the soft magnetic material row are arranged at regular intervals in the circumferential direction. In this instance, there is a gap between the cores 521, 521 adjacent to each other. Each core 521 is formed by stacking, for example, a plurality of steel plates. The soft magnetic material row made of these cores 521 is fixed to annular flanges 33a and 24aa in such a way as to be held between the annular flange 33a formed at an end portion (the end portion on the rotating machine 3 side) of the fourth rotating shaft 33 and the annular flange 24aa formed at an end portion (the end portion on the rotating machine 3 side) of the auxiliary device driving rotating shaft 24a. Thereby, the second rotor 52 (the soft magnetic material row) rotates integrally with the fourth rotating shaft 33 and the auxiliary device driving rotating shaft 24a.

The length of each of the cores 521 constituting the soft magnetic material row (the length in the central axis direction of the first rotating shaft 25) is nearly equal to the length of the iron core 531 of the stator 53 in the central axis direction.

In this embodiment, supposing that p is the number of armature magnetic poles of the stator 53 of the rotating machine 3, q is the number of magnetic poles of the first rotor 51 (the number of permanent magnets 512), and r is the number of soft magnetic materials of the second rotor 52, these p, q, and r values are set so as to satisfy the following relation:

$$p:q:r = 1:m:(1+m)/2 \qquad (1)$$

$(m \neq 1)$
where p and q are even numbers (a multiple of 2) and m is a positive rational number.

In this instance, for example, if p=4, q=8, r=6, and m=2, the equation (1) is satisfied.

In the rotating machine 3 according to this embodiment configured so that the number p of armature magnetic poles of the stator 53 of the rotating machine 3, the number q of the magnetic poles of the first rotor 51 (the number of permanent magnets 512), and the number r of soft magnetic materials of the second rotor 52 satisfy the above equation (1) as described above, the following equations (2a), (2b), and (2c) express the time rates of change dψu/dt, dψv/dt, and dψw/dt (ψu, ψv, and ψw are flux linkages applied to a U-phase coil, a V-phase coil, and a W-phase coil, respectively) of the magnetic fluxes (flux linkages) applied to the coils 532 of the respective phases of the stator 53 from the magnetic poles of the first rotor 51 via the cores 521 (soft magnetic materials) of the second rotor 52 during rotation of both or one of the first rotor 51 and the second rotor 52:

$$\frac{d\Psi u}{dt} = -\frac{r}{2} \cdot \Psi f \cdot \left\{ \begin{array}{l} [(m+1) \cdot \omega e2 - m \cdot \omega e1] \cdot \\ \sin[(m+1) \cdot \theta e2 - m \cdot \theta e1] \end{array} \right\} \qquad (2a)$$

$$\frac{d\Psi v}{dt} = -\frac{r}{2} \cdot \Psi f \cdot \left\{ \begin{array}{l} [(m+1) \cdot \omega e2 - m \cdot \omega e1] \cdot \\ \sin\left[(m+1) \cdot \theta e2 - m \cdot \theta e1 - \frac{2\pi}{3}\right] \end{array} \right\} \qquad (2b)$$

$$\frac{d\Psi w}{dt} = -\frac{r}{2} \cdot \Psi f \cdot \left\{ \begin{array}{l} [(m+1) \cdot \omega e2 - m \cdot \omega e1] \cdot \\ \sin\left[(\alpha+1) \cdot \theta e2 - m \cdot \theta e1 + \frac{2\pi}{3}\right] \end{array} \right\} \qquad (2c)$$

In the above equations (2a) to (2c), ψf is the maximum value of the magnetic flux of the magnetic poles of the first rotor 51, θe2 is an angular position in terms of an electric angle of the second rotor 52 relative to one reference coil out of the coils 532 of the stator 53, ωe2 is a time rate of change of θe2 (in other words, an electric angular velocity of the second rotor 52), θe1 is an angular position in terms of an electric angle of the first rotor 51 relative to the reference coil, and ωe1 is a time rate of change of θe1 (in other words, an electric angular velocity of the first rotor 51). In the equations (2a) to (2c), a value of θe1 is zero in a state where one magnetic pole of the first rotor 51 is opposed to the reference coil and a value of θe2 is zero in a state where one core 521 of the second rotor 52 is opposed to the reference coil. In addition, the above term "electric angle" means an angle obtained by multiplying a mechanical angle by a pole logarithm of the armature magnetic poles (the number of pairs of N-pole and S-pole [=p/2]).

In this instance, the magnetic flux directly applied to the coils 532 from the magnetic poles of the first rotor 51 bypassing the cores 521 of the second rotor 52 is very small in comparison with the magnetic flux applied via the cores 521. Therefore, dψu/dt, dψv/dt, and dψw/dt in the equations (2a) to (2c) represent counter electromotive voltages (induced voltages) generated in the coils of the respective phases along with the rotations of the first rotor 51 and the second rotor 52 relative to the stator 53.

Therefore, in this embodiment, the ECU 41 controls the current applied to the coils 532 of the stator 53 via the PDU 10 so that a rotation angle position θmf (a rotation angle position in terms of an electric angle) of a magnetic flux vector of a rotating magnetic field generated by the electricity supply to the coils 532 of the stator 53 and an angular velocity ωmf (electric angular velocity) which is the time rate of change (derivative) of the rotation angle position θmf satisfy the following equations (3a) and (3b):

$$\theta mf = (m+1) \cdot \theta e2 - m \cdot \theta e1 \quad (3a)$$

$$\omega mf = (m+1) \cdot \omega e2 - m \cdot \omega e1 \quad (3b)$$

As described above, it is possible to operate the rotating machine 3 appropriately to generate torques in the first rotor 51 and the second rotor 52 by causing the stator 53 to generate the rotating magnetic field. In this condition, if Tmf is defined as an equivalent torque of the rotating magnetic field (hereinafter, referred to as the rotating magnetic field equivalent torque Tmf) which is obtained by dividing electric power supplied to the coils 532 of the stator 53 (input electric power) or output electric power from the coils 532 by an angular velocity ωmf based on an electric angle of the rotating magnetic field and T1 and T2 are assumed to be the torques generated in the first rotor 51 and the second rotor 52, respectively, these Tmf, T1, and T2 values satisfy an equation (4) below. Note that an energy loss such as copper loss, iron loss, or the like is negligibly small here.

$$Tmf = T1/m = -T2/(m+1) \quad (4)$$

The interrelation between the relational speeds and the interrelation between the toques represented by the above equations (3b) and (4), respectively, are the same in relation as the interrelation between the rotational speeds and the interrelation between the torques of the sun gear, the ring gear, and the carrier of a known single-pinion type planetary gear unit such as the planetary gear unit 34. Specifically, one of the armature magnetic poles and the first rotor 51 corresponds to the sun gear and the other corresponds to the ring gear, and the second rotor 52 corresponds to the carrier.

Therefore, the rotating machine 3 has a function of a planetary gear unit (more generally, a function of a differential gear). Then, the armature magnetic poles, the first rotor 51, and the second rotor 52 rotate while maintaining a collinear relationship represented by an equation (36).

In this instance, the rotating machine 3 has a function of dispensing or synthesizing energy similarly to a general planetary gear unit. More specifically, energy is able to be dispensed or synthesized among the coils 532 of the stator 53, the second rotor 52, and the first rotor 51 via a magnetic circuit formed among the stator 53, the cores 521 (soft magnetic material) of the second rotor 52, and the permanent magnets 512 of the first rotor 51. For example, when a rotating magnetic field is generated by supplying electric energy (electric power) to the coils 532 of the stator 53 while applying loads on the first rotor 51 and the second rotor 52, the electric energy supplied to the coils 532 is able to be converted to rotational energy of the first rotor 51 and the second rotor 52 via the foregoing magnetic circuit. Consequently, the first rotor 51 and the second rotor 52 are able to be rotationally driven (torques are able to be generated in the first rotor 51 and the second rotor 52, respectively). In this case, the energy input to the coils 532 is dispensed to the first rotor 51 and the second rotor 52.

Further, for example, when the first rotor 51 is rotationally driven from the outside (rotational energy is supplied to the first rotor 51 from the outside) and a rotating magnetic field is generated so that the coils 532 of the stator 53 output electric energy (electric power is generated from the coils 532) while applying a load on the second rotor 52, the rotational energy supplied to the first rotor 51 is able to be converted to rotational energy of the second rotor 52 and electric power energy of the coils 532 via the above magnetic circuit. Consequently, the second rotor 52 is able to be rotationally driven and electric power is able to be generated from the coils 532. In this case, the energy input to the first rotor 51 is dispensed to the second rotor 52 and the coils 532.

Moreover, for example, when the first rotor 51 is rotationally driven from the outside (rotational energy is supplied to the first rotor 51 from the outside) and a rotating magnetic field is generated by supplying electric energy to the coils 532 of the stator 53 while applying a load on the second rotor 52, the rotational energy supplied to the first rotor 51 and the electric energy supplied to the coils 532 are able to be converted to rotational energy of the second rotor 52 via the foregoing magnetic circuit. Consequently, the second rotor 52 is able to be rotationally driven. In this case, the energy input to the first rotor 51 and the energy supplied to the coils 532 are synthesized and transmitted to the second rotor 52.

In this manner, the rotating machine 3 is able to dispense or synthesize the energies among the first rotor 51, the second rotor 52, and the coils 532 while performing the conversion between the respective rotational energies of the first rotor 51 and the second rotor 52 and the electric energy of the coils 532.

In the following description, supplying (inputting) electric power to the coils 532 of the stator 53 is simply represented as "supplying (or inputting) electric power to the stator 53" for convenience. Moreover, outputting electric power from the coils 532 of the stator 53 is simply represented as "causing the stator 53 to generate electric power." In addition, the operation of the rotating machine 3 for supplying electric power to the stator 53 is referred to as "power running" and the operation of the rotating machine 3 for causing the stator 53 to generate electric power is referred to as "generating operation" in some cases.

The following describes the operation of the power unit 1 according to this embodiment. The operation mode of the power unit 1 according to this embodiment has various operation modes. FIGS. 5 to 13 visually illustrate the operating states of the power unit 1 in the various operation modes. FIGS. 5 to 13 show the operating states of the first clutch 32, the second clutch 36, the third clutch 37, and the auxiliary device clutch 24g as follows: the clutches 32, 36, 37, and 24g are indicated by solid areas in the case where the operating states are the connected states (hereinafter, referred to as the ON states) and indicated by outlines in the case where the operating states are the disconnected states (hereinafter, referred to as the OFF states) in this embodiment. Moreover, regarding the operating state of the one-way clutch 28, the one-way clutch 28 is indicated by a solid area in the case where the operating state is the state for inhibiting the first rotating shaft 25 to rotate (hereinafter, referred to as the ON state) and indicated by an outline in the case where the operating state is the state for allowing the first rotating shaft 25 to rotate (hereinafter, referred to as the OFF state). Further, in the various operation modes, the components of the power unit 1 rotating in conjunction with each other are indicated by thick lines.

[Stop-Period Idle Stop Mode]

Figure 5:
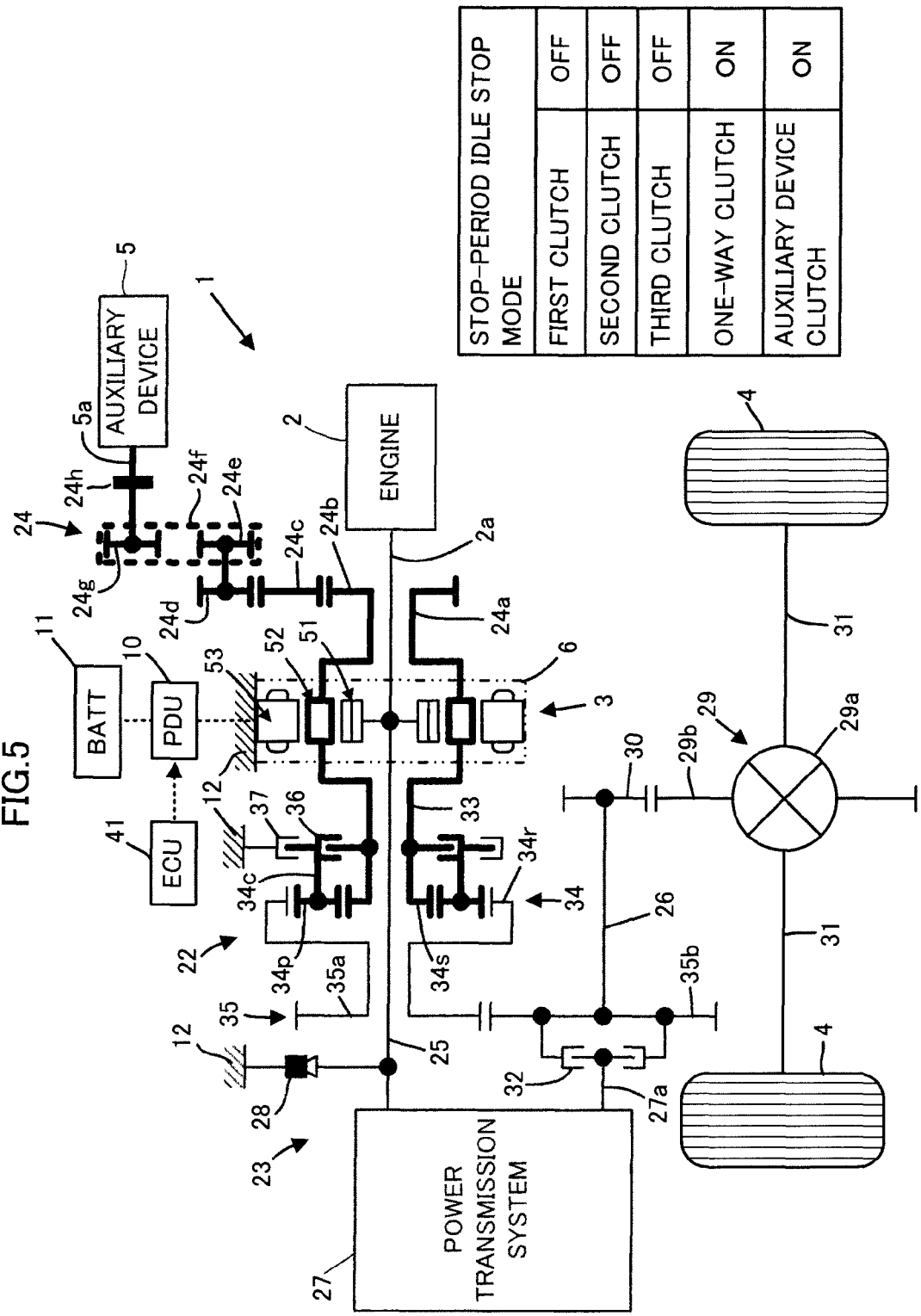
FIG. 5 is a diagram visually illustrating an operating state in a stop-period idle stop mode of the power unit 1 according to the first embodiment.

FIG. 5 shows the operating state of the power unit 1 in a stop-period idle stop mode. The stop-period idle stop mode is the operation mode in which the operation of the engine 2 is stopped in the vehicle stop state, in other words, the operation mode in which a so-called idle stop of the engine 2 is performed.

In the stop-period idle stop mode, as shown, the ECU 41 places all of the first to third clutches 32, 36, and 37 in the OFF state. Therefore, in the stop-period idle stop mode, the power transmission between the output shaft 2a of the engine 2 or the first rotor 51 of the rotating machine 3 and the driving wheels 4, 4 via the second power transmission path 23 is disconnected. Moreover, the operation mode of the planetary gear unit 34 is set to the power transmission disabled mode. This causes the disconnection of the power transmission between the second rotor 52 of the rotating machine 3 and the driving wheels 4, 4 via the first power transmission path 22.

In the stop-period idle stop mode, the auxiliary device 5 is driven by the power of the rotating machine 3 as described below, with the operation of the engine 2 stopped in the state where the first to third clutches 32, 36, and 37 are placed in the OFF state as described above. Specifically, the ECU 41 places the auxiliary device clutch 24h in the ON state. Further, the ECU 41 controls the PDU 10 to supply electric power to the stator 53 of the rotating machine 3 from the battery 11 so as to generate a rotating magnetic field in the forward rotation direction. In this operation, power to be a power running torque in the forward rotation direction is generated in the second rotor 52 of the rotating machine 3. Then, the power is transmitted from the second rotor 52 to the input shaft 5a of the auxiliary device 5 via the auxiliary device power transmission path 24. Thereby, the auxiliary device 5 is driven by the power generated in the second rotor 52 by the rotating machine 3.

Moreover, in this case, the second rotor 52 of the rotating machine 3 is rotationally driven in the forward rotation direction. Along with this, the first rotor 51 of the rotating machine 3 attempts to rotate in the reverse rotation direction integrally with the output shaft 2a of the engine 2 and the first rotating shaft 25. The one-way clutch 28, however, inhibits the rotation in the reverse rotation direction. In other words, the one-way clutch 28 is brought into the ON state as shown. Thereby, the output shaft 2a of the engine 2 is inhibited from rotating in the reverse rotation direction together with the first rotor 51 of the rotating machine 3 and the first rotating shaft 25 and is maintained in the rotation stopped state.

Therefore, it is possible to drive the auxiliary device 5 by the power of the rotating machine 3 without trouble with the operation of the engine 2 stopped.

During driving of the auxiliary device 5 in the stop-period idle stop mode, the fourth rotating shaft 33, and the sun gear 34s and the carrier 34c of the planetary gear unit 34 idle-rotate in conjunction with the second rotor 52 of the rotating machine 3.

[EV Start-Up and Running Mode]

Figure 6:
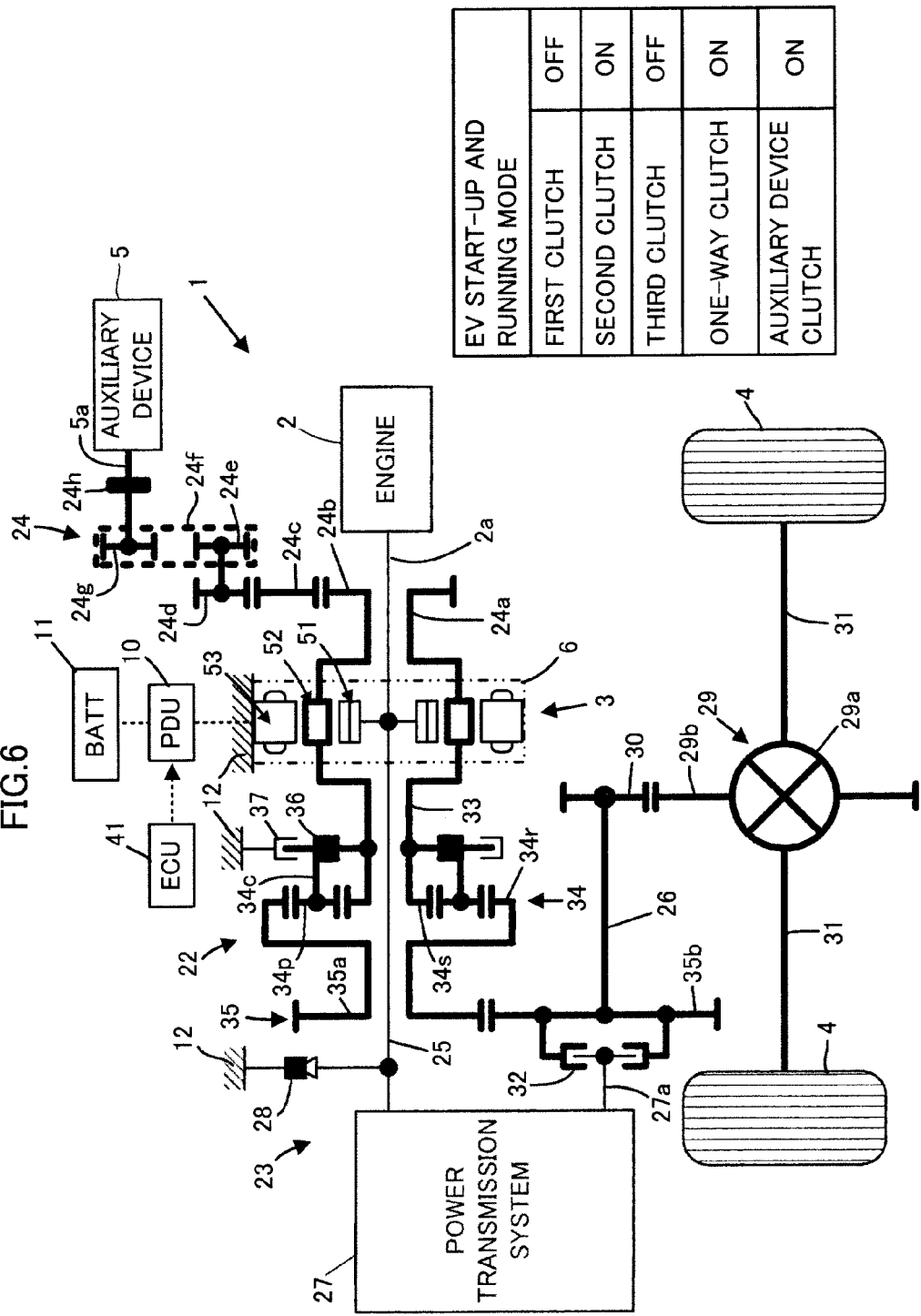
FIG. 6 is a diagram illustrating an operating state in an EV start-up and running mode of the power unit 1 according to the first embodiment.

FIG. 6 shows the operating state of the power unit 1 in an EV start-up and running mode. The EV start-up and running mode is an operation mode shifted from the stop-period idle stop mode. Further, the EV start-up and running mode is an operation mode where the start-up and running in the advance direction of the vehicle is performed only under the power of the rotating machine 3 with the operation of the engine 2 stopped.

As shown, in the EV start-up and running mode, the ECU 41 places the first clutch 32 in the OFF state (maintains the first clutch 32 in the OFF state). Therefore, the power transmission via the second power transmission path 23 is disconnected between the output shaft 2a of the engine 2 or the first rotor 51 of the rotating machine 3 and the driving wheels 4, 4.

Further, the ECU 41 places the second clutch 36 and the third clutch 37 in the ON state and the OFF state, respectively. Specifically, the ECU 41 changes the operating state of the second clutch 36 from the OFF state, which is the operating state in the stop-period idle stop mode, to the ON state and maintains the operating state of the third clutch 37 in the operating state in the stop-period idle stop mode (the OFF state). Thereby, the operation mode of the planetary gear unit 34 is set to the integral rotation mode. This provides a state for enabling power transmission between the second rotor 52 of the rotating machine 3 and the driving wheels 4, 4 via the first power transmission path 22.

In this instance, in the stop-period idle stop mode which is the operation mode immediately before the EV start-up and running mode, the second rotor 52, the fourth rotating shaft 33, and the sun gear 34s and the carrier 34c of the planetary gear unit 34 idle-rotate during driving of the auxiliary device 5 by the power generated in the second rotor 52 of the rotating machine 3. If the second clutch 36 is changed from the OFF state to the ON state in this condition (if the operation mode of the planetary gear unit 34 is switched from the power transmission disabled mode to the integral rotation mode), a sudden braking force acts on rotating members such as the second rotor 52 of the rotating machine 3 and the like. Then, an instantaneous swing or any other shock caused thereby occurs.

Therefore, to change the second clutch 36 from the OFF state to the ON state, the ECU 41 first controls the PDU 10 to stop the rotation of the armature magnetic poles of the stator 53 of the rotating machine 3 with the second clutch 36 and the third clutch 37 maintained in the OFF state. This temporarily stops the rotations of the second rotor 52, the fourth rotating shaft 33, and the sun gear 34s and the carrier 34c of the planetary gear unit 34. The ECU 41 then changes the second clutch 36 from the OFF state to the ON state with the third clutch 37 maintained in the OFF state in the rotation stopped state to switch the operation mode of the planetary gear unit 34 from the power transmission disabled mode to the integral rotation mode. Thereby, the above shock is prevented from occurring.

In the EV start-up and running mode, with the operation of the engine 2 stopped in the state where the first to third clutches 32, 36, and 37 are placed as described above, the power generated in the second rotor 52 of the rotating machine 3 drives the driving wheels 4, 4 (start-up and running in the advance direction of the vehicle) and the auxiliary device 5 as described below. Specifically, the ECU 41 places the auxiliary device clutch 24h in the ON state. Further, the ECU 41 controls the PDU 10 to supply electric power to the stator 53 of the rotating machine 3 from the battery 11 so as to generate the rotating magnetic field in the forward rotation direction. In this instance, in the same manner as in the stop-period idle stop mode, the one-way clutch 28 is brought into the ON state, which thereby prevents the output shaft 2a of the engine 2, the first rotor 51 of the rotating machine 3, and the first rotating shaft 25 from rotating in the reverse rotation direction (maintains them in the rotation stopped state).

As a result, the power (power running torque in the forward rotation direction) generated in the second rotor 52 of the rotating machine 3 is transmitted from the second rotor 52 to the driving wheels 4, 4 via the first power transmission path 22. Further, the power is also transmitted to the input shaft 5*a* of the auxiliary device 5 via the auxiliary device power transmission path 24. Thereby, the power of the rotating machine 3 drives the driving wheels 4, 4 in the advance direction of the vehicle to perform the start-up and running of the vehicle and to drive the auxiliary device 5. The power running torque generated in the second rotor 52 by the rotating machine 3 in this case is controlled according to the depressing amount of an accelerator pedal (not shown) of the vehicle and the like (according to a required driving force of the vehicle).

[Post-EV Engine Start Mode]

Figure 7:
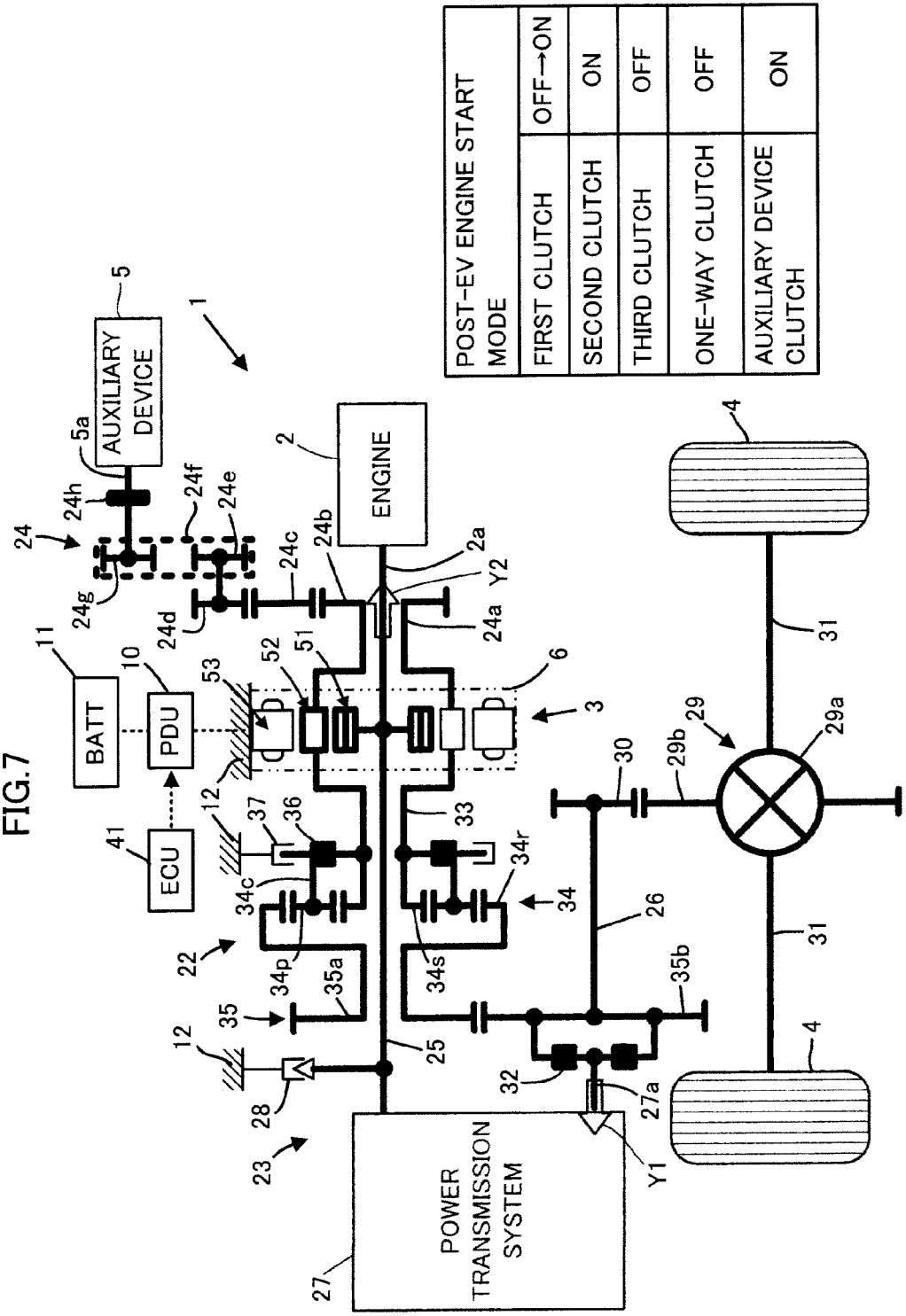
FIG. 7 is a diagram illustrating an operating state in a post-EV engine start mode of the power unit 1 according to the first embodiment.

FIG. 7 shows the operating state of the power unit 1 in a post-EV engine start mode. The post-EV engine start mode is an operation mode shifted from the EV start-up and running mode. Moreover, the post-EV engine start mode is an operation mode in which the engine 2 is started while the driving wheels 4, 4 (vehicle running in the advance direction) are driven by the power of the rotating machine 3.

As shown, in the post-EV engine start mode, the ECU 41 places the second clutch 36 and the third clutch 37 in the ON state and the OFF state which are the same operating states as in the EV start-up and running mode, respectively. Therefore, the operation mode of the planetary gear unit 34 is maintained in the integral rotation mode.

Then, the ECU 41 causes the first clutch 32 to operate so that the operating state thereof gradually changes from the OFF state to the ON state while causing the second rotor 52 of the rotating machine 3 to generate power (power running torque in the forward rotation direction) for running the vehicle in the same manner as in the EV start-up and running mode. In other words, the ECU 41 causes the first clutch 32 to operate in such a way as to be switched from the OFF state to the ON state through so-called a half-clutch state.

In this condition, along with the shift of the first clutch 32 from the OFF state to the ON state, a part of the power (power running torque), which is transmitted from the second rotor 52 of the rotating machine 3 to the driving wheels 4, 4 via the first power transmission path 22, is transmitted from the first clutch 32 to the output shaft 2*a* of the engine 2 via the power transmission system 27 and the first rotating shaft 25 (via a portion other than the shared power transmission path out of the second power transmission path 23), as indicated by white arrows Y1 and Y2 in FIG. 7. In this case, the torque transmitted to the output shaft 2*a* of the engine 2 is a torque for rotationally driving the output shaft 2*a* in the forward rotation direction. Therefore, the one-way clutch 28 is brought into the OFF state. Thereby, the output shaft 2*a* of the engine 2 is rotationally driven in the forward rotation direction to perform so-called cranking of the output shaft 2*a*. In this case, the ECU 41 maintains the rotational speed of the output shaft 2*a* of the engine 2 at a predetermined rotational speed for starting by controlling both or one of the change gear ratio of the CVT 27*c* provided in the power transmission system 27 and the rotational speed of the second rotor 52 of the rotating machine 3 according to the rotational speed of the driving wheels 4, 4 (or the vehicle speed).

The ECU 41 then starts the engine 2 by performing start processing including the control processing of the fuel supply and ignition of the engine 2 while cranking the output shaft 2*a* of the engine 2 as described above.

Moreover, in the post-EV engine start mode, the auxiliary device 5 is driven by the power of the rotating machine 3 in the same manner as in the EV start-up and running mode. In other words, the ECU 41 places the auxiliary device clutch 24*h* in the ON state. In this condition, a part of the power (power running torque) generated in the second rotor 52 of the rotating machine 3 is transmitted to the input shaft 5*a* of the auxiliary device 5 via the auxiliary device power transmission path 24 and thereby the auxiliary device 5 is driven.

[Stop-Period Engine Start Mode]

Figure 8:
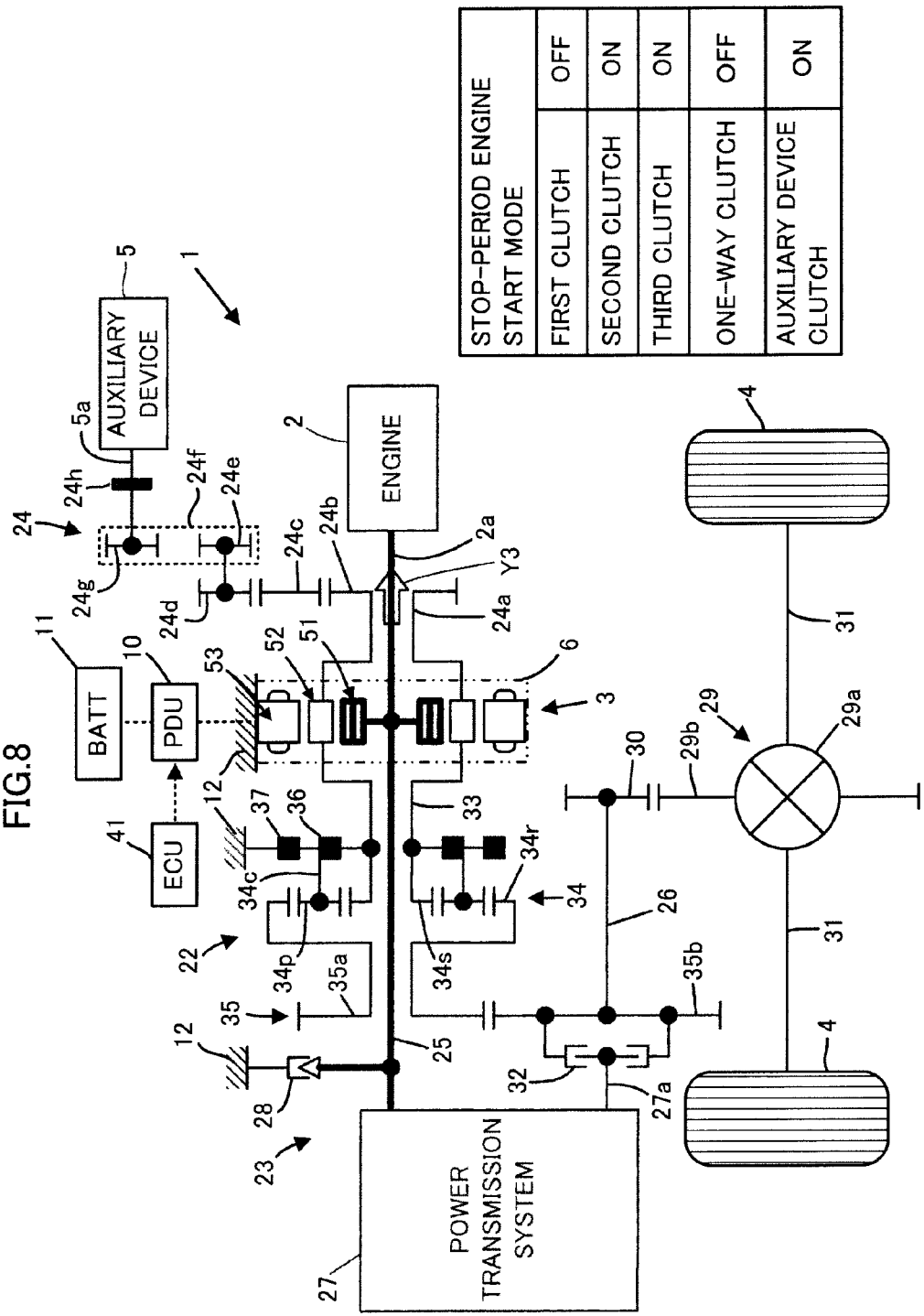
FIG. 8 is a diagram illustrating an operating state in a stop-period engine start mode of the power unit 1 according to the first embodiment.

FIG. 8 shows the operating state of the power unit 1 in a stop-period engine start mode. The stop-period engine start mode is an operation mode shifted from the stop-period idle stop mode. Moreover, the stop-period engine start mode is an operation mode in which the engine 2 is started in the vehicle stop state.

As shown, in the stop-period engine start mode, the ECU 41 places the first clutch 32 in the OFF state (maintains the first clutch 32 in the OFF state). Therefore, the power transmission between the output shaft 2*a* of the engine 2 or the first rotor 51 of the rotating machine 3 and the driving wheels 4, 4 via the second power transmission path 23 is maintained in the disconnected state. Further, the ECU 41 places both of the second clutch 36 and the third clutch 37 in the ON state. Therefore, the operation mode of the planetary gear unit 34 is set to the non-rotatable mode.

For the same reason as the case where the second clutch 36 is changed from the OFF state to the ON state in the EV start-up and running mode, the second clutch 36 and the third clutch 37 are changed from the OFF state to the ON state after the stop of the rotation of the armature magnetic poles of the stator 53 of the rotating machine 3 (consequently, after the stop of the rotations of the second rotor 52 of the rotating machine 3, the fourth rotating shaft 33, and the sun gear 34*s* and the carrier 34*c* of the planetary gear unit 34). Thereby, when the second clutch 36 and the third clutch 37 are changed from the OFF state to the ON state, a shock is prevented from occurring due to sudden braking of the second rotor 52 of the rotating machine 3 and the like.

In the stop-period engine start mode, the ECU 41 controls the PDU 10 to supply electric power to the stator 53 of the rotating machine 3 from the battery 11 so as to generate the rotating magnetic field in the reverse rotation direction in the stator 53 of the rotating machine 3, while placing the first to third clutches 32, 36, and 37 as described above.

Since the operation mode of the planetary gear unit 34 is the non-rotatable mode in the above condition, the second rotor 52 of the rotating machine 3 is maintained in the non-rotatable state (rotation stopped state). Therefore, along with the generation of the rotating magnetic field in the reverse rotation direction, power to be a power running torque in the forward rotation direction is generated in the first rotor 51 of the rotating machine 3. Then, the power is transmitted to the output shaft 2*a* of the engine 2 via the first rotating shaft 25 as indicated by a white arrow Y3 in the figure. Thereby, the output shaft 2*a* of the engine 2 is cranked. In this case, the rotational speed of the rotating magnetic field of the rotating machine 3 is controlled so that the rotational speeds of the first rotor 51 and the output shaft 2*a* of the engine 2 are maintained at a predetermined rotational speed for starting. In addition, the output shaft 2*a* of the engine 2 is rotationally driven in the forward rotation direction and therefore the one-way clutch 28 is brought into the OFF state.

The ECU 41 then starts the engine 2, in this way, by performing start processing including the control processing of the fuel supply and ignition of the engine 2 while causing the cranking of the output shaft 2*a* of the engine 2.

In the stop-period engine start mode in this embodiment, the second rotor 52 of the rotating machine 3 is non-rotatable (maintained in the rotation stopped state) and therefore the auxiliary device 5 is not able to be driven. In this instance, the auxiliary device clutch 24h may be placed in either of the ON state and the OFF state. In the example shown in FIG. 8, the auxiliary device clutch 24h is placed in the ON state.

As described above, the auxiliary device 5 is not able to be driven in the stop-period engine start mode. The start of the engine 2 is completed in a short time of only a few seconds.

[Stop-Period Engine Idle Mode]

Figure 9:
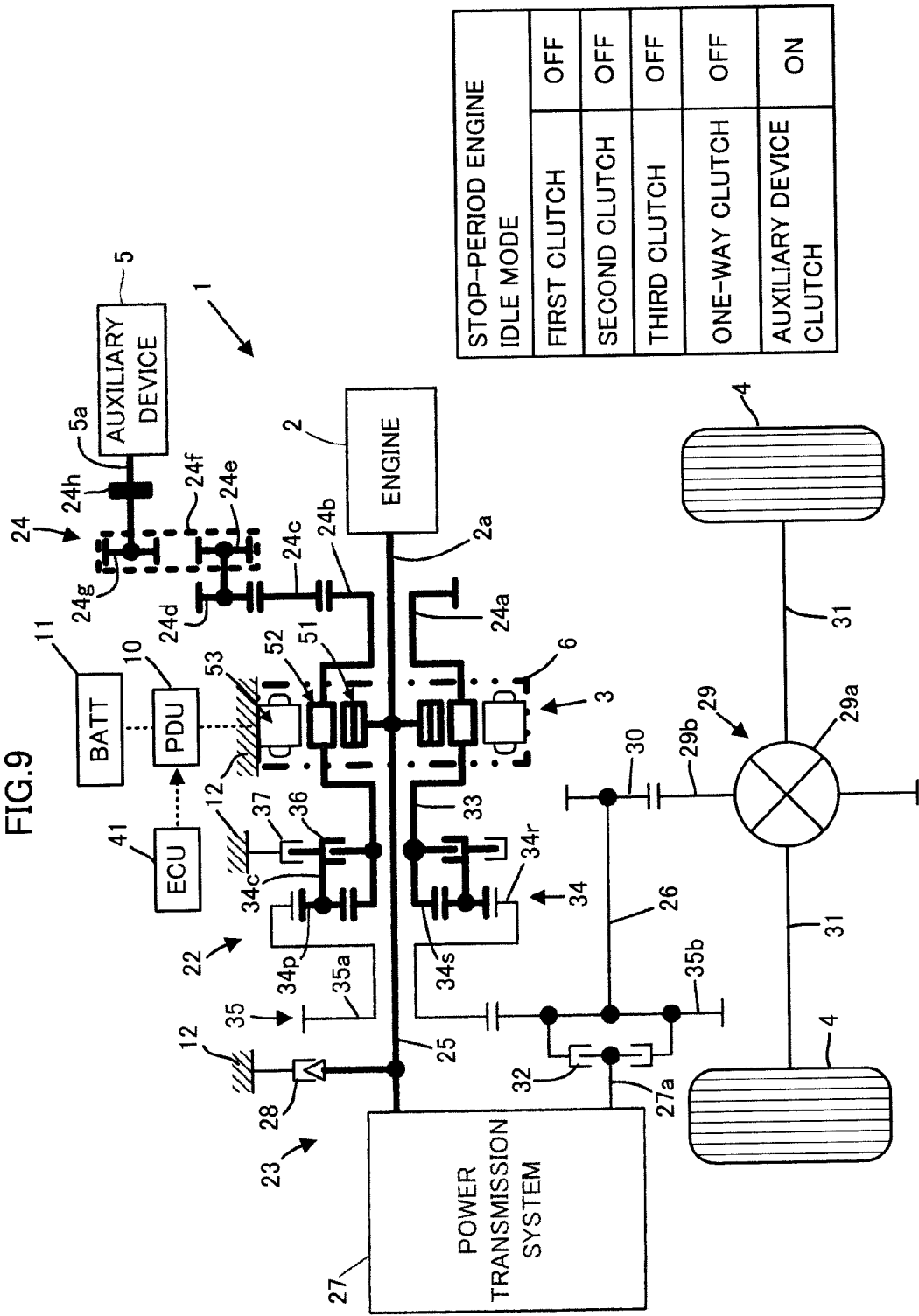
FIG. 9 is a diagram illustrating an operating state in a stop-period engine idle mode of the power unit 1 according to the first embodiment.

FIG. 9 shows the operating state of the power unit 1 in a stop-period engine idle mode. The stop-period engine idle mode is an operation mode shifted from the stop-period engine start mode. Moreover, the stop-period engine idle mode is an operation mode in which the auxiliary device 5 is driven by the power of the engine 2 during an idling operation of the engine 2 in the vehicle stop state. Moreover, in the stop-period engine idle mode, the rotating machine 3 generates electric power (electric power is output from the coils 532) to charge the battery 11, if necessary.

As shown, in the stop-period engine idle mode, the ECU 41 places the first to the third clutches 32, 36, and 37 in the OFF state. This maintains the disconnected state of the power transmission between the output shaft 2a of the engine 2 or the first rotor 51 of the rotating machine 3 and the driving wheels 4, 4 via the second power transmission path 23. Moreover, the operation mode of the planetary gear unit 34 is set to the power transmission disabled mode. This causes the disconnection of the power transmission between the second rotor 52 of the rotating machine 3 and the driving wheels 4, 4 via the first power transmission path 22.

The output shaft 2a of the engine 2 has already been rotating in the forward rotation direction and therefore the one-way clutch 28 is maintained in the OFF state.

Then, the ECU 41 causes the auxiliary device clutch 24h to be placed in the ON state in order to drive the auxiliary device 5 by the power of the engine 2. Moreover, if the remaining capacity of the battery 11 is sufficient (if the remaining capacity is equal to or greater than a predetermined threshold value), the ECU 41 disconnects the electricity supply to the coils 532 of the rotating machine 3 so as not to generate the armature magnetic poles.

In this condition, the second rotor 52 of the rotating machine 3 is rotatable. Thereby, the second rotor 52 is rotationally driven in the forward rotation direction by a magnetic force between the first rotor 51 and the second rotor 52 in conjunction with the rotation of the first rotor 51 in the forward rotation direction along with the output shaft 2a of the engine 2. Therefore, the power of the engine 2 is transmitted from the output shaft 2a to the input shaft 5a of the auxiliary device 5 via the first rotor 51 and the second rotor 52 of the rotating machine 3 and the auxiliary device power transmission path 24 and thereby the auxiliary device 5 is driven.

Moreover, if the remaining capacity of the battery 11 is low (if the remaining capacity is equal to or less than a predetermined threshold value), the ECU 41 controls the PDU 10 so that the stator 53 of the rotating machine 3 generates electric power (so as to perform the generating operation of the rotating machine 3) in order to cause the stator 53 of the rotating machine 3 to generate a rotating magnetic field.

In the above condition, a part of the power of the engine 2 (output energy of the engine 2) is converted to electric power energy of the coils 532 via a magnetic circuit between the first rotor 51 and the stator 53 of the rotating machine 3. Then, the electric power energy is supplied from the coils 532 to the battery 11 via the PDU 10 and thereby the battery 11 is charged.

The rotational speed of the rotating magnetic field generated by the stator 53 of the rotating machine 3 is controlled so that the rotational speed of the second rotor 52 is maintained at the rotational speed in the forward rotation direction which enables the auxiliary device 5 to be driven.

In this manner, in the stop-period engine idle mode, the power of the engine 2 enables the auxiliary device 5 to be driven in parallel with the generating operation of the rotating machine 3 (in parallel with charging of the battery 11).

In the stop-period engine idle mode, the fourth rotating shaft 33, and the sun gear 34s and the carrier 34c of the planetary gear unit 34 idle-rotate in conjunction with the rotations of the output shaft 2a of the engine 2.

[Engine Drive Start-Up Mode]

Figure 10:
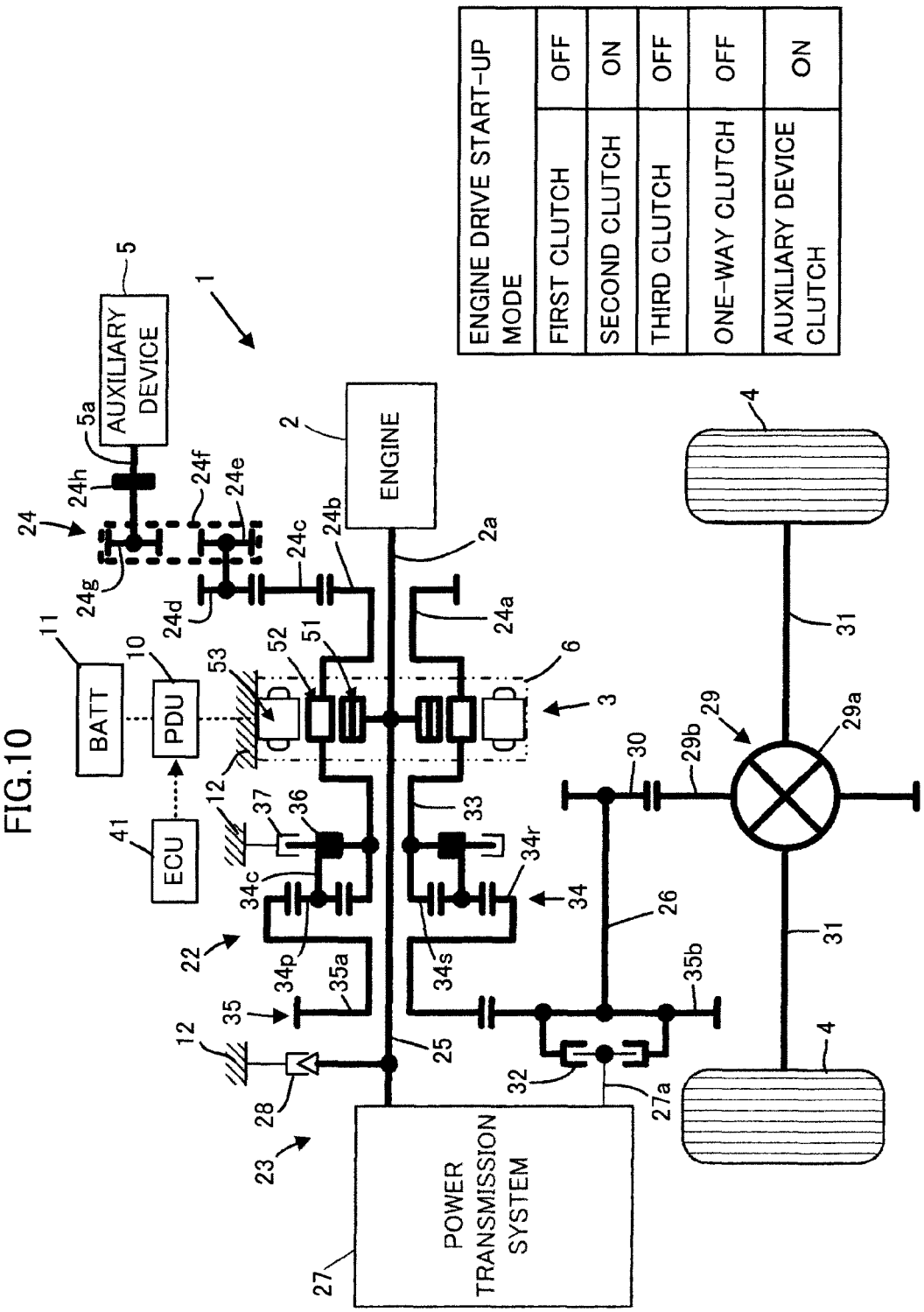
FIG. 10 is a diagram illustrating an operating state in an engine drive start-up mode of the power unit 1 according to the first embodiment.

FIG. 10 shows the operating state of the power unit 1 in an engine drive start-up mode. The engine drive start-up mode is an operation mode shifted from the stop-period engine idle mode. Moreover, the engine drive start-up mode is an operation mode where the vehicle is started up in the advance direction by using the power of the engine 2.

As shown, in the engine drive start-up mode, the ECU 41 places the first to third clutches 32, 36, and 37 in the OFF state, the ON state, and the OFF state, respectively. This maintains the disconnected state of the power transmission between the output shaft 2a of the engine 2 or the first rotor 51 of the rotating machine 3 and the driving wheels 4, 4 via the second power transmission path 23. The operation mode of the planetary gear unit 34 is set to the integral rotation mode. This enables the power transmission between the second rotor 52 of the rotating machine 3 and the driving wheels 4, 4.

In this instance, the change operation of the second clutch 36 from the OFF state to the ON state (switching the operation mode of the planetary gear unit 34 from the power transmission disabled mode to the integral rotation mode) is performed after the stop of the rotation of the second rotor 52 of the rotating machine 3 for the same reason as the case where the second clutch 36 is changed from the OFF state to the ON state in the EV start-up and running mode. Specifically, the ECU 41 controls the PDU 10 to supply electric power to the stator 53 of the rotating machine 3 from the battery 11 so as to generate a rotating magnetic field in the reverse rotation direction from the stator 53 of the rotating machine 3 with the second clutch 36 and the third clutch 37 placed in the OFF state. In this condition, the ECU 41 controls the rotational speed of the rotating magnetic field so that the rotational speed of the second rotor 52 of the rotating machine 3 becomes zero. The rotational speed of the rotating magnetic field in a state where the rotational speed of the second rotor 52 is zero is uniquely determined according to the rotational speed of the output shaft 2a of the engine 2 (=the rotational speed of the first rotor 51) due to the collinear relationship represented by the equation (2). Further, the ECU 41 switches the operation mode of the planetary gear unit 34 from the power transmission disabled mode to the non-rotatable mode by changing the second clutch 36 and the third clutch 37 from the OFF state to the ON state in the state where the rotational speed of the second rotor 52 is zero (the state where the rotations of the fourth rotating shaft 33 and the sun gear 34s and the carrier 34c of the planetary gear unit 34 are stopped). This prevents an occurrence of a shock caused by sudden braking of the second rotor 52 of the rotating machine 3 or the like when the second clutch 36 and the third clutch 37 are changed from the OFF state to the ON state.

The output shaft 2a of the engine 2 has already been rotating in the forward rotation direction and therefore the one-way clutch 28 is maintained in the OFF state. Moreover, the auxiliary device clutch 24h is maintained in the ON state.

In the engine drive start-up mode, the second rotor 52 of the rotating machine 3 is in the rotation stopped state in the state immediately after the second clutch 36 and the third clutch 37 are placed in the OFF state as described above in the vehicle stop state. Therefore, the rotation direction of the rotating magnetic field of the rotating machine 3 is the reverse rotation direction. Further, in this state, the ECU 41 controls the PDU 10 to generate electric power in the stator 53 of the rotating machine 3 while controlling the power of the engine 2 according to the depressing amount of the accelerator pedal of the vehicle and the like. In this case, the ECU 41 causes the rotating machine 3 to generate electric power while gradually increasing the amount of electric power generation of the rotating machine 3 so that the rotational speed of the rotating magnetic field of the rotating machine 3 becomes zero.

Since the rotating magnetic field of the rotating machine 3 is rotating in the reverse rotation direction in this condition, the rotating magnetic field equivalent torque is a braking torque in the forward rotation direction. Further, a torque in the forward rotation direction acts on the second rotor 52 by a resultant force between the equivalent torque (in this case, the braking torque in the forward rotation direction) and a torque in the forward rotation direction supplied from the output shaft 2a of the engine 2 to the first rotor 51 of the rotating machine 3. Further, this torque is transmitted from the second rotor 52 to the driving wheels 4, 4 via the first power transmission path 22. Thereby, the vehicle starts in the advance direction while the second rotor 52 rotates in the forward rotation direction.

After the start of the vehicle running in the advance direction as described above, the rotational speed of the rotating magnetic field of the rotating machine 3 decreases to zero, and thereupon the ECU 41 controls the PDU 10 to stop the generating operation of the rotating machine 3 and to generate the rotating magnetic field in the forward rotation direction while supplying electric power to the stator 53 from the battery 11. Thereby, the equivalent torque of the rotating magnetic field of the rotating machine 3 becomes a power running torque in the forward rotation direction. Further, a torque in the forward rotation direction subsequently acts on the second rotor 52 by a resultant force between the equivalent torque (in this case, the power running torque in the forward rotation direction) and the torque in the forward rotation direction supplied from the output shaft 2a of the engine 2 to the first rotor 51. Further, this torque is transmitted from the second rotor 52 to the driving wheels 4, 4 via the first power transmission path 22. Thereby, the vehicle running in the advance direction is continued. In this case, the equivalent torque of the rotating magnetic field of the rotating machine 3 is controlled so as to satisfy the equation (3) with respect to the torque supplied to the first rotor 51 from the output shaft 2a of the engine 2. The rotational speed of the rotating magnetic field of the rotating machine 3 is controlled according to the rotational speed of the output shaft 2a of the engine 2 and the rotational speed of the driving wheels 4, 4 (or the vehicle speed).

As described above, the start-up and running of the vehicle is performed by using the power of the engine 2 in the engine drive start-up mode.

In the engine drive start-up mode, the reduction ratio between the output shaft 2a of the engine 2 and the second rotor 52 of the rotating machine 3 is changed by adjusting the rotational speed of the rotating magnetic field of the rotating machine 3. Consequently, the reduction ratio (change gear ratio) between the output shaft 2a of the engine 2 and the driving wheels 4, 4 is changed.

Moreover, in the engine drive start-up mode in this embodiment, upon the start-up of the vehicle, the second rotor 52 of the rotating machine 3 rotates in the forward rotation direction in conjunction with the first rotor 51 by a magnetic force between the first rotor 51 and the second rotor 52. Therefore, a part of the power of the engine 2 is transmitted to the input shaft 5a of the auxiliary device 5 via the first rotor 51, the second rotor 52, and the auxiliary device power transmission path 24 and thereby the auxiliary device 5 is driven.

[Engine Running Mode]

Figure 11:
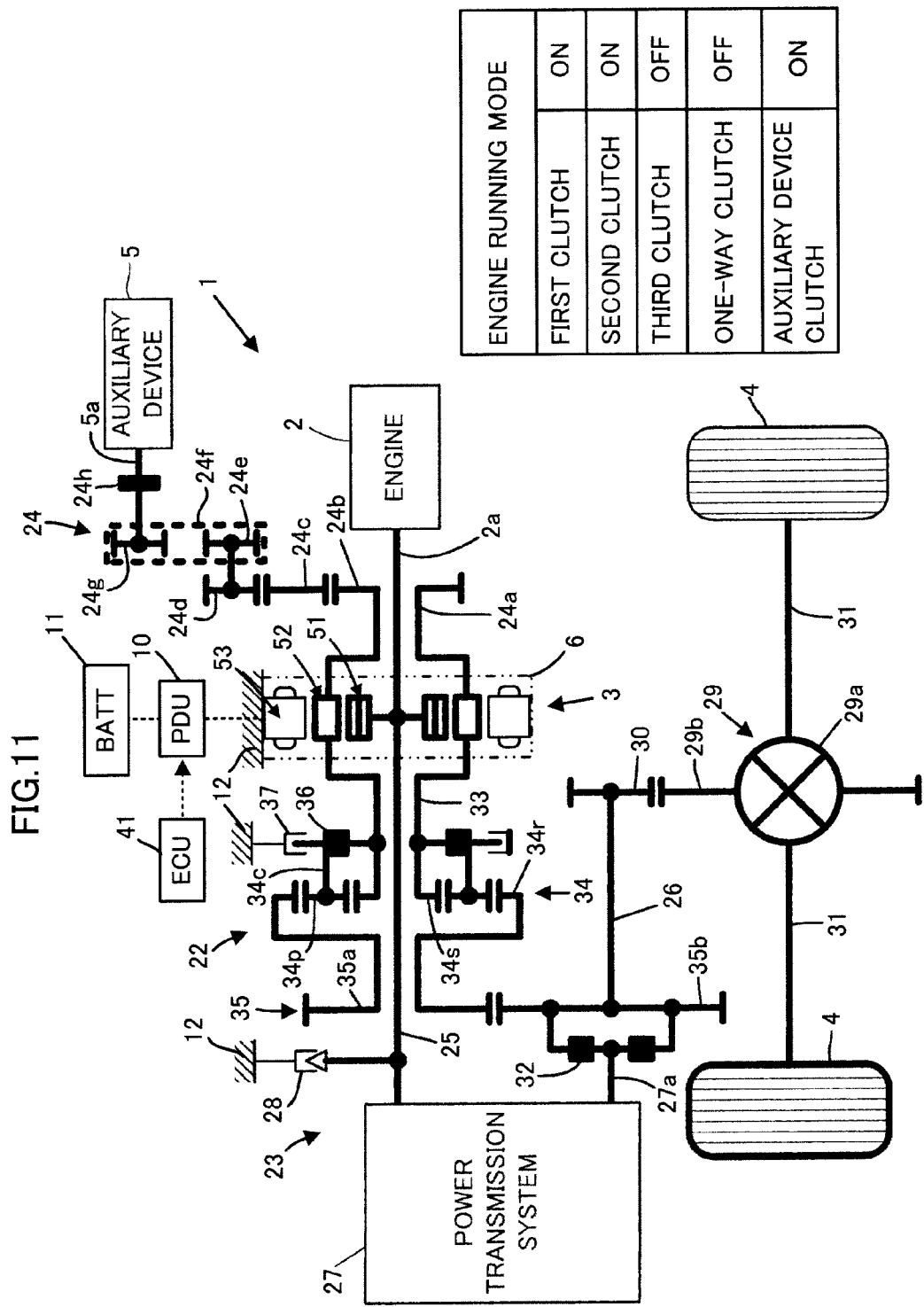
FIG. 11 is a diagram illustrating an operating state in an engine running mode of the power unit 1 according to the first embodiment.

FIG. 11 shows the operating state of the power unit 1 in an engine running mode. The engine running mode is an operation mode shifted from the post-EV engine start mode or the engine drive start-up mode. Moreover, the engine running mode is an operation mode where the power of the engine 2 is transmitted to the driving wheels 4, 4 mainly via the second power transmission path 23 to perform the vehicle running in the advance direction.

As shown, in the engine running mode, the ECU 41 places the first clutch 32 in the ON state. This enables the power transmission between the output shaft 2a of the engine 2 and the driving wheels 4, 4 via the second power transmission path 23.

In the above, if the operation mode immediately before the engine running mode is the engine drive start-up mode, the first clutch 32 is changed from the OFF state to the ON state. If the operation mode immediately before the engine running mode is the post-EV engine start mode, the first clutch 32 is maintained in the ON state which is the same operating state as in the post-EV engine start mode.

Further, the ECU 41 maintains the second clutch 36 and the third clutch 37 in the ON state and the OFF state, respectively, which are the same operating states as in the post-EV engine start mode or the engine drive start-up mode. Therefore, the operation mode of the planetary gear unit 34 is maintained in the integral rotation mode.

The output shaft 2a of the engine 2 has already been rotating and therefore the one-way clutch 28 is maintained in the OFF state.

In the engine running mode, the ECU 41 controls the power of the engine 2 and the change gear ratio of the CVT 27c of the power transmission system 27 of the second power transmission path 23 according to the depressing amount of the accelerator pedal, the rotational speed of the driving wheels 4, 4 (or the vehicle speed), or the like with the first to third clutches 32, 36, and 37 operated in the operating states as described above.

In this condition, the power of the engine 2 is transmitted from the output shaft 2a of the engine 2 to the driving wheels 4, 4 via the second power transmission path 23, and the driving wheels 4, 4 are driven in the advance direction of the vehicle.

Moreover, in the engine running mode, the ECU 41 places the auxiliary device clutch 24h in the ON state. Thereby, a part of the power of the engine 2 is transmitted to the input shaft 5a of the auxiliary device 5 via the first rotor 51 and the second rotor 52 of the rotating machine 3 and the auxiliary device power transmission path 24, and the auxiliary device 5 is driven by the power of the engine 2.

In the engine running mode, the rotational speed of the second rotor 52 of the rotating machine 3 is uniquely determined according to the rotational speed of the driving wheels 4, 4 (or the vehicle speed). Moreover, the rotational speed of the first rotor 51 is determined according to the rotational speed of the driving wheels 4, 4 (or the vehicle speed) and the change gear ratio of the change gear of the power transmission system 27.

Additionally, in the engine running mode, the electricity supply to the coils 532 of the rotating machine 3 may be disconnected (the generation of the rotating magnetic field may be stopped). Depending on the situation, however, it is possible to perform power running for supplying electric power to the stator 53 of the rotating machine 3 or to perform generating operation for causing the stator 53 to generate electric power. In this case, for example, if the required driving force of the vehicle according to the depressing amount of the accelerator pedal is greater than a predetermined value, the power running of the rotating machine 3 enables the power of the engine 2 to be transmitted to the driving wheels 4, 4 via the second power transmission path 23 and further enables the power (power running torque) applied to the second rotor 52 from the stator 53 side via the rotating magnetic field to be transmitted to the driving wheels 4, 4 via the first power transmission path 22. Moreover, if the remaining capacity of the battery 11 is low (if the remaining capacity is equal to or less than a predetermined threshold value), the generating operation of the rotating machine 3 enables a part of the power (output energy) of the engine 2 to be converted to electric power energy of the coils 532 so as to charge the battery 11 with the electric power energy.

Further, in the engine running mode, both of the second clutch 36 and the third clutch 37 may be placed in the OFF state (the operation mode of the planetary gear unit 34 is set to the power transmission disabled mode). In this case, the power transmitted to the auxiliary device 5 is able to be adjusted by performing the power running or generating operation of the rotating machine 3.

[Engine Drive Reverse Mode]

Figure 12:
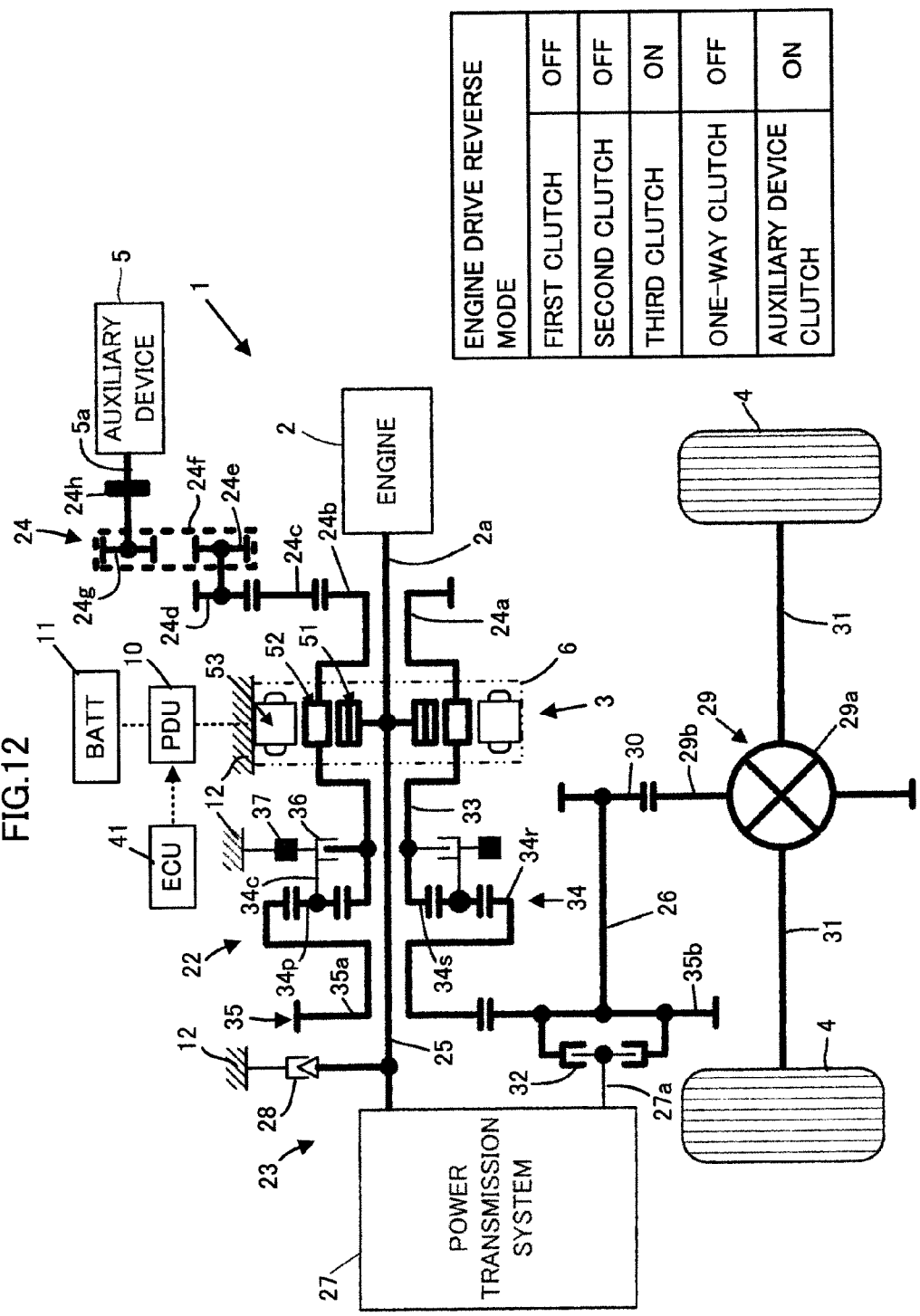
FIG. 12 is a diagram illustrating an operating state in an engine drive reverse mode of the power unit 1 according to the first embodiment.

FIG. 12 shows the operating state of the power unit 1 in an engine drive reverse mode. The engine drive reverse mode is an operation mode shifted from the stop-period engine idle mode. Moreover, the engine drive reverse mode is an operation mode where the vehicle is reversed by using the power of the engine 2.

The engine drive reverse mode is the operation mode different from the engine drive start-up mode only in the operating states of the second clutch 36 and the third clutch 37 (the operation mode of the planetary gear unit 34).

Specifically, as shown, in the engine drive reverse mode, the ECU 41 places the first clutch 32 in the same operating state (the OFF state) as in the engine drive start-up mode. Further, the ECU 41 places the second clutch 36 and the third clutch 37 in the OFF state and the ON state, respectively. Therefore, the operation mode of the planetary gear unit 34 is set to the reverse rotation mode.

In this case, if the operation mode immediately before the engine drive reverse mode is the stop-period engine idle mode, the change operation of the third clutch 37 from the OFF state to the ON state (switching the operation mode of the planetary gear unit 34 from the power transmission disabled mode to the reverse rotation mode) is performed after the stop of the rotation of the second rotor 52 of the rotating machine 3, in the same manner as the change operation of the second clutch 36 from the OFF state to the ON state in the engine drive start-up mode. This prevents the occurrence of a shock caused by sudden braking of the second rotor 52 of the rotating machine 3 or the like.

The output shaft 2a of the engine 2 has already been rotating in the forward rotation direction and therefore the one-way clutch 28 is maintained in the OFF state. In addition, the ECU 41 maintains the operating state of the auxiliary device clutch 24h in the ON state.

Moreover, in the engine drive reverse mode, the ECU 41 controls the operations of the rotating machine 3 and the engine 2, quite in the same manner as in the engine drive start-up mode, with the first to third clutches 32, 36, and 37 and the auxiliary device clutch 24h operated as described above. In this case, the rotation direction of the ring gear 34r of the planetary gear unit 34 is reverse to the rotation direction of the sun gear 34s of the planetary gear unit 34 and the second rotor 52 of the rotating machine 3, in other words, the rotation direction of the ring gear 34r is the reverse rotation direction. Therefore, the power transmitted from the output shaft 2a of the engine 2 to the driving wheels 4, 4 is power in the vehicle reversed direction (power in the reverse rotation direction of the driving wheels 4, 4). Thereby, the reverse running of the vehicle is performed.

Moreover, upon the start-up of the vehicle, the second rotor 52 of the rotating machine 3 rotates in the forward rotation direction. Therefore, a part of the power of the engine 2 is transmitted to the input shaft 5a of the auxiliary device 5 via the second rotor 52 and the auxiliary device power transmission path 24 and thereby the auxiliary device 5 is driven.

Additionally, although the engine drive reverse mode is the operation mode where the vehicle is reversed by using the engine power, it is also possible to reverse the vehicle by using only the power of the rotating machine 3. If that is the case, the second clutch 36 and the third clutch 37 are placed in the OFF state and the ON state, respectively, instead of placing the second clutch 36 and the third clutch 37 in the ON state and the OFF state in the EV start-up and running mode (the operation mode of the planetary gear unit 34 is set to the reverse rotation mode instead of the integral rotation mode). Other operation controls are the same as those in the EV start-up and running mode.

As described above, according to the power unit 1 of this embodiment, the auxiliary device 5 is able to be driven by using the power of one of the engine 2 and the rotating machine 3, which are power generation sources for driving the driving wheels 4, 4, without using an auxiliary device driving motor in a state other than the rotation stopped state of the second rotor 52 of the rotating machine 3.

Moreover, the planetary gear unit 34 provided in the first power transmission path 22 enables power transmission via the first power transmission path 22 by the combination of the operating states of the second clutch 36 and the third clutch 37. Further, by the combination of the operating states of the second clutch 36 and the third clutch 37, the planetary gear unit 34 implements a function of disconnecting the power transmission via the first power transmission path 22, a function of switching the rotation direction of the driving wheels 4, 4 rotated by the power transmitted via the first power transmission path 22 with the second rotor 52 of the rotating machine 3 rotationally driven in the forward rotation direction, and a function of non-rotatably locking the second rotor 52 of the rotating machine 3. Therefore, it is possible to operate the power unit 1 in various operation modes with the configuration of the power unit 1 simplified by decreasing the number of parts of the power unit 1.

Second Embodiment

Figure 13:
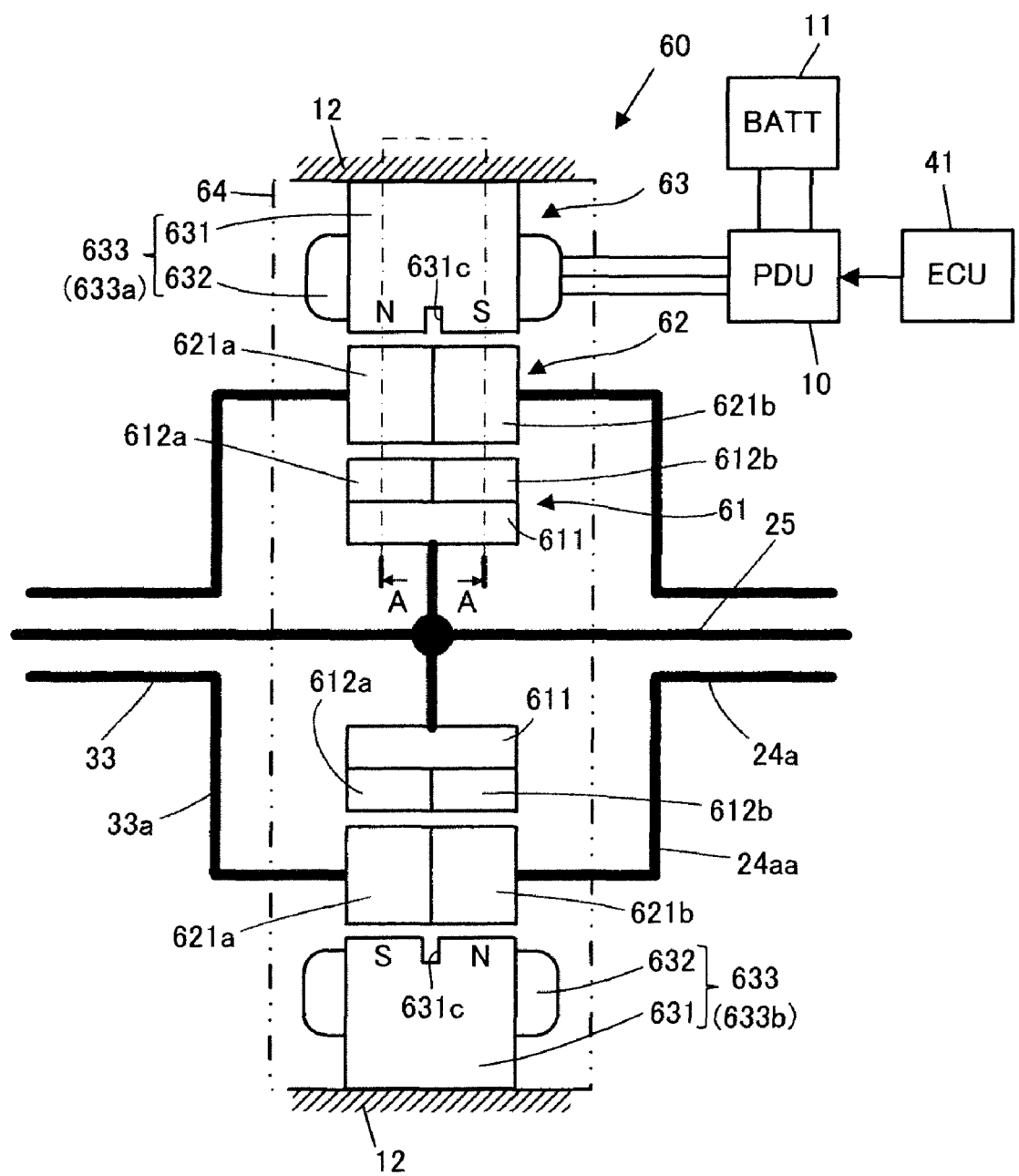
FIG. 13 is a diagram illustrating a schematic structure of a rotating machine 60 included in the power unit according to a second embodiment of the present invention by means of a typically-enlarged vertical section of the rotating machine 60.
Figure 14:
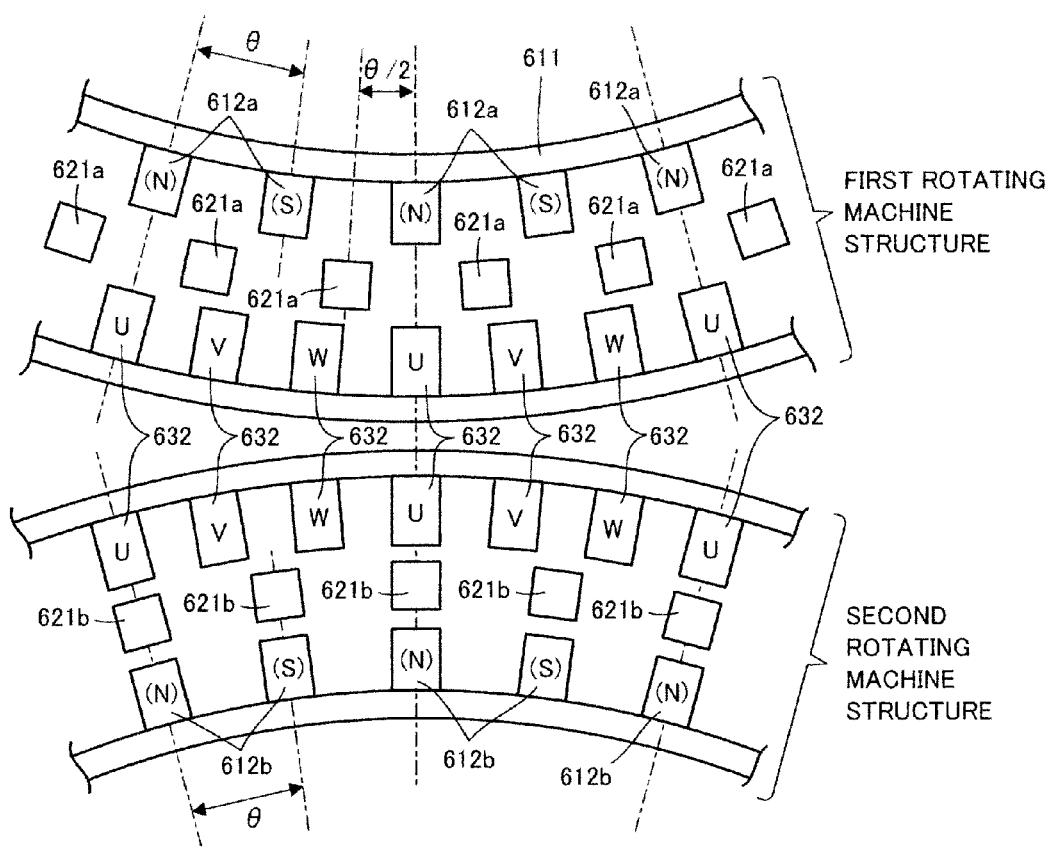
FIG. 14 is a sectional view taken on line A-A of FIG. 13 illustrating a stator, a first rotor, and a second rotor included in the rotating machine 60 in FIG. 13.

The following describes a second embodiment of the present invention with reference to FIGS. 13 to 14. This embodiment is different from the power unit 1 of the first embodiment only in a part of the configuration of the rotating machine. More specifically, this embodiment includes a rotating machine 60 which is different from the rotating machine 3 only in a part of the configuration (the rotating machine 60 which functions as an energy dispensing/synthesizing system in the fourth invention), instead of the rotating machine 3. Therefore, in the description of this embodiment, the same components as those in the first embodiment are denoted by the same reference numerals as in the first embodiment and their description is omitted.

Referring to FIG. 13, the rotating machine 60 includes a first rotor 61 and a second rotor 62 as two bodies of rotation rotationally supported in a housing 64 of the rotating machine 60 and includes an immovable stator 63 fixed to the housing 64 in the inside thereof. In this instance, the stator 63 is disposed in the periphery of the first rotor 61 so as to be opposed to the first rotor 61. The second rotor 62 is disposed between the first rotor 61 and the stator 63 so as to rotate in a non-contact state with respect thereto. Accordingly, the first rotor 61, the second rotor 62, and the stator 63 are concentrically disposed. The housing 64 is fixed to the immovable part 12 in the same manner as in the rotating machine 3 of the first embodiment.

The first rotor 61 includes a cylindrical base 611 and a plurality of first permanent magnets 612a and a plurality of second permanent magnets 612b secured to the outer peripheral surface of the base 611. Further, the base 611 is inserted onto the first rotating shaft 25 and fixed to the first rotating shaft 25 so as to rotate integrally with the first rotating shaft 25.

In this instance, the number of the first permanent magnets 612a is the same (even number) as the number of the second permanent magnets 612b. Further, the first permanent magnets 612a and the second permanent magnets 612b are arranged at regular intervals in the circumferential direction on the outer peripheral surface of the base 611. Moreover, the first permanent magnets 612a are respectively in contact with the second permanent magnets 612b with being arranged in one row in the central axis direction of the first rotating shaft 25. In this instance, as indicated by (N) and (S) in FIG. 14, the magnetic poles on the outer surfaces of two permanent magnets 612a, 612a or 612b, 612b adjacent to each other in the circumferential direction are different in polarity from each other in either of the arrangement of the first permanent magnets 612a and the arrangement of the second permanent magnets 612b. Specifically, the N-pole and the S-pole are arranged alternately in both of a magnetic pole row formed on the outer peripheral surface of the first rotor 61 by the arrangement of the first permanent magnets 612a (hereinafter, referred to as the first magnetic pole row in some cases) and a magnetic pole row formed on the outer peripheral surface of the first rotor 61 by the arrangement of the second permanent magnets 612b (hereinafter, referred to as the second magnetic pole row in some cases). Moreover, the magnetic poles on the outer surfaces of the first permanent magnets 612a and the second permanent magnets 612b arranged in the central axis direction are the same in polarity.

The stator 63 has a plurality of armatures 633 for generating a rotating magnetic field to be applied to the first rotor 61 and the second rotor 62 inside the stator 63. Further, the stator 63 includes a cylindrical iron core (armature iron core) 631 and coils (armature windings) 632 of three phases, i.e., U, V, and W phases attached to the inner peripheral surface of the iron core 631. The iron core 631 is coaxially inserted onto the first rotating shaft 25 and fixed to the housing 64. Moreover, an annular groove 631c extending in the circumferential direction is formed in the central part (the central part in the central axis direction) in the inner peripheral surface of the iron core 631.

Each of the coils 632 of the U, V, and W phases and the iron core 631 constitute an individual armature 633. The coils 632 of the three U, V, and W phases are attached to the iron core 631 so as to be arranged in the circumferential direction (See FIG. 14). This enables the constitution of an armature row formed of the plurality of (a multiple of 3) armatures 633 arranged in the circumferential direction.

Further, the coils 632 of the three phases in the armature row are arranged so as to generate armature magnetic poles (N-pole and S-pole) different in polarity from each other arranged in the central axis direction of the first rotating shaft 25 at one end portion on the first permanent magnet 612a side of the inner peripheral surface of the iron core 631 and the other end portion on the second permanent magnet 612b side when a three-phase alternating current is applied to the coils 632 (see "N" and "S" in FIG. 13). In this case, both of the armature magnetic poles generated at the end portion on the first permanent magnet 612a side of the inner peripheral surface of the iron core 631 and the armature magnetic poles generated at the end portion on the second permanent magnet 612b side are a plurality of (an even number of) magnetic poles which are arranged at regular intervals in the circumferential direction and rotate in the circumferential direction. Moreover, in both of the armature magnetic poles on the first permanent magnet 612a side and the armature magnetic poles on the second permanent magnet 612b side, two armature magnetic poles adjacent to each other in the circumferential direction are different in polarity from each other. Hereinafter, the armature magnetic poles generated at the end portion on the first permanent magnet 612a side of the inner peripheral surface of the iron core 631 by the electricity supply to the coils 632 are referred to as the first armature magnetic poles, and the armature magnetic poles generated at the end portion on the second permanent magnet 612b side are referred to as the second armature magnetic poles. Moreover, the part on the first permanent magnet 612a side (the part generating the first armature magnetic pole) of the armature 633 is referred to as the first armature 633a and the part on the second permanent magnet 612b side (the part generating the second armature magnetic pole) of the armature 633 is referred to as the second armature 633b.

In this case, the first armature magnetic poles and the second armature magnetic poles arranged in a row in the central axis direction of the first rotating shaft 25 are different in polarity from each other as described above. Further, both of the number of the first armature magnetic poles and the number of second armature magnetic poles arranged at regular intervals in the circumferential direction are set to the same value as the number of the first permanent magnets 612a (=the number of the second permanent magnets 612b). Therefore, if an angular interval between two first permanent magnets 612a, 612a adjacent to each other in the circumferential direction (=an angular interval between two second permanent magnets 612b adjacent to each other in the circumferential direction) is set to θ in the first rotor 61 as shown in FIG. 14, the angular interval between the first armature magnetic poles adjacent to each other in the circumferential direction and an angular interval between the second armature magnetic poles adjacent to each other in the circumferential direction are both θ. In addition, the value of the angular interval θ is "π" in terms of electric angle. The term "electric angle" in this embodiment means an angle obtained by multiplying a mechanical angle by a pole logarithm of the magnetic poles of the first permanent magnets 612a (=a pole logarithm of the magnetic poles generated by the second permanent magnets 612b=a pole logarithm of the first armature magnetic poles=a pole logarithm of the second armature magnetic poles).

The stator 63 generates a first rotating magnetic field and a second rotating magnetic field inside the iron core 631 by a rotation of the first armature magnetic pole row formed of the first armature magnetic poles arranged in the circumferential direction and a rotation of the second armature magnetic pole row formed of the second armature magnetic poles arranged in the circumferential direction, respectively. In this case, when viewed in the central axis direction of the first rotating shaft 25, there is a phase difference "π" in terms of an electric angle between the first armature magnetic pole row and the second armature magnetic pole row. In other words, there is the phase difference "π" in terms of an electric angle between first rotating magnetic field and the second rotating magnetic field.

Moreover, the coils 632 of the three phases are electrically connected to the battery 11 via the PDU 10 in the same manner as the coils 532 of the first embodiment. This enables electric power to be transmitted or received between the coils 632 and the battery 11 (input/output of electric energy to or from the coils 632) via the PDU 10. Further, the ECU 41 is able to control the electricity supply to the coils 632 via the PDU 10 and consequently to control the generation mode of the first rotating magnetic field and the generation mode of the second rotating magnetic field (the rotational speed and the magnetic flux intensity of the first rotating magnetic field and those of the second rotating magnetic field).

Additionally, the coil 632 corresponds to the electric element in the present invention.

The second rotor 62 includes first cores 621a and second cores 621b made of soft magnetic materials each in the same number. The number of the first cores 621a and the number of the second cores 621b are each the same as the number of the first permanent magnets 612a. The first cores 621a are arranged at regular intervals in the circumferential direction (at angular intervals of θ in the above) in the portion on the first permanent magnet 612a side between the first rotor 61 and the stator 63. Similarly, the second cores 621b are arranged at regular intervals in the circumferential direction (at angular intervals of θ in the above) in the portion on the second permanent magnet 612b side between the first rotor 61 and the stator 63. Note that, however, the first cores 621a and the second cores 621b are arranged so that there is a phase difference of θ/2 (π/2 in terms of an electric angle) which is a half of the angular interval of θ in the circumferential direction as shown in FIG. 14. Hereinafter, a row of the first cores 621a and a row of the second cores 621b arranged in the circumferential direction as described above will be referred to as the first soft magnetic material row and the second soft magnetic material row, respectively.

The second rotor 62 having the first soft magnetic material row and the second soft magnetic material row is, in the same manner as in the first embodiment, fixed to annular flanges 33a and 24aa in such a way as to be held between the annular flange 33a formed at the end portion of the fourth rotating shaft 33 and the annular flange 24aa formed at the end portion (the end portion on the rotating machine 3 side) of the auxiliary device driving rotating shaft 24a. Thereby, the second rotor 62 (the soft magnetic material row) rotates integrally with the fourth rotating shaft 33 and the auxiliary device driving rotating shaft 24a.

The rotating machine 60 configured as described above includes a combination of a first armature row which is a row of a plurality of first armatures 633a generating the first armature magnetic poles, a first magnetic pole row formed of first permanent magnets 612a, and a first soft magnetic material row which is a row of the first cores 621a and a combination of a second armature row which is a row of a plurality of second armatures 633b generating the second armature magnetic poles, a second magnetic pole row formed of second permanent magnets 612b, and a second soft magnetic material row which is a row of the second cores 621b, respectively, as the rotating machine structures in the fourth invention. In other words, the rotating machine 60 of this embodiment has two rotating machine structures.

Moreover, in the rotating machine 60, the magnetic poles on the outer surfaces of the first permanent magnet 612a and the second permanent magnet 612b arranged in the central axis direction of the first rotating shaft 25 are the same in polarity as described above. Therefore, when viewed in the central axis direction of the first rotating shaft 25, the first magnetic pole row formed of the first permanent magnets 612a has the same phase arrangement as the second magnetic pole row formed of the second permanent magnets 612b. Further, by the control of electricity supply to the coils 632 by the ECU 41, there is a phase difference of "π" in terms of an electric angle between the first armature magnetic pole row which is the row of the first armature magnetic poles arranged in the circumferential direction on the first armature 633a side and a second armature magnetic pole row which is the row of the second armature magnetic poles arranged in the circumferential direction on the second armature 633b side. Therefore, a phase difference between the first armature magnetic pole row generated by the first armature row and the first magnetic pole row in the first rotating machine structure deviates from a phase difference between the second armature magnetic pole row and the second magnetic pole row in the second rotating machine structure by 2π/n (n=2) in terms of an electric angle.

Moreover, as described above, there is a phase difference of π/2 in terms of an electric angle between the first soft magnetic material row formed of the first cores 621a and the second soft magnetic material row formed of the second cores 621b. Therefore, a phase difference between the first armature magnetic pole row and the first soft magnetic material row in the first rotating machine structure deviates from a phase difference between the second armature magnetic pole row and the second soft magnetic material row in the second rotating machine structure by π/n (n=2) in terms of an electric angle.

In the rotating machine 60 according to this embodiment configured as described above, the following equations (5a), (5b), and (5c) express the time rates of change dψuu/dt, dψvv/dt, and dψww/dt (ψuu, ψvv, and ψww are total flux linkages applied to the U-phase coil, the V-phase coil, and the W-phase coil, respectively) of the total magnetic fluxes (flux linkages) applied to the coils 632 of the respective phases of the first and second rotating machine structures. The term "total magnetic fluxes" applied to the coils 632 of the respective phases means magnetic flux total sums obtained by adding up the flux linkages, which are applied to the coils 632 of the respective phases from the magnetic poles of the first rotor 61 in the respective rotating machine structures, with respect to all rotating machine structures.

$$\frac{d\Psi uu}{dt} = -\frac{\Psi}{2} \cdot (2 \cdot \omega e22 - \omega e11) \cdot \sin(2 \cdot \theta e22 - \theta e11) \tag{5a}$$

$$\frac{d\Psi vv}{dt} = -\frac{\Psi}{2} \cdot (2 \cdot \omega e22 - \omega e11) \cdot \sin\left(2 \cdot \theta e22 - \theta e11 - \frac{2\pi}{3}\right) \tag{5b}$$

$$\frac{d\Psi ww}{dt} = -\frac{\Psi}{2} \cdot (2 \cdot \omega e22 - \omega e11) \cdot \sin\left(2 \cdot \theta e22 - \theta e11 + \frac{2\pi}{3}\right) \tag{5c}$$

In the above equations (5a) to (5c), ψ is a total amount of magnetic flux of the permanent magnets 612a and 612b of the first rotor 61, θe22 is a rotation angle position in terms of an electric angle of the second rotor 62 relative to one reference coil among the coils 632 of the stator 63, ωe22 is a time rate of change of θe22 (in other words, an electric angular velocity of the second rotor 62), θe11 is a rotation angle position in terms of an electric angle of the first rotor 61 relative to the reference coil, and ωe11 is a time rate of change of θe11 (in other words, an electric angular velocity of the first rotor 61). In the equations (5a) to (5c), a value of θe11 is zero in a state where one magnetic pole of the first permanent magnets 612a of the first rotor 61 is opposed to the reference coil and a value of θe22 is zero in a state where one of the first cores 621a of the second rotor 62 is opposed to the reference coil.

In this case, dψu/dt, dψv/dt, and dψw/dt in the equations (5a) to (5c) represent total counter electromotive voltages (induced voltages) generated in the coils 632 of the respective phases along with the rotations of the first rotor 61 and the second rotor 62 relative to the stator 63.

Therefore, in this embodiment, the ECU 41 controls the current applied to the coils 632 of the stator 63 via the PDU 10 so that a rotation angle position θmf (a rotation angle position in terms of an electric angle) of a magnetic flux vector of the rotating magnetic fields of the first and second armature magnetic poles generated by the electricity supply to the coils 632 of the stator 63 and an angular velocity ωmf (electric angular velocity) which is the time rate of change (derivative) of the rotation angle position θmf satisfy the following equations (6a) and (6b):

$$\theta mf2 = 2 \cdot \theta e22 - \theta e11 \quad (6a)$$

$$\omega mf2 = 2 \cdot \omega e2 - \omega e1 \quad (6b)$$

As described above, it is possible to operate the rotating machine 60 appropriately to generate torques in the first rotor 61 and the second rotor 62 by causing the stator 63 to generate the rotating magnetic fields of the first and second armature magnetic poles.

The interrelation between the rotational speeds represented by the equation (6b) is the same in relation as the interrelation between the rotational speeds of the sun gear, the ring gear, and the carrier of the single-pinion type planetary gear unit in which the gear ratio between the sun gear and the ring gear is 1:2. Regarding the torques, the same relation (an equation where m=1 in the equation (4)) as the interrelation between the sun gear, the ring gear, and the carrier of the planetary gear unit is established.

Therefore, the rotating machine 60 of this embodiment also has a function of a planetary gear unit in the same manner as the rotating machine 3 of the first embodiment. In other words, the first and second armature magnetic poles, the first rotor 51, and the second rotor 52 rotate with the collinear relationship represented by the equation (6b) maintained.

Further, in this instance, the rotating machine 60 has a function of dispensing or synthesizing power in the same manner as the rotating machine 3 of the first embodiment. More specifically, energy is able to be dispensed or synthesized among the coils 632 of the stator 63, the second rotor 62, and the first rotor 61 via a magnetic circuit formed among the stator 63, the first and second cores 621a and 621b (soft magnetic materials) of the second rotor 62, and the first and second permanent magnets 612a and 612b of the first rotor 61.

The power unit according to this embodiment has the same configuration as the first embodiment except the rotating machine 60 described above. The power unit is then capable of performing the operations in the operation modes such as the stop-period idle stop mode described in the first embodiment in the same manner as in the first embodiment.

Also in the power unit according to this embodiment, the auxiliary device 5 is able to be driven by using the power of one of the engine 2 and the rotating machine 60, which are power generation sources for driving the driving wheels 4, 4, without using an auxiliary device driving motor in a state other than the rotation stopped state of the second rotor 62 of the rotating machine 60 in the same manner as the first embodiment.

Moreover, the planetary gear unit 34 provided in the first power transmission path 22 has the four types of functions by the combination of the operating states of the second clutch 36 and the third clutch 37 as described in the first embodiment. Therefore, it is possible to operate the power unit in various operation modes with the configuration of the power unit simplified by decreasing the number of parts of the power unit.

Third Embodiment

Figure 15:
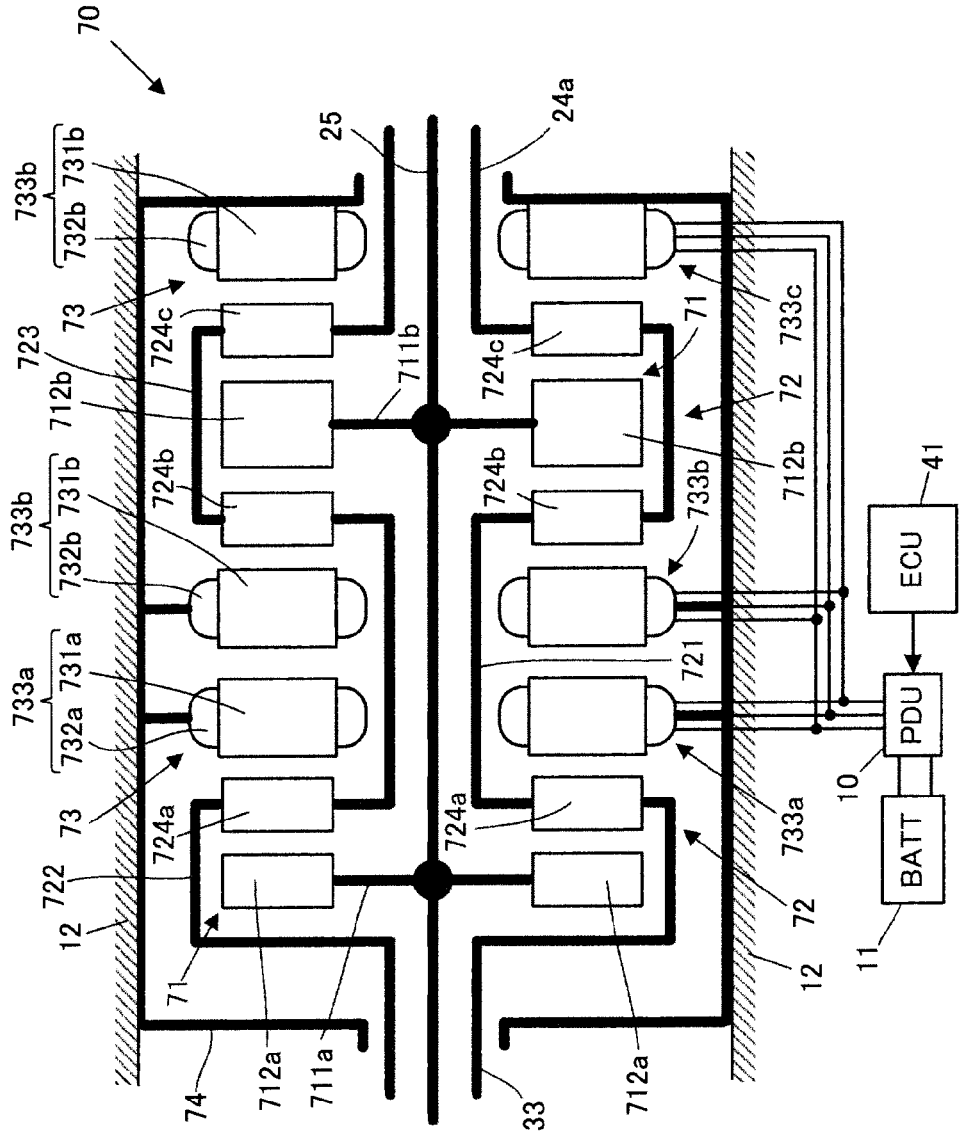
FIG. 15 is a diagram illustrating a schematic structure of a rotating machine 70 in a third embodiment of the present invention by means of a typically-enlarged vertical section of the rotating machine 70.
Figure 16:
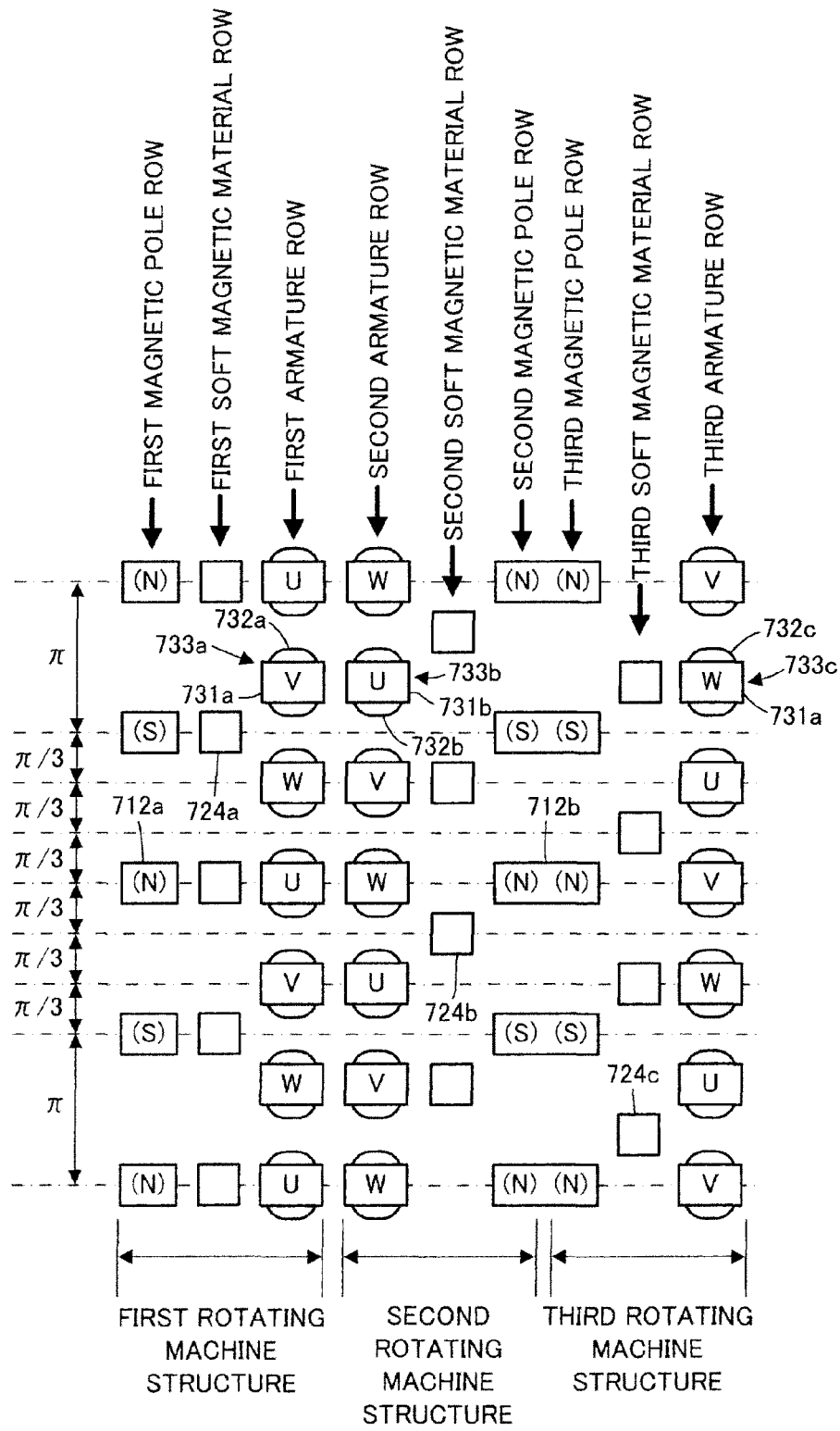
FIG. 16 is a typically expanded diagram illustrating the rotating machine 70 with the longitudinal direction (vertical direction) of the page as the circumferential direction of the rotating machine 70 and the lateral direction (horizontal direction) of the page as the central axis direction of the rotating machine 70.
Figure 17:
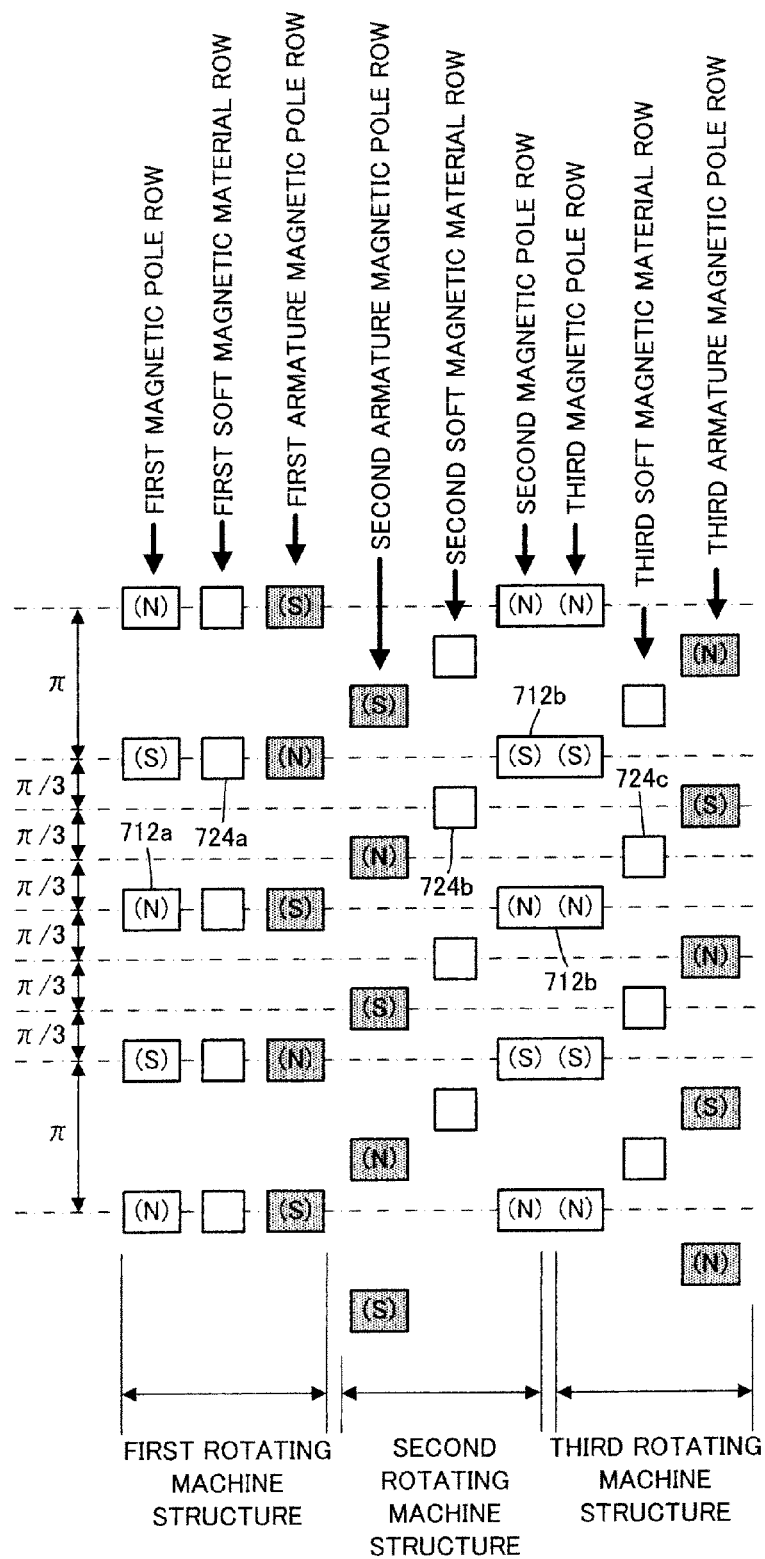
FIG. 17 is a diagram illustrating an example of armature magnetic pole rows generated by armature rows, instead of the armature rows in FIG. 16.

The following describes a third embodiment of the present invention with reference to FIGS. 15 to 17. This embodiment is different from the power unit 1 of the first embodiment only in a part of the configuration of the rotating machine. More specifically, this embodiment includes a rotating machine 70 which is different from the rotating machine 3 only in a part of the configuration (the rotating machine 70 which functions as an energy dispensing/synthesizing system in the fourth invention), instead of the rotating machine 3. Therefore, in the description of this embodiment, the same components as those in the first embodiment are denoted by the same reference numerals as in the first embodiment and their description is omitted.

While the power unit of the second embodiment includes the rotating machine 60 having two rotating machine structures, the rotating machine 70 of this embodiment has still more rotating machine structures such as, for example, three rotating machine structures. Specifically, the rotating machine 70 corresponds to an energy dispensing/synthesizing system in which the number n of the rotating machine structures is set to 3 (n=3) in the fourth invention.

Referring to FIG. 15, the rotating machine 70 includes a first rotor 71 and a second rotor 72 as two bodies of rotation rotationally supported in a housing 74 of the rotating machine 70 and includes an immovable stator 73 fixed to the housing 74 in the inside thereof. The housing 74 is fixed to the immovable part 12 in the same manner as in the rotating machine 3 of the first embodiment. In the following description, the term "circumferential direction" means the direction around the central axis of the first rotating shaft 25, unless otherwise specified.

The first rotor 71 includes two disk-like bases 711a and 711b, which are coaxially fixed to the first rotating shaft 25 with a space apart from each other in the central axis direction of the first rotating shaft 25, a plurality of first permanent magnets 712a secured to the outer peripheral surface of the base 711a, and a plurality of second permanent magnets 712b secured to the outer peripheral surface of the base 711b. The bases 711a and 711b are rotatable integrally with the first rotating shaft 25.

The number of the first permanent magnets 712a is the same (even number) as the number of the second permanent magnets 712b. Further, the first permanent magnets 712a are arranged at regular intervals in the circumferential direction on the outer peripheral surface of the base 711a. Similarly, the second permanent magnets 712b are arranged at regular intervals in the circumferential direction on the outer peripheral surface of the base 711b. Moreover, the first permanent magnets 712a and the second permanent magnets 712b are arranged so that each first permanent magnet 712a and each second permanent magnet 712b are located in a line in the central axis direction of the first rotating shaft 25.

In this instance, the magnetic poles, which are generated on the end surface of each first permanent magnet 712a on the second permanent magnet 712b side (on the right-side end surface in FIG. 15) out of both end surfaces of the first permanent magnet 712a in the central axis direction of the first rotating shaft 25, are different in polarity from each other, with respect to two first permanent magnets 712a, 712a adjacent to each other in the circumferential direction as indicated by (N) and (S) in FIG. 16. In other words, due to the magnet row formed by arranging the first permanent magnets 712a in the circumferential direction, the N-pole and the S-pole are arranged alternately in the magnetic pole row formed around the base 711a on one end surface (the right-side end surface in FIG. 15) side of the base 711a (hereinafter, the magnetic pole row is referred to as the first magnetic pole row).

Moreover, the magnetic poles, which are generated on the end surface of each second permanent magnet 712b on the first permanent magnet 712a side (on the left-side end surface in FIG. 15), and the magnetic poles, which are generated on the end surface on the opposite side (on the right-side end surface in FIG. 15), out of both end surfaces of the second permanent magnet 712b in the central axis direction of the first rotating shaft 25, are different in polarity from each other, with respect to two second permanent magnets 712b, 712b adjacent to each other in the circumferential direction as shown in FIG. 16. In other words, due to the magnet row formed by arranging the second permanent magnets 712b in the circumferential direction, the N-pole and the S-pole are arranged alternately in both of the magnetic pole row formed around the base 711b on one end surface (the left-side end surface in FIG. 15) side of the base 711b (hereinafter, referred to as the second magnetic pole row) and the magnetic pole row formed around the base 711b on the other end surface (the right-side end surface in FIG. 15) side of the base 711b (hereinafter, referred to as the third magnetic pole row). Moreover, in this embodiment, the magnetic pole of the first magnetic pole row, the magnetic pole of the second magnetic pole row, and the magnetic pole of the third magnetic pole row are the same in polarity with respect to the magnetic poles located in a line in the central axis direction of the first rotating shaft 25. Therefore, when viewed in the central axis direction of the first rotating shaft 25, the first magnetic pole row, the second magnetic pole row, and the third magnetic pole row are the same in phase as one another.

The stator 73 includes a first armature row formed of a plurality of first armatures 733a which generate a rotating magnetic field applied to the first magnetic pole row, a second armature row formed of a plurality of second armatures 733b which generate a rotating magnetic field applied to the second magnetic pole row, and a third armature row formed of a plurality of third armatures 733c which generate a rotating magnetic field applied to the third magnetic pole row. The first armature row is disposed relatively close to the base 711a so as to be opposed to the first magnetic pole row between the bases 711a and 711b of the first rotor 71. Further, the second armature row is disposed relatively close to the base 711b so as to be opposed to the second magnetic pole row between the bases 711a and 711b of the first rotor 71. Still further, the third armature row is disposed on the opposite side (the right side in FIG. 15) to the second armature row with respect to the base 711b so as to be opposed to the third magnetic pole row. These armature rows are fixed to the housing 74.

The first armature row includes iron cores (armature iron cores) 731a and coils (armature windings) 732a of three phases, i.e., U, V, and W phases attached to the respective iron cores 731a. Each of the coils 732a of these phases and the iron core 731a constitute a first armature 733a. The coils 732a are arranged so as to be arranged in the circumferential direction. This enables the constitution of the first armature row formed of the plurality of (a multiple of 3) first armatures 733a arranged in the circumferential direction as shown in FIG. 16.

Further, when a three-phase alternating current is applied to the coils 732a of the three phases in the first armature row, the coils 732a generate a first armature magnetic pole row formed of a plurality (even number) of armature magnetic poles (hereinafter, referred to as the first armature magnetic poles), which are arranged at regular intervals in the circumferential direction on the end surface on the first magnetic pole row side of the iron core 731a (the left-side end surface in FIG. 15) and rotate in the circumferential direction (See FIG. 17). Two armature magnetic poles adjacent to each other in the circumferential direction in the first armature magnetic pole row are different in polarity from each other. The number of first armature magnetic poles is set to the same value as each of the number of the first permanent magnets 712a, and the number of the second permanent magnets 712b.

Similarly to the first armature row, the second armature row includes iron cores (armature iron cores) 731b and coils (armature windings) 732b of three phases, i.e., U, V, and W phases attached to the respective iron cores 731b. Each of the coils 732b of these phases and the iron core 731b constitute a second armature 733b. The coils 732b are arranged so as to be side by side in the circumferential direction. This enables the constitution of the second armature row formed of the plurality of (a multiple of 3) second armatures 733b arranged in the circumferential direction as shown in FIG. 16.

Further, when a three-phase alternating current is applied to the coils 732b of the three phases in the second armature row, the coils 732b generate a second armature magnetic pole row formed of a plurality (even number) of armature magnetic poles (hereinafter, referred to as the second armature magnetic poles), which are arranged at regular intervals in the circumferential direction on the end surface on the second magnetic pole row side of the iron core 731b (the right-side end surface in FIG. 15) and rotate in the circumferential direction (See FIG. 17). Two armature magnetic poles adjacent to each other in the circumferential direction in the second armature magnetic pole row are different in polarity from each other. The number of second armature magnetic poles is set to the same value as each of the number of the first permanent magnets 712a, and the number of the second permanent magnets 712b.

Similarly to the first armature row and the second armature row, the third armature row includes iron cores (armature iron cores) 731c and coils (armature windings) 732c of three phases, i.e., U, V, and W phases attached to the respective iron cores 731b. Each of the coils 732c of these phases and the iron core 731c constitute a third armature 733c. The coils 732c are arranged so as to be side by side in the circumferential direction. This enables the constitution of the third armature row formed of the plurality of (a multiple of 3) third armatures 733c arranged in the circumferential direction as shown in FIG. 16.

Further, when a three-phase alternating current is applied to the coils 732c of the three phases in the third armature row, the coils 732c generate a third armature magnetic pole row formed of a plurality (even number) of armature magnetic poles (hereinafter, referred to as the third armature magnetic poles), which are arranged at regular intervals in the circumferential direction on the end surface on the third magnetic pole row side of the iron core 731c (the left-side end surface in FIG. 15) and rotate in the circumferential direction (See FIG. 17). Two armature magnetic poles adjacent to each other in the circumferential direction in the third armature magnetic pole row are different in polarity from each other. The number of third armature magnetic poles is set to the same value as each of the number of the first permanent magnets 712a, and the number of the second permanent magnets 712b.

As shown in FIG. 16, the U-, V-, and W-phase coils 732b in the second armature row are each disposed so as to have a phase difference of $2\pi/3$ in terms of an electric angle in one circumferential direction (one of the clockwise direction and the counterclockwise direction) relative to the coils 732a of the corresponding phases in the first armature row. Further, the U-, V-, and W-phase coils 732c in the third armature row are disposed so as to have a phase difference of $2\pi/3$ in terms of an electric angle in one circumferential direction described above relative to the coils 732b of the corresponding phases in the second armature row. Here, the term "electric angle" in this embodiment means an angle obtained by multiplying a mechanical angle by a pole logarithm of the first magnetic pole row (=a pole logarithm of the second magnetic pole row=a pole logarithm of the third magnetic pole row).

The stator 73 of the rotating machine 70 in this embodiment generates a first rotating magnetic field, a second rotating magnetic field, and a third rotating magnetic field by a rotation of the first armature magnetic pole row, a rotation of the second armature magnetic pole row, and a rotation of the third armature magnetic pole row, respectively. In this case, as described above, the coils 732b of each phase of the second armature row and the coils 732c of each phase of the third armature row are disposed so as to have a phase difference of $2\pi/3$ in terms of an electric angle in one circumferential direction relative to the coils 732a of the phases of the first armature row. Therefore, as shown in FIG. 17, the second armature magnetic pole row has a phase difference of $2\pi/3$ in one circumferential direction (the downward in FIG. 17) relative to the first armature magnetic pole row, and the third armature magnetic pole row has a phase difference of $2\pi/3$ in one direction described above relative to the second armature magnetic pole row. Therefore, there is a phase difference of $2\pi/n$ (n=3) between the first, second, and third armature magnetic pole rows.

Moreover, the coils 732a, 732b, and 732c of the three phases are electrically connected to the battery 11 via the PDU 10. This enables electric power to be transmitted or received between the coils 732a, 732b, and 732c and the battery 11 (input/output of electric energy to or from the coils 732a, 732b, and 732c) via the PDU 10. Further, the ECU 41 is able to control the electricity supply to the coils 732a, 732b, and 732c via the PDU 10 and consequently to control the operation modes of the first to third rotating magnetic fields (the rotational speed and the magnetic flux intensity of the first to third rotating magnetic fields).

Additionally, the coils 732a, 732b, and 732c each correspond to the electric element in the present invention.

The second rotor 72 includes a small-diameter cylindrical first base 721, a large-diameter cylindrical second base 722 and a large-diameter cylindrical third base 723 coaxially connected to one end portion (the left-side end portion in FIG. 15) and the other end portion (the right-side end portion in FIG. 15) of the first base 721, respectively, a plurality of first cores 724a made of soft magnetic materials secured to the end surface (the right-side end surface in FIG. 15) on the first base 721 side of the second base 722, a plurality of second cores 724b made of soft magnetic materials secured to the end surface (the left-side end surface in FIG. 15) on the first base 721 side of the third base 723, and a plurality of third cores 724c made of soft magnetic materials secured to the end surface on the opposite side to the first base 721 (the right-side end surface in FIG. 15) of the third base 723.

The first to third bases 721 to 723 are coaxially inserted onto the first rotating shaft 25 and provided so as to be integrally rotatable (relatively rotatable integrally with the first rotating shaft 25). Further, the first base 721 is provided so as to pass through the shaft portions of the first armature row and the second armature row. Moreover, the second base 722 is disposed including the first permanent magnets 712a and the base 711a of the first rotor 71 inside on the first permanent magnet 712a side (the left side of the first armature row in FIG. 15) out of both sides of the first armature row. Further, the third base 723 is disposed including the second permanent magnets 712b and the base 711b of the first rotor 71 inside between the second armature row and the third armature row. The end portion of the second base 722 on the opposite side to the first base 721 is coaxially connected to the fourth rotating shaft 33. The end portion of the third base 723 on the opposite side to the first base 721 is coaxially connected to the auxiliary device driving rotating shaft 24a. This enables the second rotor 72 to rotate integrally with the fourth rotating shaft 33 and the auxiliary device driving rotating shaft 24a.

The number of the first cores 724a, the number of the second cores 724b, the number of the third cores 724c are the same as one another and the same as each of the number of the first permanent magnets 712a, the number of the second permanent magnets 712b, and the number of the third permanent magnets 712c (the number of magnetic poles of each of the first magnetic pole row, the second magnetic pole row, and the third magnetic pole row). The first cores 724a are then arranged on the end surface of the second base 722 (on the end surface on the first base 721 side) so as to be arranged at regular intervals in the circumferential direction between the first magnetic pole row and the first armature row. Further, the second cores 724b are arranged on the end surface of the third base 723 (on the end surface on the first base 721 side) so as to be arranged at regular intervals in the circumferential direction between the second magnetic pole row and the second armature row. Still further, the third cores 724c are arranged on the end surface of the third base 723 (on the end surface on the opposite side to the first base 721) so as to be arranged at regular intervals in the circumferential direction between the third magnetic pole row and the third armature row. Hereinafter, the row of the first cores 724a, the row of the second cores 724b, and the row of the third cores 724c arranged as described above are referred to as the first soft magnetic material row, the second soft magnetic material row, and the third soft magnetic material row, respectively.

In this case, as shown in FIG. 16 or FIG. 17, the second soft magnetic material row is provided so as to have a phase difference of $\pi/3$ in terms of an electric angle in one circumferential direction (one of the clockwise direction and the counterclockwise direction) relative to the first soft magnetic material row. Further, the third soft magnetic material row is provided so as to have a phase difference of $\pi/3$ in terms of an electric angle in one circumferential direction described above relative to the second soft magnetic material row. Therefore, the first to third soft magnetic material rows deviate in phase from one another by $\pi/n$ (n=3) in terms of an electric angle.

The rotating machine 70 configured as described above includes a combination of the first armature row which is a row of the first armatures 732a, the first magnetic pole row formed of the first permanent magnets 712a, and the first soft magnetic material row which is a row of the first cores 724a, a combination of the second armature row which is a row of the second armatures 732b, the second magnetic pole row formed of the second permanent magnets 712b, and the second soft magnetic material row which is a row of the second cores 724b, and a combination of the third armature row which is a row of the third armatures 732c, the third magnetic pole row formed of the second permanent magnets 712b, and the third soft magnetic material row which is a row of the third cores 724c are provided as the rotating machine structures in the fourth invention, respectively. In other words, the rotating machine 70 according to this embodiment has three rotating machine structures.

In the rotating machine 70, as described above, the first magnetic pole row, the second magnetic pole row, and the third magnetic pole row are the same in phase as one another (the first to the third magnetic poles located in a line in the central axis direction of the first rotating shaft 25 have the same polarity). Moreover, with the control of electricity supply to the coils 732a to 732b by the ECU 41, the first to third armature magnetic pole rows generated by the first to third armature rows, respectively, deviate in phase from one another by $2\pi/n$ (n=3). Therefore, as apparent from FIG. 17, the phase difference between the first armature magnetic pole row and the first magnetic pole row in the first rotating machine structure, the phase difference between the second armature magnetic pole row and the second magnetic pole row in the second rotating machine structure, and the phase difference between the third armature magnetic pole row and the third magnetic pole row in the third rotating machine structure deviate from one another by $2\pi/n$ (n=3) in terms of an electric angle in one circumferential direction.

Moreover, as described above, the first to third soft magnetic material rows having the first to third rotating machine structures, respectively, deviate in phase from one another by $\pi/n$ (n=3) in terms of an electric angle. Therefore, as apparent from FIG. 17, the phase difference between the first armature magnetic pole row and the first soft magnetic material row in the first rotating machine structure, the phase difference between the second armature magnetic pole row and the second soft magnetic material row in the second rotating machine structure, and the phase difference between the third armature magnetic pole row and the third soft magnetic material row in the third rotating machine structure deviate from one another (among the first to the third rotating machine structures) by $\pi/n$ (n=3) in terms of an electric angle in one circumferential direction.

In the rotating machine 70 according to this embodiment configured as described above, similarly to the second embodiment, the above equations (5a), (5b), and (5c) express the time rates of change $d\psi uu/dt$, $d\psi vv/dt$, and $d\psi ww/dt$ ($\psi uu$, $\psi vv$, and $\psi ww$ are total flux linkages applied to the U-phase coil, the V-phase coil, and the W-phase coil, respectively) of the total magnetic fluxes (flux linkages) applied to the coils 732 of the respective phases of the first to third rotating machine structures, in other words, total counter electromotive voltages (induced voltages) $d\psi uu/dt$, $d\psi vv/dt$, and $d\psi ww/dt$ generated in the coils 732 of the respective phases. The term "total magnetic fluxes" applied to the coils 732 of the respective phases means magnetic flux total sums obtained by adding up the flux linkages, which are applied to the coils 732 of the respective phases from the respective magnetic pole rows in the respective rotating machine structures, with respect to all rotating machine structures.

Therefore, also in this embodiment, the ECU 41 controls the current applied to the coils 732 of the stator 73 via the PDU 10 so that a rotation angle position θmf (a rotation angle position in terms of an electric angle) of a magnetic flux vector of the first to third rotating magnetic fields generated by the electricity supply to the coils 732 of the stator 73 and an angular velocity ωmf (electric angular velocity) which is the time rate of change (derivative) of the rotation angle position θmf satisfy the above equations (6a) and (6b).

As described above, it is possible to operate the rotating machine 70 appropriately to generate torques in the first rotor 71 and the second rotor 72 by causing the stator 73 to generate the first to the third rotating magnetic fields.

Further, in this instance, the rotating machine 70 of this embodiment also has a function of a planetary gear unit in the same manner as the second embodiment. In other words, the first to the third rotating magnetic fields, the first rotor 71, and the second rotor 72 rotate with the collinear relationship represented by the equation (6b) maintained.

Further, in this instance, the rotating machine 70 has a function of dispensing or synthesizing power in the same manner as the rotating machine 60 of the second embodiment. More specifically, energy is able to be dispensed or synthesized among the coils 732 of the stator 73, the second rotor 72, and the first rotor 71 via a magnetic circuit formed by the stator 73, the first to third cores 724a, 724b, and 724c (soft magnetic materials) of the second rotor 72, and the first and second permanent magnets 712a and 712b of the first rotor 71. In this instance, the rotating machine 70 of this embodiment has more rotating machine structures than the rotating machine 60 and therefore is more effective to reduce torque ripple and cogging torque generated in the first rotor 71 and the second rotor 72.

The power unit according to this embodiment has the same configuration as the first embodiment except the rotating machine 70 described above. The power unit is then capable of performing the operations in the operation modes such as the stop-period idle stop mode described in the first embodiment in the same manner as in the first embodiment.

Also in the power unit according to this embodiment, the auxiliary device 5 is able to be driven by using the power of one of the engine 2 and the rotating machine 70, which are power generation sources for driving the driving wheels 4, 4, without using an auxiliary device driving motor in a state other than the rotation stopped state of the second rotor 72 of the rotating machine 70 in the same manner as the first embodiment.

Moreover, the planetary gear unit 34 provided in the first power transmission path 22 has the four types of functions with the combination of the operating states of the second clutch 36 and the third clutch 37 as described in the first embodiment. Therefore, it is possible to operate the power unit in various operation modes with the configuration of the power unit simplified by decreasing the number of parts of the power unit.

Although the rotating machine 70 is configured so that the armature row is disposed in the right side of the magnetic pole row (the right side in the central axis direction) in the first rotating machine structure and the third rotating machine structure and the armature row is disposed in the left side of the magnetic pole row (the left side in the central axis direction) in the second rotating machine structure in the third embodiment described above as shown inn FIG. 16, the armature row may be disposed in either of the right side and the left side of the magnetic pole row in all rotating machine structures.

Moreover, although the magnetic pole rows in the respective rotating machine structures have the same phase when viewed in the central axis direction in the second and third embodiments, the phase of the magnetic pole rows may be deviated in the circumferential direction.

Further, although the second and third embodiments have been described by taking an example of a rotating machine having two or three rotating machine structures in the fourth invention, the rotating machine may be configured so as to have still more rotating machine structures. Also in that case, it is possible to achieve a rotating machine having the collinear relationship represented by the equation (6b) by controlling the current applied to the coils of the stator so as to satisfy the relational expressions (6a) and (6b). Moreover, the rotating machine becomes more effective to reduce torque ripple and cogging torque generated in the first rotor 71 and the second rotor 72 by increasing the number of rotating machine structures.

Fourth Embodiment

Figure 18:
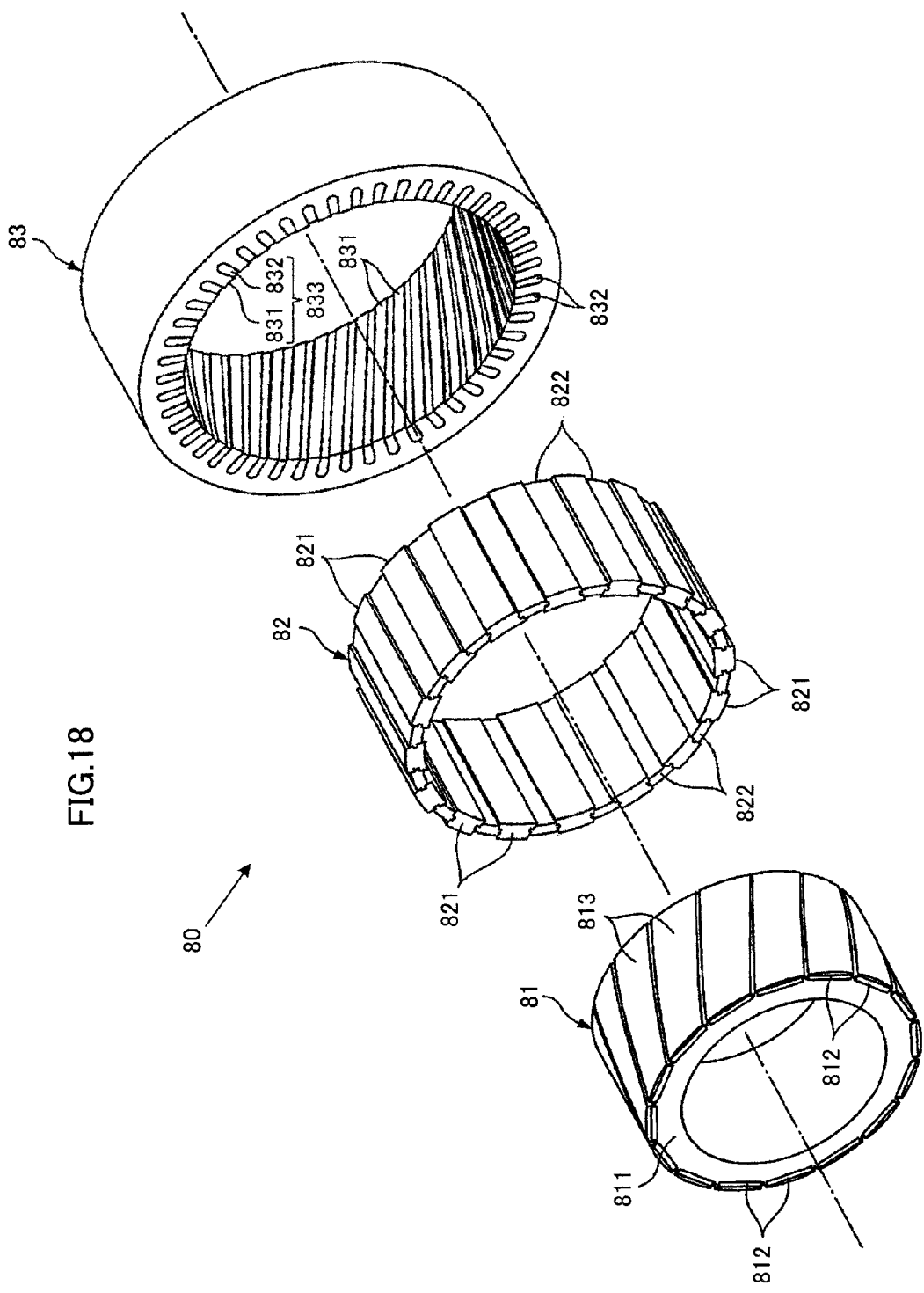
FIG. 18 is an exploded perspective view illustrating a schematic structure of a rotating machine 80 in a fourth embodiment of the present invention.
Figure 19:
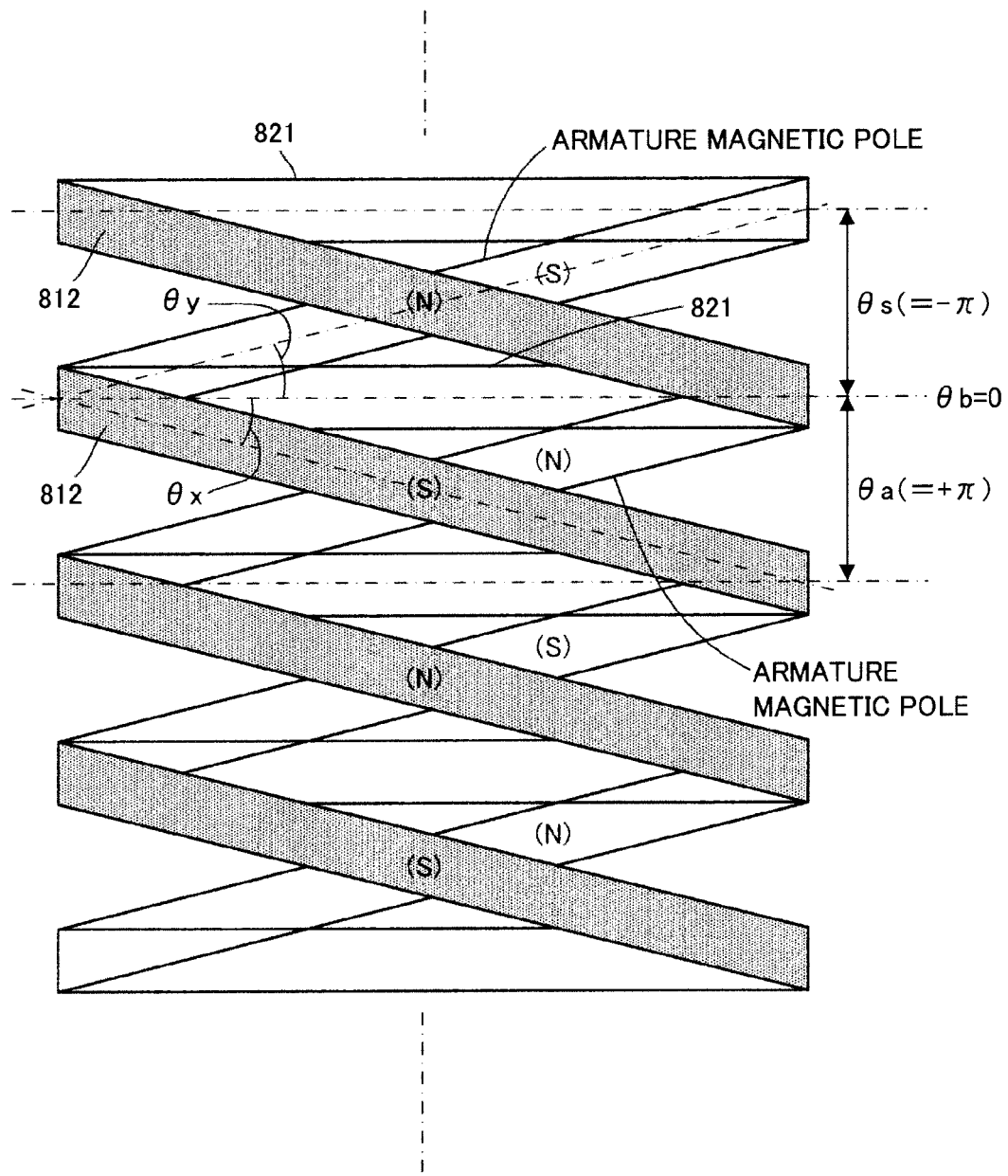
FIG. 19 is a diagram typically illustrating the positional relationship between an armature of the rotating machine 80, a permanent magnet, and a soft magnetic material (core) with the longitudinal direction (vertical direction) of the page as the circumferential direction of the rotating machine 80 and the lateral direction (horizontal direction) of the page as the central axis direction of the rotating machine 80.

The following describes a fourth embodiment of the present invention with reference to FIGS. 18 to 19. This embodiment is different from the power unit 1 of the first embodiment only in a part of the configuration of the rotating machine. More specifically, this embodiment includes a rotating machine 80 which is different from the rotating machine 3 only in a part of the configuration (the rotating machine 80 which functions as an energy dispensing/synthesizing system in the fifth invention), instead of the rotating machine 3. Therefore, in the description of this embodiment, the same components as those in the first embodiment are denoted by the same reference numerals as in the first embodiment and their description is omitted.

Referring to FIG. 18, the rotating machine 80 coaxially includes a first rotor 81, a second rotor 82, and a stator 83 each having a cylindrical form. The stator 83 is provided in a fixed manner to a housing, which is not shown, and is fixed to the immovable part 12 via the housing. Further, the second rotor 82 is disposed inside the stator 83 with its outer peripheral surface opposed to the inner peripheral surface of the stator 83. Moreover, the first rotor 81 is disposed inside the second rotor 82 with its outer peripheral surface opposed to the inner peripheral surface of the second rotor 82. The first rotor 81 is connected to the first rotating shaft 25 so as to be rotatable integrally with the first rotating shaft 25. Moreover, the second rotor 82 is connected to the fourth rotating shaft 33 and the auxiliary device driving rotating shaft 24a so as to be rotatable integrally with the fourth rotating shaft 33 and the auxiliary device driving rotating shaft 24a.

The first rotor 81 includes a cylindrical base 811 formed by stacking steel plates and a plurality (even number) of permanent magnets 812 secured to the outer peripheral surface of the base 811. These permanent magnets 812 are each provided so as to extend, from one end side of the base 811 in the central axis direction (in the central axis direction of the first rotating shaft 25) to the other end side of the base 811, along the outer peripheral surface of the base 811 and are arranged at regular intervals in the circumferential direction. In this case, when viewed in the radial direction of the first rotor 81 (in a plane view), each permanent magnet 812 extends in a direction inclined into one circumferential direction (to the lower side in FIG. 19) by a certain angle θx (mechanical angle) with respect to the central axis direction (the horizontal direction of the page in FIG. 19) as shown in FIG. 19. In other words, the permanent magnets 812 are arranged in a skewed manner so that both end portions of each permanent magnet 812 deviate from each other in the circumferential direction as to the positional relationship (so that both end portions have a phase difference in the circumferential direction). Moreover, the magnetic poles on the outer peripheral surfaces of two permanent magnets 812, 812 adjacent to each other in the circumferential direction are different in polarity from each other. In this embodiment, the outer surface (the outer surface in the radial direction) of each permanent magnet 812 is coated with a steel plate 7.

Since the first rotor 81 is provided with the plurality of permanent magnets 812 as described above, magnetic poles are formed so as to be arranged in the circumferential direction on the outer surface of the first rotor 81, where the magnetic poles extend in a direction inclined into one circumferential direction (to the lower side in FIG. 19) by a certain angle θx with respect to the central axis direction (the horizontal direction of the page in FIG. 19) as shown in FIG. 19. Further, in this case, the magnetic poles adjacent to each other in the circumferential direction are different in polarity from each other.

Additionally, in this embodiment, the outer peripheral surface of the first rotor 81 has a meaning of the virtual second cylinder outer peripheral surface in the fifth invention. Moreover, the extending direction of each permanent magnet 812 corresponds to the second predetermined direction in the fifth invention.

The second rotor 82 includes a plurality of (the same number as the number of the permanent magnets 812) cores 821 made of soft magnetic materials and holding members 822 for holding the cores 821 in a unified manner. The cores 821 extend in the central axis direction respectively and are arranged at regular intervals in the circumferential direction. Further, each of the holding members 822 is disposed extending in the central axis direction between the cores 821, 821 adjacent to each other in the circumferential direction, and the cores 821, 821 adjacent to each other are secured to both side edges of each holding member 822. Thereby, the plurality of cores 821 arranged in the circumferential direction are connected in a unified manner via the holding members 822. In this case, the cores 821 and the holding members 822 are disposed so that the cylindrical second rotor 82 is formed by whole of the cores 821 and the holding members 822. The holding members 822 are each made of non-magnetic material such as stainless steel, synthetic resin, or the like.

Incidentally, in this embodiment, the outer peripheral surface (or the inner peripheral surface) of the second rotor 82 has a meaning of the virtual third cylindrical outer peripheral surface in the fifth invention. Moreover, the extending direction of each core 821 (the central axis direction in this embodiment) corresponds to the third predetermined direction in the fifth invention.

The stator 83 has a plurality of (a multiple of 3) armatures 833 for generating rotating magnetic fields applied to the first rotor 81 and the second rotor 82 inside the stator 83, including a cylindrical iron core (armature iron core) 831 and coils (armature windings) 832 of three phases, i.e., U, V, and W phases attached to the inner peripheral surface of the iron core 831.

Each of the coils 832 of the U, V, and W phases and the iron core 831 constitute an individual armature 833. The coils 832 of the U, V, and W phases (accordingly, the armatures 833) are provided extending along the inner peripheral surface of the iron core 831 from one end side to the other end side of the iron core 831 and are arranged at regular intervals in the circumferential direction. In this case, each armature 833 extends in a direction inclined with respect to the central axis direction, when viewed in the radial direction of the stator 83 (in a plane view). In other words, the armatures 833 are arranged in a skewed manner so that both end portions of each armature 833 deviate from each other in the circumferential direction as to the positional relationship (so that both end portions deviate in phase from each other in the circumferential direction).

The three-phase coils 832 of the plurality of (a multiple of 3) armatures 833 provided in the stator 83 as described above generate a plurality (even number) of armature magnetic poles, which extend along the inner peripheral surface of the iron core 831 in the extending direction of the armatures 833 from one end side to the other end side of the iron core 831, which are arranged at regular intervals in the circumferential direction, and which rotate in the circumferential direction, when a three-phase alternating current is applied to the coils 832 (see FIG. 19). In other words, the armature magnetic poles are arranged in a skewed manner similarly to the armatures 833 and therefore both end portions of each armature magnetic pole deviate from each other in the circumferential direction as to the positional relationship (both end portions have a phase difference in the circumferential direction). In this case, the extending direction of each armature 833 is set so that a phase difference of one end portion (the left-side end portion in FIG. 19) of the armature magnetic pole with respect to the other end portion (the right-side end portion in FIG. 19) thereof is in a direction opposite to the direction of the phase difference of one end portion (the left-side end portion in FIG. 19) of the permanent magnet 812 with respect to the other end portion (the right-side end portion in FIG. 19). Two armature magnetic poles adjacent to each other of the plurality of the armature magnetic poles have polarities different from each other. Further, the number of armature magnetic poles is set to the same value as the number of permanent magnets 812 (the number of magnetic poles formed by the permanent magnets 812).

The stator 83 of the rotating machine 80 in this embodiment generates a rotating magnetic field inside the iron core 831 by the rotation of the armature magnetic poles generated as described above. Moreover, the three-phase coils 832 are electrically connected to the battery 11 via the PDU 10. This enables electric power to be transmitted or received between the coils 832 and the battery 11 (input/output of electric energy to or from the coils 832) via the PDU 10. Further, the ECU 41 is able to control the electricity supply to the coils 832 via the PDU 10 and consequently to control the operation mode of the rotating magnetic field (the rotational speed and the magnetic flux intensity of the rotating magnetic field).

Additionally, the coil 832 corresponds to the electric element in the present invention. In this embodiment, the inner peripheral surface of the iron core 831 of the stator 83 has a meaning of the virtual first cylinder outer peripheral surface in the fifth invention. Moreover, the extending direction of each armature 833 corresponds to the first predetermined direction in the fifth invention.

Here, as shown in FIG. 19, $\theta a$, $\theta s$, and $\theta b$ represent a phase difference (a phase difference in terms of an electric angle) of one end portion of the permanent magnet 812 with respect to the other end portion thereof, phase difference (a phase difference in terms of an electric angle) of one end portion of the armature magnetic pole with respect to the other end portion thereof, and a phase difference (a phase difference in terms of an electric angle) of one end portion of the core 821 with respect to the other end portion thereof, respectively. Regarding the polarity of the phase differences $\theta a$, $\theta s$, and $\theta b$, a phase difference in one circumferential direction such as, for example, in the downward direction in FIG. 19, is assumed to be positive and a phase difference in the upward direction is assumed to be negative. Moreover, the term "electric angle" in this embodiment means an angle obtained by multiplying a mechanical angle by a pole logarithm of the magnetic poles formed by the permanent magnets 812.

In this instance, the phase differences $\theta s$, $\theta a$, and $\theta b$ are set so as to satisfy the following equation (7):

$$\theta s = 2\theta b - \theta a \qquad (7)$$

More specifically, in this embodiment, it is assumed that $\theta s = -\theta a$ and $\theta b = 0$, by which the equation (7) is satisfied. In this instance, the magnitudes (absolute values) of the phase differences $\theta s$ and $\theta a$ are both "$\pi$" in terms of an electric angle. Therefore, the phase difference $\theta a$ is greater than the phase difference $\theta b$ by the electric angle $\pi$ and the phase difference $\theta s$ is smaller than the phase difference $\theta b$ by the electric angle $\pi$.

The rotating machine 80 of this embodiment configured as described above is substantially equivalent to a rotating machine in which the number n of rotating machine structures as described in the second or third embodiment is virtually set to an infinite value and the infinite number of rotating machine structures are continuously arranged in the central axis direction (rotating machine with n→∞). Therefore, the ECU 41 controls the electricity supply to the coils 832 to generate the armature magnetic poles as described above and thereby the rotating machine 80 is capable of performing the same operations as the rotating machine 60 according to the second embodiment or the rotating machine 70 according to the third embodiment.

Specifically, the ECU 41 controls the current applied to the coils 832 via the PDU 10 so that the relational expressions (6a) and (6b) are satisfied by a rotation angle position $\theta mf$ (a rotation angle position in terms of an electric angle) of a magnetic flux vector of a rotating magnetic field generated by the electricity supply to the coils 832 of the stator 83 and an angular velocity $\omega mf$ (an electric angular velocity) which is a time rate of change (derivative) of the rotation angle position $\theta mf$, respectively, which enables the rotating machine 80 to have a function of a planetary gear unit (the planetary gear unit having the collinear relationship represented by the equation (6b)).

Moreover, the rotating machine 80 has a function of dispensing or synthesizing power in the same manner as the rotating machine 60 or 70. Specifically, the rotating machine 80 is able to dispense or synthesize energy among the coils 832 of the stator 83, the second rotor 82, and the first rotor 81 via the magnetic circuit formed among the stator 83, the second rotor 82, and the first rotor 81. In this case, the rotating machine is more effective to reduce torque ripple and cogging torque generated in the first rotor 81 and the second rotor 82.

The power unit according to this embodiment has the same configuration as the first embodiment except the rotating machine 80 described above. The power unit is then capable of performing the operations in the operation modes such as the stop-period idle stop mode described in the first embodiment in the same manner as in the first embodiment.

Also in the power unit according to this embodiment, the auxiliary device 5 is able to be driven by using the power of one of the engine 2 and the rotating machine 80, which are power generation sources for driving the driving wheels 4, 4, without using an auxiliary device driving motor in a state other than the rotation stopped state of the second rotor 82 of the rotating machine 80 in the same manner as in the first embodiment.

Moreover, the planetary gear unit 34 provided in the first power transmission path 22 has the four types of functions by the combination of the operating states of the second clutch 36 and the third clutch 37 as described in the first embodiment. Therefore, it is possible to operate the power unit in various operation modes with the configuration of the power unit simplified by decreasing the number of parts of the power unit.

While it is assumed that $\theta s=-\theta a=-\pi$ and $\theta b=0$ to satisfy the relational expression (7) in this embodiment, any other combination of the phase differences $\theta s$, $\theta a$, and $\theta b$ may be used to satisfy the equation (7). For example, the extending directions of the armatures 833, the permanent magnets 812, and the cores 821 may be set so that, for example, $\theta s=0$ and $\theta a=2\cdot\theta b=2\cdot\pi$ or that $\theta a=0$ and $\theta s=2\cdot\theta b=2\cdot\pi$. Alternatively, the extending directions may be set so that all of the phase differences $\theta s$, $\theta a$, and $\theta b$ are other than zero, in other words, so that all of the armatures 833, the permanent magnets 812, and the cores 821 are arranged in a skewed manner.

[Variations]

The following describes some variations of the first to fourth embodiments.

Although the power units each mounted on a hybrid vehicle have been described in the first to fourth embodiments, the driven unit driven by the power unit of the present invention may be other than the driving wheels 4, 4 of the vehicle.

Although the first to fourth embodiments have been described by taking the examples where the engine 2 (an internal combustion engine) is provided as a prime mover, a heat engine other than the internal combustion engine may be used as the prime mover.

In the first to fourth embodiments, the first rotor 51 of the rotating machine 3 (or the first rotor 61 of the rotating machine 60) and the output shaft 2a of the engine 2 are provided so as to be rotatable integrally with the first rotating shaft 25. Therefore, instead of connecting the first rotating shaft 25 to the immovable part 12 via the one-way clutch 28, one of the first rotor 51 of the rotating machine 3 (or the first rotor 61 of the rotating machine 60) and the output shaft 2a of the engine 2 may be connected to the immovable part 12 via the one-way clutch 28.

Further, the present invention may include a brake mechanism operable in an operating state, where a braking force is applied to one of the first rotating shaft 25, the first rotor 51 of the rotating machine 3 (or the first rotor 61 of the rotating machine 60, the first rotor 71 of the rotating machine 70, or the first rotor 81 of the rotating machine 80), and the output shaft 2a of the engine 2 via an actuator (consequently, an operating state where a brake is applied to the rotation of the first rotor 51 of the rotating machine 3 [or the first rotor 61 of the rotating machine 60, the first rotor 71 of the rotating machine 70, or the first rotor 81 of the rotating machine 80]), and in an operating state where the braking via the actuator is released. Moreover, in the case where the first rotating shaft 25, the first rotor 51 of the rotating machine 3 (or the first rotor 61 of the rotating machine 60, the first rotor 71 of the rotating machine 70, or the first rotor 81 of the rotating machine 80), and the output shaft 2a of the engine 2 are going to rotate in the reverse rotation direction, the rotations of the first rotor 51 of the rotating machine 3 (or the first rotor 61 of the rotating machine 60, the first rotor 71 of the rotating machine 70, or the first rotor 81 of the rotating machine 80) and the like may be braked by controlling the actuator of the brake mechanism.

In the first to fourth embodiments, the first clutch 32 is provided in a portion between the third rotating shaft 27a and the second rotating shaft 26 in the second power transmission path 23. Alternatively, it is possible to provide the first clutch in another portion in the second power transmission path 23 such as a portion between the first rotating shaft 25 and the power transmission system 27.

In the first to fourth embodiments, the forward/reverse rotation switching mechanism composed of the planetary gear unit 34, the second clutch 36, and the third clutch 37 has the functions of the first power transmission system and the second locking mechanism. Alternatively, the first power transmission system or the second locking mechanism may be provided separately from the forward/reverse rotation switching mechanism. For example, a clutch mechanism similar to the first clutch 32 may be interposed between the ring gear 34r of the planetary gear unit 34 and the power transmission system 35, and the clutch mechanism may form the first power transmission system. Moreover, for example, the fourth rotating shaft 33 may be connected to the immovable part 12 via a clutch mechanism similar to the second clutch 36, and the clutch mechanism may form the second locking mechanism.

Note that, however, the provision of the functions of the first power transmission system and the second locking mechanism to the forward/reverse rotation switching mechanism as in the first to fourth embodiments enables an effective reduction in the number of parts of the power units and an effective simplification of the configuration thereof. Consequently, it leads to a reduction in the manufacturing cost of the power units.

In the first to fourth embodiments, the output shaft 2a of the engine 2 (prime mover) is connected to the first rotor 51 of the rotating machine 3 (or the first rotor 61 of the rotating machine 60) and the auxiliary device is connected to the second rotor 52 of the rotating machine 3 (or the second rotor 62 of the rotating machine 60) via the auxiliary device power transmission path 24. Alternatively, the power unit may be configured so that the second rotor 52 or 62 is connected to the output shaft 2a of the engine 2 and so that the auxiliary device is connected to the first rotor 51 or 61.

In the first to fourth embodiments, the sun gear 34s of the planetary gear unit 34 is connected to the second rotor 52 of the rotating machine 3 (or the second rotor 62 of the rotating machine 60). Alternatively, the ring gear 34r of the planetary gear unit 34 may be connected to the second rotor 52 of the rotating machine 3 (or the second rotor 62 of the rotating machine 60) and the sun gear 34s of the planetary gear unit 34 may be connected to the driving wheels 4, 4 (the driven unit) via the power transmission system 35 and the like.

In the first to fourth embodiments, the power transmission system 27 in the second power transmission path 23 includes the CVT 27c. Alternatively, the power transmission system 27 may be formed of a mechanism providing a fixed reduction ratio. For example, the power transmission system 27 may be formed of a pair of gears fixed to the first rotating shaft 25 and the third rotating shaft 27a, respectively, and meshed with each other.

In the first to fourth embodiments, the auxiliary device power transmission path 24 is configured as described above. Alternatively, for example, the third gear 24e, the belt 24f, and the fourth gear 24g may be omitted and the input shaft 5a of the auxiliary device 5 may be connected coaxially with the second gear 24d via the auxiliary device clutch 24h. For the auxiliary device power transmission path 24, an appropriate configuration may be adopted in consideration of the positional relationship between the components of the power unit 1.

In the first to fourth embodiments, the auxiliary device clutch 24h is always placed in the ON state in a situation where the auxiliary device 5 is able to be driven. If there is no request for driving the auxiliary device 5 such as during the operation stop period of the air conditioner, alternatively the auxiliary device clutch 24h may be operated in the OFF state.

Further, the auxiliary device clutch 24h may be omitted and the gear 24f in the auxiliary device power transmission path 24 may be connected to the input shaft 5a so as to rotate integrally with the input shaft 5a of the auxiliary device 5.

What is claimed is:

1. A power unit for driving a driven unit and an auxiliary device, comprising:
    a prime mover having an output shaft for use in outputting power;
    an energy dispensing/synthesizing system having two bodies of rotation which input and output rotational energy and an electric element which inputs and outputs electric energy, in which energy is able to be dispensed or synthesized in non-contact manner between the two bodies of rotation and the electric element while energy conversion is performed between the rotational energy of the two bodies of rotation and the electric energy of the electric element and in which a first body of rotation which is one of the two bodies of rotation is connected to the output shaft of the prime mover and a second body of rotation which is the other of the two bodies of rotation is connected to the driven unit via a first power transmission path;
    a first power transmission system included in the first power transmission path and selectively operable between a first operating state for enabling power transmission in the first power transmission path and a second operating state for disconnecting power transmission in the first power transmission path;
    a second power transmission path which connects the output shaft of the prime mover and the driven unit bypassing the first power transmission system; and
    a second power transmission system included in the second power transmission path and selectively operable between a third operating state for enabling power transmission in the second power transmission path and a fourth operating state for disconnecting power transmission in the second power transmission path,
    wherein the auxiliary device is connected to the second body of rotation of the energy dispensing/synthesizing system.

2. The power unit according to claim 1, wherein the energy dispensing/synthesizing system includes: an immovable stator having an armature for generating a rotating magnetic field; a first rotor having a magnet and provided rotatably so as to be opposed to the stator; and a second rotor made of a soft magnetic material and provided rotatably in a non-contact state with respect to the stator and the first rotor between the stator and the first rotor, dispenses or synthesizes energy via a magnetic circuit formed along with the generation of the rotating magnetic field among the stator, the first rotor, and the second rotor, and maintains an interrelation in a rotational speed between the rotating magnetic field, the first rotor, and the second rotor at a predetermined collinear relationship during the energy dispensing or synthesizing, with the electric element formed of an armature winding of the armature and the two bodies of rotation formed of the first rotor and the second rotor.

3. The power unit according to claim 2, wherein:
    the stator has an armature row formed of a plurality of the armatures provided in the stator so as to be arranged in the circumferential direction which is a direction around a rotation axis of the first rotor and the armature row generates an armature magnetic pole row, which is formed of a plurality of armature magnetic poles generating the rotating magnetic field by rotating in the circumferential direction, the armature magnetic pole row including the armature magnetic poles adjacent to each other in the circumferential direction different in polarity from each other, by an electricity supply to the armature windings of the armatures constituting the armature row;
    the first rotor has a magnetic pole row formed of a plurality of magnetic poles which are formed so as to be arranged in the circumferential direction and opposed to the armature row by a plurality of the magnets provided in the first rotor, the magnetic pole row including the magnetic poles adjacent to each other in the circumferential direction different in polarity from each other;
    the second rotor has a soft magnetic material row formed of a plurality of the soft magnetic materials provided in the second rotor so as to be arranged in the circumferential direction between the armature row and the magnetic pole row; and
    a ratio among the number of the armature magnetic poles of the stator, the number of the magnetic poles of the first rotor, and the number of the soft magnetic materials of the second rotor is set to $1:m:(1+m)/2$ $(m \neq 1)$.

4. The power unit according to claim 3, wherein the auxiliary device is connected to the second rotor as the second body of rotation.

5. The power unit according to claim 2, wherein:
    the stator has an armature row formed of a plurality of the armatures provided in the stator so as to be arranged in the circumferential direction which is a direction around the rotation axis of the first rotor, and the armature row generates an armature magnetic pole row, which is formed of a plurality of armature magnetic poles generating the rotating magnetic field by rotating in the circumferential direction, the armature magnetic pole row including the armature magnetic poles adjacent to each other in the circumferential direction different in polarity from each other, by an electricity supply to the armature windings of the armatures constituting the armature row;
    the first rotor has a magnetic pole row formed of a plurality of magnetic poles which are formed so as to be arranged in the circumferential direction and opposed to the armature row by a plurality of the magnets provided in the first rotor, the magnetic pole row including the magnetic poles adjacent to each other in the circumferential direction different in polarity from each other;
    the second rotor has a soft magnetic material row formed of a plurality of the soft magnetic materials provided in the second rotor so as to be arranged in the circumferential direction between the armature row and the magnetic pole row;
    the power unit further includes n (n: 2 or greater integer) rotating machine structures where the armature row, the magnetic pole row, and the soft magnetic material row constitute one rotating machine structure; and
    in the n rotating machine structures, a phase difference in terms of an electric angle in the circumferential direction between the armature magnetic pole row generated by the armature row and the magnetic pole row is set so as to deviate from each other between the adjacent rotating machine structures by an electric angle of $2\pi/n$ and a phase difference in terms of an electric angle in the circumferential direction between the armature magnetic pole row generated by the armature row and the soft magnetic material row is set so as to deviate from each other between the adjacent rotating machine structures by an electric angle of $\pi/n$.

6. The power unit according to claim 5, wherein the auxiliary device is connected to the second rotor as the second body of rotation.

7. The power unit according to claim 2, wherein:
    the stator has a plurality of the armatures provided in the stator so as to extend each in a first predetermined direction along a virtual first cylinder outer peripheral surface which is coaxial with the rotation axis of the first rotor from one end side of the first cylinder outer peripheral surface to the other end side thereof and so as to be arranged in the circumferential direction which is a direction around the rotation axis of the first rotor, and the plurality of armatures generate a plurality of armature magnetic poles generating the rotating magnetic field by rotating in the circumferential direction, the armature magnetic poles each extending in the first predetermined direction and the armature magnetic poles adjacent to each other in the circumferential direction being different in polarity from each other, by an electricity supply to the armature windings of the plurality of armatures;

the first rotor has a plurality of magnetic poles formed so as to extend each in a second predetermined direction along a virtual second cylinder outer peripheral surface which is coaxial with the rotation axis of the first rotor from one end side of the second cylinder outer peripheral surface to the other end side thereof and so as to be arranged in the circumferential direction with a gap to the plurality of armatures by a plurality of the magnets provided in the first rotor, the plurality of magnetic poles adjacent to each other in the circumferential direction being different in polarity from each other;

the second rotor has a plurality of soft magnetic materials provided in the second rotor so as to extend each in a third predetermined direction along a virtual third cylinder outer peripheral surface which is coaxial with the rotation axis of the first rotor from one end side of the third cylinder outer peripheral surface to the other end side thereof and so as to be arranged in the circumferential direction between the plurality of armatures and the plurality of magnetic poles; and electric angles $\theta s$, $\theta a$, and $\theta b$ are set so as to satisfy a relationship represented by $\theta s = 2 \cdot \theta b - \theta a$, where $\theta s$ is an electric angle between both end portions in the first predetermined direction of each of the armature magnetic poles generated by the plurality of armatures, $\theta a$ is an electric angle between both end portions in the second predetermined direction of each of the plurality of magnetic poles, and $\theta b$ is an electric angle between both end portions in the third predetermined direction of each of the plurality of soft magnetic materials.

8. The power unit according to claim 7, wherein the three electric angles $\theta s$, $\theta a$, and $\theta b$ are set so that one of the electric angles $\theta s$ and $\theta a$ is greater than the electric angle $\theta b$ by an electric angle $\pi$ and so that one of the electric angles $\theta s$ and $\theta a$ is smaller than the electric angle $\theta b$ by the electric angle $\pi$.

9. The power unit according to claim 7, wherein the auxiliary device is connected to the second rotor as the second body of rotation.

10. The power unit according to claim 1, further comprising a brake mechanism selectively operable between a fifth operating state in which the rotation of the first body of rotation of the two bodies of rotation of the energy dispensing/synthesizing system is inhibited or braked and a sixth operating state in which the inhibition or braking of the rotation is released.

11. The power unit according to claim 1, further comprising a forward/reverse rotation switching mechanism selectively operable between a seventh operating state in which the rotation direction of the driven unit, which rotates by the power transmitted to the driven unit via the first power transmission path from the second body of rotation of the two bodies of rotation of the energy dispensing/synthesizing system, is one of the two, that is, forward and reverse rotation directions and an eighth rotating state in which the rotation direction of the driven unit is the other rotation direction of the two rotation directions.

12. The power unit according to claim 11, wherein:
the forward/reverse rotation switching mechanism includes: a planetary gear unit, which has a sun gear, a ring gear, and a carrier rotatably supporting a pinion gear meshed with the sun gear and the ring gear, in which one of the sun gear and the ring gear is connected to the second body of rotation of the energy dispensing/synthesizing system and the other of the sun gear and the ring gear is connected to the driven unit; a first locking mechanism selectively operable between a ninth operating state in which the carrier is non-rotatably locked and a 10th operating state in which the lock is released; and a first clutch mechanism selectively operable between an 11th operating state in which the carrier is integrally and rotatably connected to one of the sun gear and the ring gear and a 12th operating state in which the connection is released;

the forward/reverse rotation switching mechanism has a state in which the first locking mechanism and the first clutch mechanism are placed in the 10th operating state and the 11th operating state, respectively, as one of the seventh operating state and the eighth operating state; and the forward/reverse rotation switching mechanism has a state in which the first locking mechanism and the first clutch mechanism are placed in the ninth operating state and the 12th operating state, respectively, as the other of the seventh operating state and the eighth operating state.

13. The power unit according to claim 12, wherein:
the forward/reverse rotation switching mechanism serves as the first power transmission system;

the forward/reverse rotation switching mechanism has a state in which the first locking mechanism and the first clutch mechanism are placed in the 10th operating state and the 11th operating state, respectively, or a state in which the first locking mechanism and the first clutch mechanism are placed in the ninth operating state and the 12th operating state, respectively, as the first operating state; and the forward/reverse rotation switching mechanism has a state in which the first locking mechanism and the first clutch mechanism are placed in the 10th operating state and the 12th operating state, respectively, as the second operating state.

14. The power unit according to claim 12, wherein the forward/reverse rotation switching mechanism has a state in which the first locking mechanism and the first clutch mechanism are placed in the ninth operating state and the 11th operating state, respectively, as the operating state in which the second body of rotation of the energy dispensing/synthesizing system is non-rotatably locked.

15. The power unit according to claim 1, further comprising a second locking mechanism selectively operable between a 13th operating state in which the second body of rotation of the energy dispensing/synthesizing system is non-rotatably locked and a 14th operating state in which the lock is released.

* * * * *